(12) United States Patent  
Chen et al.

(10) Patent No.: US 12,554,099 B2
(45) Date of Patent: Feb. 17, 2026

(54) IMAGING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Wei-Yu Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 713 days.

(21) Appl. No.: 17/354,176

(22) Filed: Jun. 22, 2021

(65) Prior Publication Data

US 2022/0196971 A1 Jun. 23, 2022

Related U.S. Application Data

(60) Provisional application No. 63/124,574, filed on Dec. 11, 2020.

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .......... G02B 9/00; G02B 9/64; G02B 13/001; G02B 13/0015; G02B 13/002; G02B 13/0045; G02B 13/18
USPC ......................................................... 359/708
See application file for complete search history.

(56) References Cited

U.S. PATENT DOCUMENTS

| 5,367,405 A | 11/1994 | Sado |
| 2016/0266350 A1 | 9/2016 | Iiyama et al. |
| 2019/0361205 A1 | 11/2019 | Wolterink et al. |
| 2020/0393653 A1* | 12/2020 | Chen ........................ G02B 9/64 |

(Continued)

FOREIGN PATENT DOCUMENTS

| CN | 110376716 A | 10/2019 |
| JP | 1999-109232 | 4/1999 |
| KR | 101802036 B1 | 11/2017 |

(Continued)

OTHER PUBLICATIONS

Goss et al. "Handbook of Optical Systems", 2007, Wiley, vol. 3, pp. 377-379 (Year: 2007).*

(Continued)

*Primary Examiner* — Marin Pichler
(74) *Attorney, Agent, or Firm* — Maschoff Brennan

(57) ABSTRACT

An imaging optical lens system includes eleven lens elements which are, in order from an object side to an image side along an optical path: a first lens element, a second lens element, a third lens element, a fourth lens element, a fifth lens element, a sixth lens element, a seventh lens element, an eighth lens element, a ninth lens element, a tenth lens element and an eleventh lens element. There is an air gap in a paraxial region between each of all adjacent lens elements of the imaging optical lens system. At least one of an object-side surface and an image-side surface of each of at least two lens elements located between an aperture stop and an image surface of the imaging optical lens system is concave in a paraxial region thereof and has at least one convex critical point in an off-axis region thereof.

37 Claims, 28 Drawing Sheets

(56) References Cited

U.S. PATENT DOCUMENTS

| | | | |
|---|---|---|---|
| 2022/0269046 A1* | 8/2022 | Zeng | G02B 13/24 |
| 2023/0236399 A1* | 7/2023 | Pandit | G02B 9/64 |
| | | | 348/79 |

FOREIGN PATENT DOCUMENTS

| | | | | |
|---|---|---|---|---|
| TW | 1704372 B | | 9/2020 | |
| TW | 1684807 B | * | 11/2020 | G02B 9/64 |
| WO | 2016047112 A1 | | 3/2016 | |

OTHER PUBLICATIONS

IN Examination Report in Application No. 202134049133 Dated Jun. 29, 2022.

\* cited by examiner

US 12,554,099 B2

IMAGING OPTICAL LENS SYSTEM, IMAGE CAPTURING UNIT AND ELECTRONIC DEVICE

RELATED APPLICATIONS

This application claims priority to U.S. Provisional Application 63/124,574, filed on Dec. 11, 2020, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens system includes eleven lens elements. The eleven lens elements are, in order from an object side to an image side along an optical path, a first lens element, a second lens element, a third lens element, a fourth lens element, a fifth lens element, a sixth lens element, a seventh lens element, an eighth lens element, a ninth lens element, a tenth lens element and an eleventh lens element. There is an air gap in a paraxial region between each of all adjacent lens elements of the imaging optical lens system. The imaging optical lens system further includes an aperture stop, and at least one of an object-side surface and an image-side surface of each of at least two lens elements located between the aperture stop and an image surface of the imaging optical lens system is concave in a paraxial region thereof and has at least one convex critical point in an off-axis region thereof.

According to another aspect of the present disclosure, an imaging optical lens system includes eleven lens elements. The eleven lens elements are, in order from an object side to an image side along an optical path, a first lens element, a second lens element, a third lens element, a fourth lens element, a fifth lens element, a sixth lens element, a seventh lens element, an eighth lens element, a ninth lens element, a tenth lens element and an eleventh lens element. The first lens element has positive refractive power. At least one of an object-side surface of the eighth lens element and an image-side surface of the eighth lens element is aspheric. The eleventh lens element has an object-side surface having at least one inflection point in an off-axis region thereof, and the eleventh lens element has an image-side surface being concave in a paraxial region thereof and having at least one convex critical point in an off-axis region thereof.

According to another aspect of the present disclosure, an image capturing unit includes one of the aforementioned imaging optical lens systems and an image sensor, wherein the image sensor is disposed on the image surface of the imaging optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens system includes eleven lens elements. The eleven lens elements are, in order from an object side to an image side along an optical path, a first lens element, a second lens element, a third lens element, a fourth lens element, a fifth lens element, a sixth lens element, a seventh lens element, an eighth lens element, a ninth lens element, a tenth lens element and an eleventh lens element.

There can be an air gap in a paraxial region between each of all adjacent lens elements of the imaging optical lens system. Therefore, it is favorable for reducing the assembling difficulty of the imaging optical lens system so as to increase the assembly yield rate. In detail, each of the eleven lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between each of all adjacent lens elements of the imaging optical lens system in the present disclosure is favorable for avoiding the problems of the cemented lens elements so as to increase flexibility in designing the surface shapes of lens elements, thereby reducing the size of the imaging optical lens system and correcting aberrations.

The first lens element can have positive refractive power. Therefore, it is favorable for providing significant light convergence so as to effectively reduce the total track length of the imaging optical lens system for the requirement of compactness.

At least one of an object-side surface of the eighth lens element and an image-side surface of the eighth lens element can be aspheric. Therefore, it is favorable for effectively correcting aberrations and controlling the thickness of the eighth lens element so as to prevent occupying too much space.

Figure 25:
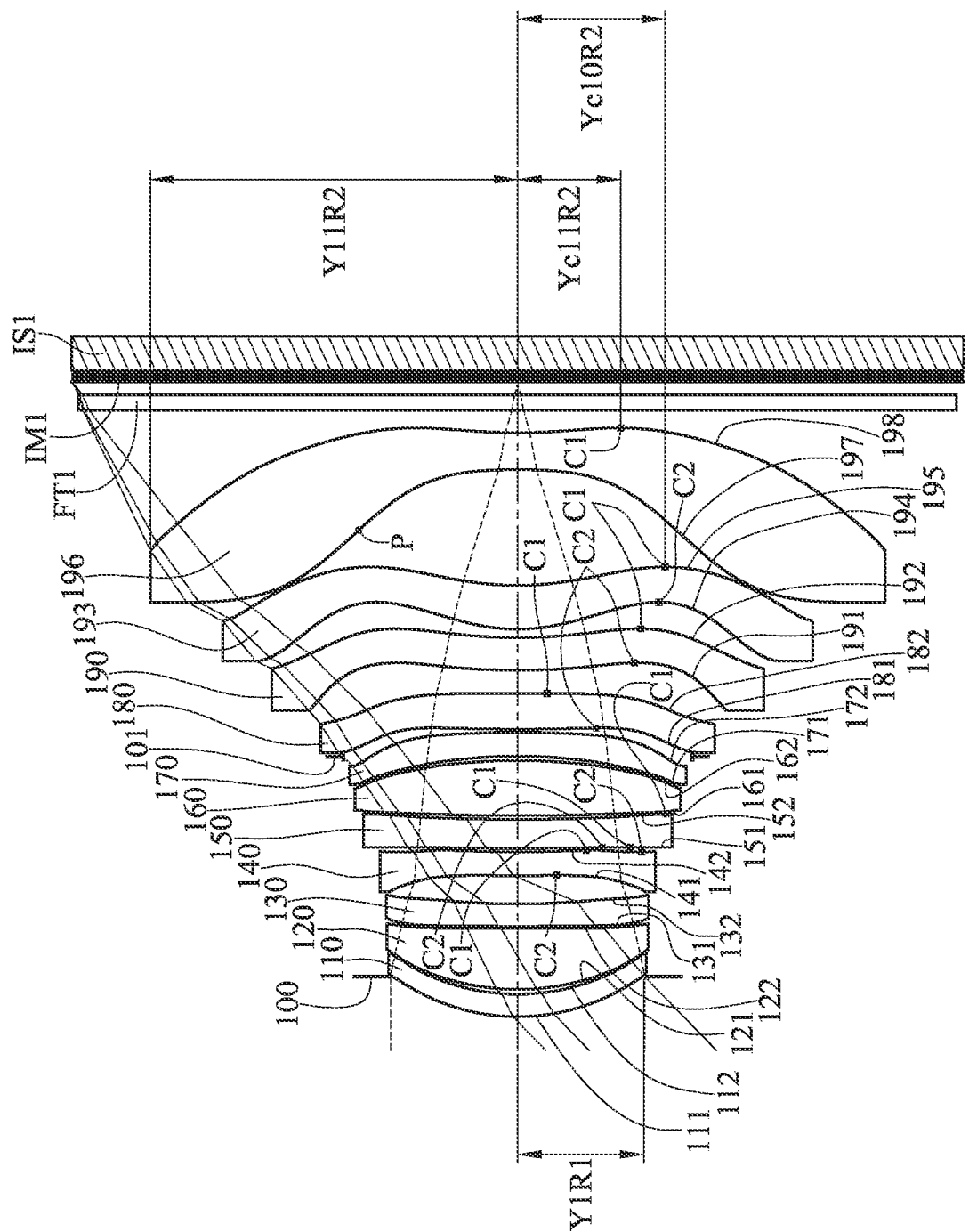
FIG. 25 shows a schematic view of Y1R1, Y11R2, Yc10R2, Yc11R2, several inflection and critical points of the lens elements according to the 1st embodiment of the present disclosure.

The eleventh lens element can have an object-side surface having at least one inflection point in an off-axis region thereof. Therefore, it is favorable for correcting off-axis aberrations and reducing the size of imaging optical lens system. Please refer to FIG. 25, which shows a schematic view of an inflection point P of the object-side surface 197 of the eleventh lens element 196 according to the 1st embodiment of the present disclosure. The inflection point on the object-side surface of the eleventh lens element in FIG. 25 is only exemplary. The other lens elements may also have one or more inflection points.

The imaging optical lens system can further include an aperture stop, and the aperture stop can be located between an imaged object and the fourth lens element. At least one of an object-side surface and an image-side surface of each of at least two lens elements located between the aperture stop and an image surface of the imaging optical lens system can be concave in a paraxial region thereof and can have at least one convex critical point in an off-axis region thereof. Therefore, it is favorable for correcting aberrations of the periphery image and increasing relative illuminance. Moreover, at least one of an object-side surface and an image-side surface of each of at least three lens elements of the imaging optical lens system can be concave in a paraxial region thereof and can have at least one convex critical point in an off-axis region thereof. Moreover, each of at least two of an image-side surface of the ninth lens element, an image-side surface of the tenth lens element and an image-side surface of the eleventh lens element can be concave in a paraxial region thereof and can have at least one convex critical point in an off-axis region thereof. Moreover, the image-side surface of the eleventh lens element can be concave in a paraxial region thereof and can have at least one convex critical point in an off-axis region thereof. Please refer to FIG. 25, which shows a schematic view of several convex critical points C1 of the image-side surface 142 of the fourth lens element 140, the object-side surface 151 of the fifth lens element 150, the image-side surface 152 of the fifth lens element 150, the image-side surface 182 of the eighth lens element 180, the image-side surface 192 of the ninth lens element 190, the image-side surface 195 of the tenth lens element 193 and the image-side surface 198 of the eleventh lens element 196 according to the 1st embodiment of the present disclosure. The convex critical points on the image-side surface of the fourth lens element, the object-side surface of the fifth lens element, the image-side surface of the fifth lens element, the image-side surface of the eighth lens element, the image-side surface of the ninth lens element, the image-side surface of the tenth lens element and the image-side surface of the eleventh lens element in FIG. 25 are only exemplary. The other lens elements may also have one or more convex critical points.

Each of the at least two lens elements located between the aperture stop and the image surface of the imaging optical lens system can have negative refractive power. Therefore, it is favorable for balancing overall refractive power of the imaging optical lens system and correcting various aberrations.

At least one of an object-side surface and an image-side surface of each of at least two lens elements of the imaging optical lens system can be convex in a paraxial region thereof and can have at least one concave critical point in an off-axis region thereof. Therefore, it is favorable for enhancing aberration corrections of the periphery image and increasing relative illuminance by coordinating with the lens surface that is concave in the paraxial region thereof and has at least one convex critical point in the off-axis region thereof; and it is also favorable for forming a proper shape of the lens surface. Moreover, the tenth lens element can have an object-side surface being convex in a paraxial region thereof and having at least one concave critical point in an off-axis region thereof. Please refer to FIG. 25, which shows a schematic view of several concave critical points C2 of the object-side surface 141 of the fourth lens element 140, the image-side surface 142 of the fourth lens element 140, the object-side surface 151 of the fifth lens element 150, the object-side surface 181 of the eighth lens element 180, the object-side surface 191 of the ninth lens element 190 and the object-side surface 194 of the tenth lens element 193 according to the 1st embodiment of the present disclosure. The concave critical points on the object-side surface of the fourth lens element, the image-side surface of the fourth lens element, the object-side surface of the fifth lens element, the object-side surface of the eighth lens element, the object-side surface of the ninth lens element and the object-side surface of the tenth lens element in FIG. 25 are only exemplary. The other lens elements may also have one or more concave critical points.

When a vertical distance between a critical point on the image-side surface of the tenth lens element and an optical axis is Yc10R2, and a vertical distance between a critical point on the image-side surface of the eleventh lens element and the optical axis is Yc11R2, the following condition can be satisfied: 0.5<Yc11R2/Yc10R2<2.0. Therefore, it is favorable for correcting aberrations of the periphery image and increasing relative illuminance. Please refer to FIG. 25, which shows a schematic view of Yc10R2, Yc11R2 and several convex critical points C1 on the image-side surface 195 of the tenth lens element 193 and the image-side surface 198 of the eleventh lens element 196 according to the 1st embodiment of the present disclosure.

When the vertical distance between the critical point on the image-side surface of the eleventh lens element and the optical axis is Yc11R2, and a focal length of the imaging optical lens system is f, the following condition can be satisfied: Yc11R2/f<0.50. Therefore, it is favorable for further correcting aberrations of the periphery image at the image side of the imaging optical lens system and increasing relative illuminance.

The aforementioned air gaps between respective pairs of adjacent lens elements of the imaging optical lens system include a maximum spacing distance; that is, at least one of the air gaps, with the maximum spacing distance, is larger than the rest of air gaps. A lens surface located at an object side of the maximum spacing distance can be concave in a paraxial region thereof. Therefore, it is favorable for utilizing air in the maximum spacing distance as the transmission medium for light convergence and aberration corrections of the periphery image. Moreover, when the focal length of the imaging optical lens system is f, and a curvature radius of a lens surface located at an image side of the maximum spacing distance is Ri, the following condition can be satisfied: f/|Ri|<0.80. Therefore, it is favorable for adjusting the ratio of the focal length to the curvature radius of the refractive surface at the image side of the maximum spacing distance so as to enable light converging in different fields of view, thereby optimizing the focusing on the image surface.

According to the present disclosure, at least six lens elements of the imaging optical lens system can be made of plastic material. Therefore, it is favorable for increasing mass production capacity and reducing the weight of the imaging optical lens system.

When a maximum image height of the imaging optical lens system (which can be half of a diagonal length of an effective photosensitive area of the image sensor) is ImgH, and an axial distance between the image-side surface of the eleventh lens element and the image surface is BL, the following condition can be satisfied: 2.0<ImgH/BL<12.0. Therefore, it is favorable for obtaining a proper balance between miniaturization and module manufacturability of the imaging optical lens system. Moreover, the following condition can also be satisfied: 4.0<ImgH/BL<10.0.

When a total number of lens elements having an Abbe number smaller than 24 in the imaging optical lens system is V24, the following condition can be satisfied: 2≤V24. Therefore, it is favorable for enhancing chromatic aberration corrections. Moreover, the following condition can also be satisfied: 3≤V24. Moreover, when a total number of lens elements having an Abbe number smaller than 20 in the imaging optical lens system is V20, the following condition can be satisfied: 2 V20.

When a minimum value among Abbe numbers of all lens elements of the imaging optical lens system is Vmin, the following condition can be satisfied: Vmin<20. Therefore, it is favorable for enhancing chromatic aberration corrections.

When a maximum value among axial distances between each of all adjacent lens elements of the imaging optical lens system is ATmax, and a minimum value among axial distances between each of all adjacent lens elements of the imaging optical lens system is ATmin, the following condition can be satisfied: 2.0<ATmax/ATmin<120. Therefore, it is favorable for enhancing efficiency in space utilization of lens elements so as to prevent poor space utilization due to an overly dense or sparse arrangement of lens elements.

When an axial distance between an object-side surface of the first lens element and the image surface is TL, and an entrance pupil diameter of the imaging optical lens system is EPD, the following condition can be satisfied: 0.5<TL/EPD<3.0. Therefore, it is favorable for further featuring a large aperture stop so as to provide a sufficient amount of incident light. Moreover, the following condition can also be satisfied: 0.75<TL/EPD<2.75.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the tenth lens element is V10, an Abbe number of the eleventh lens element is V11, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the tenth lens element is N10, a refractive index of the eleventh lens element is N11, and a refractive index of the i-th lens element is Ni, at least one lens element of the imaging optical lens system can satisfy the following condition: 6.0<Vi/Ni<12.0, wherein i=1, 2, 3, 4, 5, 6, 7, 8, 9, 10 or 11. Therefore, it is favorable for enhancing chromatic aberration corrections. Moreover, at least one lens element of the imaging optical lens system can also satisfy the following condition: 8.0<Vi/Ni<12.0, wherein i=1, 2, 3, 4, 5, 6, 7, 8, 9, 10 or 11. Moreover, at least one lens element of the imaging optical lens system can also satisfy the following condition: 6.0<Vi/Ni<11.2, wherein i=1, 2, 3, 4, 5, 6, 7, 8, 9, 10 or 11. Moreover, at least one lens element of the imaging optical lens system can also satisfy the following condition: 7.5<Vi/Ni<10, wherein i=1, 2, 3, 4, 5, 6, 7, 8, 9, 10 or 11.

When the axial distance between the object-side surface of the first lens element and the image surface is TL, and the maximum image height of the imaging optical lens system is ImgH, the following condition can be satisfied: TL/ImgH<2.50. Therefore, it is favorable for miniaturizing the imaging optical lens system. Moreover, the following condition can also be satisfied: TL/ImgH<1.80. Moreover, the following condition can also be satisfied: TL/ImgH<1.60.

When the focal length of the imaging optical lens system is f, a focal length of the first lens element is f1, a focal length of the second lens element is f2, and a focal length of the third lens element is f3, the following condition can be satisfied: 0.75<|f/f1|+|f/f2|+|f/f3|<2.50. Therefore, it is favorable for effectively ensuring sufficient positive refractive power at the object side of the imaging optical lens system so as to further reduce the total track length.

When the axial distance between the object-side surface of the first lens element and the image surface is TL, and a maximum effective radius of the image-side surface of the eleventh lens element is Y11R2, the following condition can be satisfied: TLN11R2<3.50. Therefore, it is favorable for controlling the size of the imaging optical lens system so as to fit in a high-resolution miniaturized image capturing unit. Please refer to FIG. 25, which shows a schematic view of Y11R2 according to the 1st embodiment of the present disclosure.

When an axial distance between the object-side surface of the first lens element and the image-side surface of the eleventh lens element is Td, and an axial distance between an object-side surface of the fifth lens element and the image-side surface of the eighth lens element is Dr9r16, the following condition can be satisfied: 3.0<Td/Dr9r16<6.0. Therefore, it is favorable for enhancing efficiency in space utilization of lens elements at the middle portion of the imaging optical lens system so as to prevent poor space utilization due to an overly dense or sparse arrangement of lens elements.

When the axial distance between the object-side surface of the first lens element and the image-side surface of the eleventh lens element is Td, and a sum of central thicknesses of all lens elements of the imaging optical lens system is ΣCT, the following condition can be satisfied: Td/ΣCT<1.75. Therefore, it is favorable for balancing the thicknesses and space arrangement among lens elements so as to optimize the space utilization of the imaging optical lens system.

When the focal length of the imaging optical lens system is f, and a focal length of the i-th lens element is fi, at least two lens elements of the imaging optical lens system can satisfy the following condition: |f/fi|<0.20, wherein i=1, 2, 3, 4, 5, 6, 7, 8, 9, 10 or 11. Therefore, it is favorable for preventing excessive image corrections or generation of ghost images due to overly large differences of refractive power among lens elements.

When an axial distance between the aperture stop and the image-side surface of the eleventh lens element is Sd, and the axial distance between the object-side surface of the first lens element and the image-side surface of the eleventh lens element is Td, the following condition can be satisfied: 0.60<Sd/Td<1.20. Therefore, it is favorable for adjusting the position of the aperture stop, thereby featuring a large aperture stop, a large field of view and miniaturization. Moreover, the following condition can also be satisfied: 0.75<Sd/Td<1.0.

When an f-number of the imaging optical lens system is Fno, the following condition can be satisfied: 1.0<Fno<2.20. Therefore, it is favorable for further featuring a large aperture stop so as to provide a sufficient amount of incident light. Moreover, the following condition can also be satisfied: 1.0<Fno<2.10. Moreover, the following condition can also be satisfied: 1.20<Fno<2.10.

When a maximum effective radius of the object-side surface of the first lens element is Y1R1, and the maximum effective radius of the image-side surface of the eleventh lens element is Y11R2, the following condition can be satisfied: Y1R1N11R2<0.80. Therefore, it is favorable for effectively controlling optical path ranges at the object side and the image side of the imaging optical lens system so as to enhance space utilization while providing high-resolution image quality. Moreover, the following condition can also be satisfied: Y1R1/Y11R2<0.60. Please refer to FIG. 25, which shows a schematic view of Y1R1 and Y11R2 according to the 1st embodiment of the present disclosure.

When the axial distance between the object-side surface of the first lens element and the image surface is TL, the following condition can be satisfied: 5.0 [mm]<TL<16.0 [mm]. Therefore, it is favorable for controlling the total track length so as to expand product application range and meet market requirements nowadays.

When half of a maximum field of view of the imaging optical lens system is HFOV, the following condition can be satisfied: 35.0 [deg.]<HFOV<100.0 [deg.]. Therefore, it is favorable for having sufficiently large fields of view of the imaging optical lens system so as to meet various usage requirements.

When the maximum image height of the imaging optical lens system is ImgH, the following condition can be satisfied: 5.50 [mm]<ImgH<10.0 [mm]. Therefore, it is favorable for ensuring a sufficient light receiving area and image brightness while balancing with specification requirements.

When the axial distance between the object-side surface of the first lens element and the image surface is TL, and the focal length of the imaging optical lens system is f, the following condition can be satisfied: 0.75<TL/f<1.50. Therefore, it is favorable for effectively adjusting the total track length of the imaging optical lens system so as to satisfy requirements of various applications.

When a maximum value among Abbe numbers of all lens elements of the imaging optical lens system is Vmax, the following condition can be satisfied: 50.0<Vmax<60.0. Therefore, it is favorable for increasing flexibility in arranging lens materials.

When a curvature radius of the image-side surface of the eleventh lens element is R22, and the maximum image height of the imaging optical lens system is ImgH, the following condition can be satisfied: R22/ImgH<1.20. Therefore, it is favorable for further reducing the back focal length, such that the imaging optical lens system can properly utilize the limited space.

When the focal length of the imaging optical lens system is f, a focal length of the tenth lens element is f10, and a focal length of the eleventh lens element is f11, the following condition can be satisfied: 1.20<|f/f10|+|f/f11|<4.0. Therefore, it is favorable for correcting aberrations of the periphery image and reducing the back focal length by lens elements at the image side of the imaging optical lens system.

When a maximum value among central thicknesses of all lens elements of the imaging optical lens system is CTmax, and a minimum value among central thicknesses of all lens elements of the imaging optical lens system is CTmin, the following condition can be satisfied: $1.25 < CTmax/CTmin < 6.0$. Therefore, it is favorable for enhancing manufacturability of lens elements so as to prevent breakage due to an overly small thickness or being poorly molded due to an overly large thickness. Moreover, the following condition can also be satisfied: $1.5 < CTmax/CTmin < 5.0$.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. In addition, the additive may also be coated on the lens surfaces so as to provide abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the imaging optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 26:
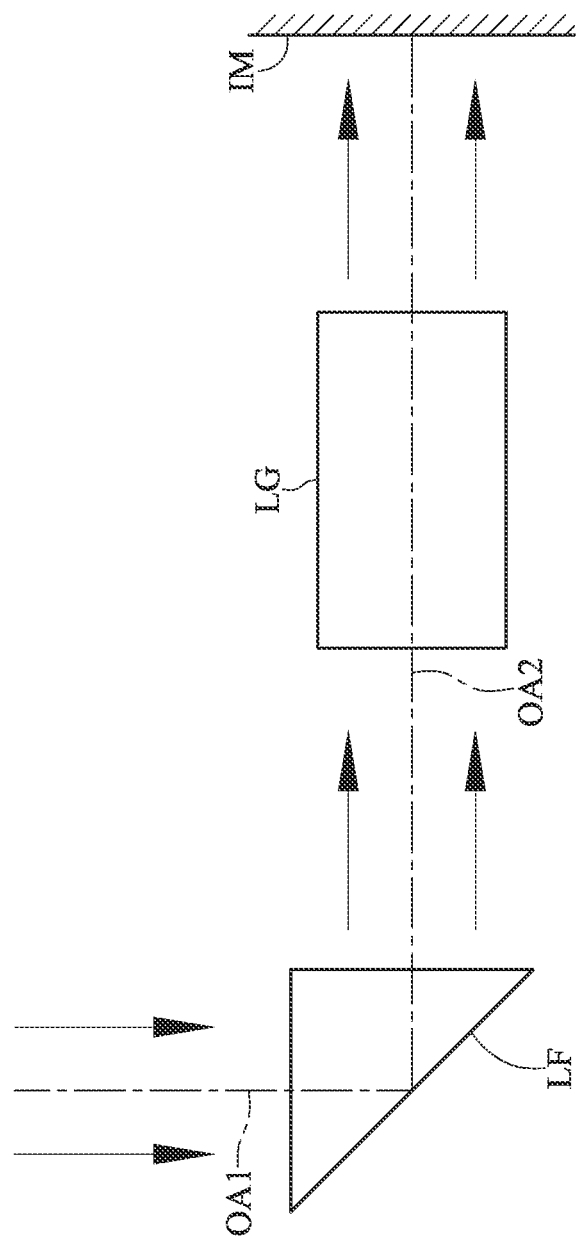
FIG. 26 shows a schematic view of a configuration of a light-folding element in an imaging optical lens system according to one embodiment of the present disclosure.
Figure 27:
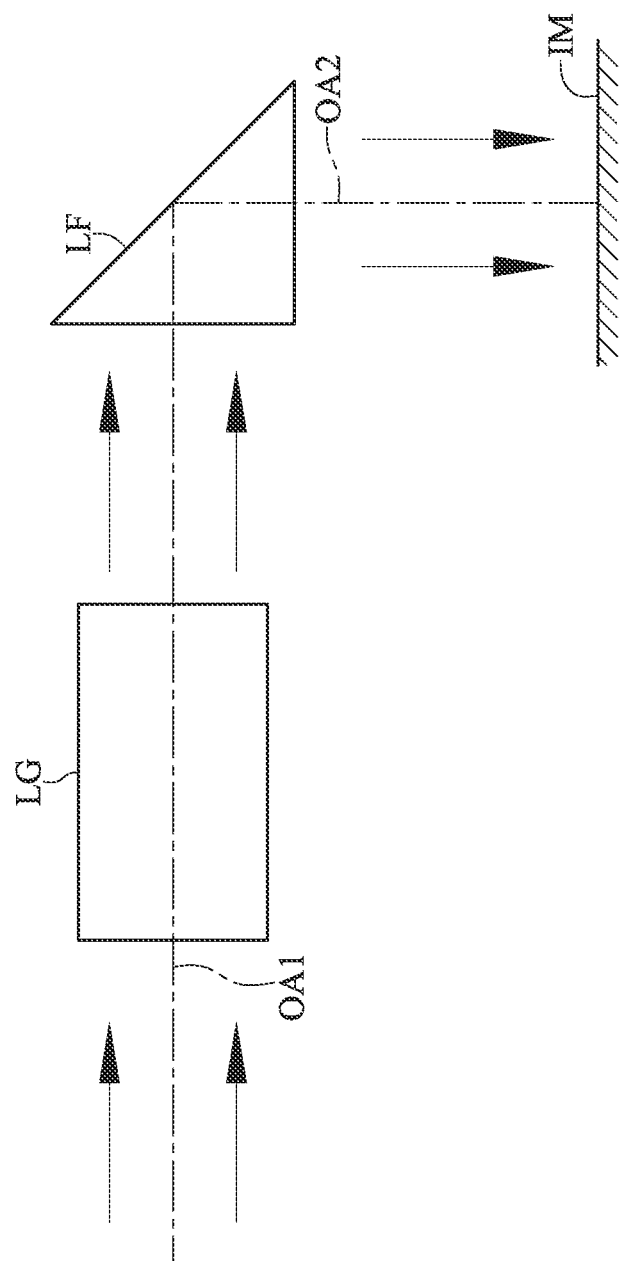
FIG. 27 shows a schematic view of another configuration of a light-folding element in an imaging optical lens system according to one embodiment of the present disclosure.
Figure 28:
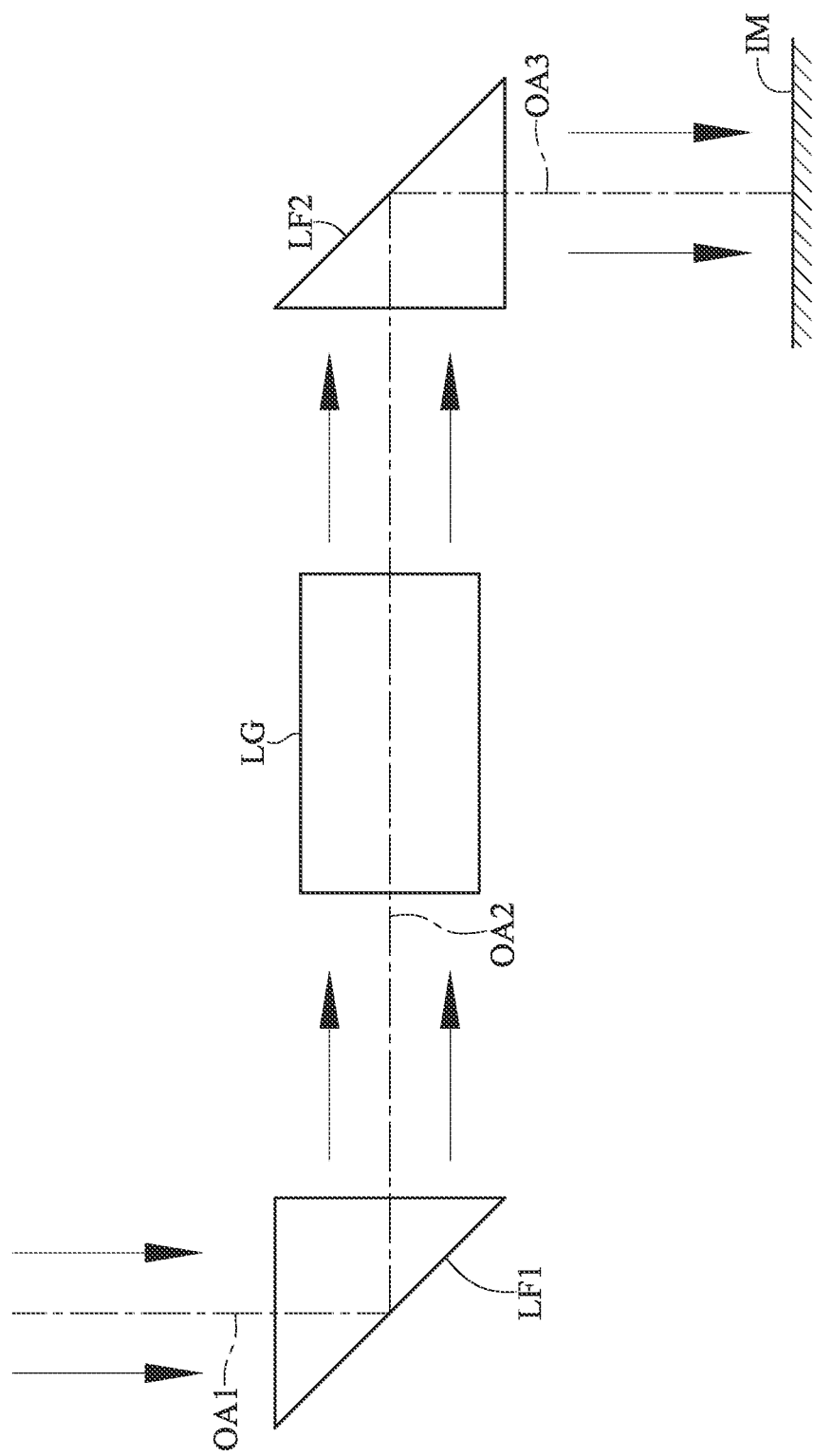
FIG. 28 shows a schematic view of a configuration of two light-folding elements in an imaging optical lens system according to one embodiment of the present disclosure.

According to the present disclosure, at least one light-folding element, such as a prism or a mirror, can be optionally disposed between an imaged object and the image surface on the imaging optical path, such that the imaging optical lens system can be more flexible in space arrangement, and therefore the dimensions of an electronic device is not restricted by the total track length of the imaging optical lens system. Specifically, please refer to FIG. 26 and FIG. 27. FIG. 26 shows a schematic view of a configuration of a light-folding element in an imaging optical lens system according to one embodiment of the present disclosure, and FIG. 27 shows a schematic view of another configuration of a light-folding element in an imaging optical lens system according to one embodiment of the present disclosure. In FIG. 26 and FIG. 27, the imaging optical lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the imaging optical lens system as shown in FIG. 26 or disposed between a lens group LG of the imaging optical lens system and the image surface IM as shown in FIG. 27. Furthermore, please refer to FIG. 28, which shows a schematic view of a configuration of two light-folding elements in an imaging optical lens system according to one embodiment of the present disclosure. In FIG. 28, the imaging optical lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens system, the second light-folding element LF2 is disposed between the lens group LG of the imaging optical lens system and the image surface IM, and the travelling direction of light on the first optical axis OA1 can be the same direction as the travelling direction of light on the third optical axis OA3 as shown in FIG. 28. The imaging optical lens system can be optionally provided with three or more light-folding elements, and the present disclosure is not limited to the type, amount and position of the light-folding elements of the embodiments disclosed in the aforementioned figures.

According to the present disclosure, the imaging optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the present disclosure, the imaging optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
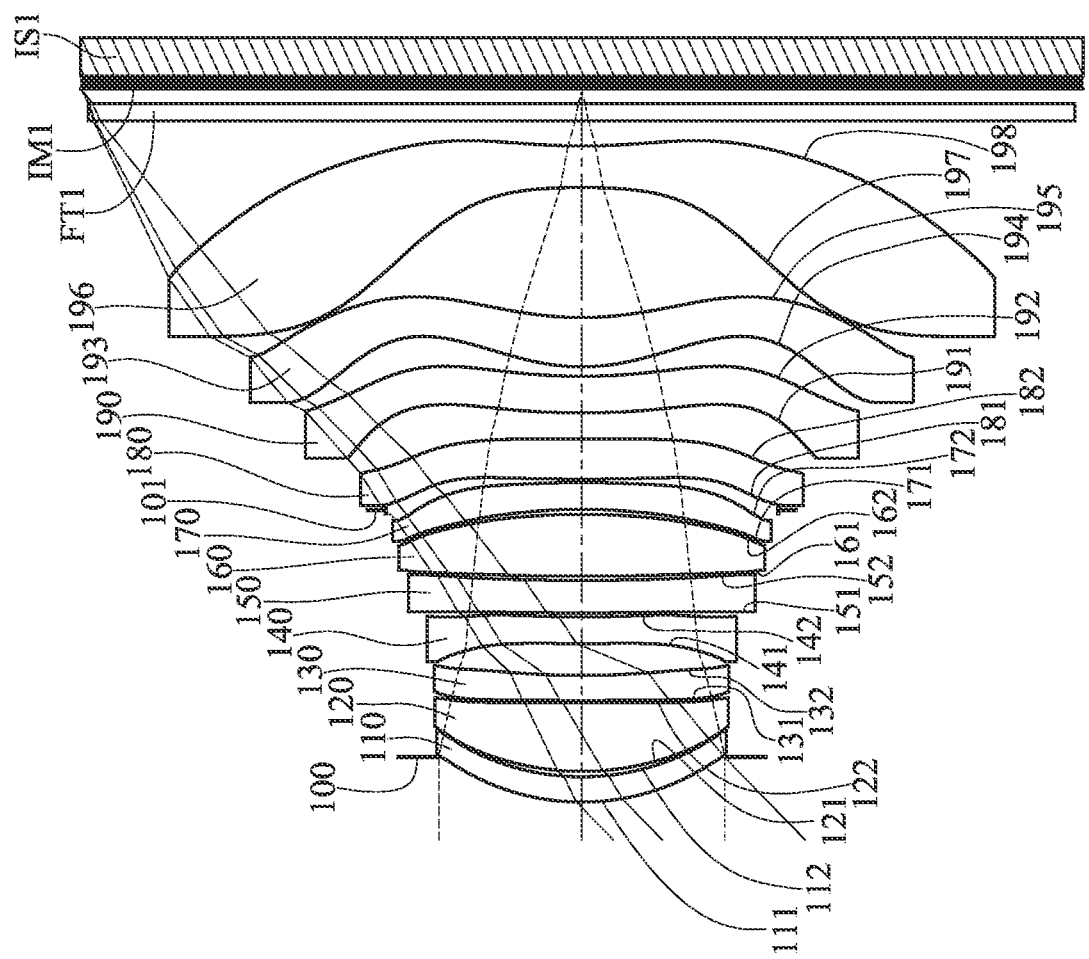
FIG. 1 is a schematic view of an image capturing unit according to the 1st embodiment of the present disclosure.
Figure 2:
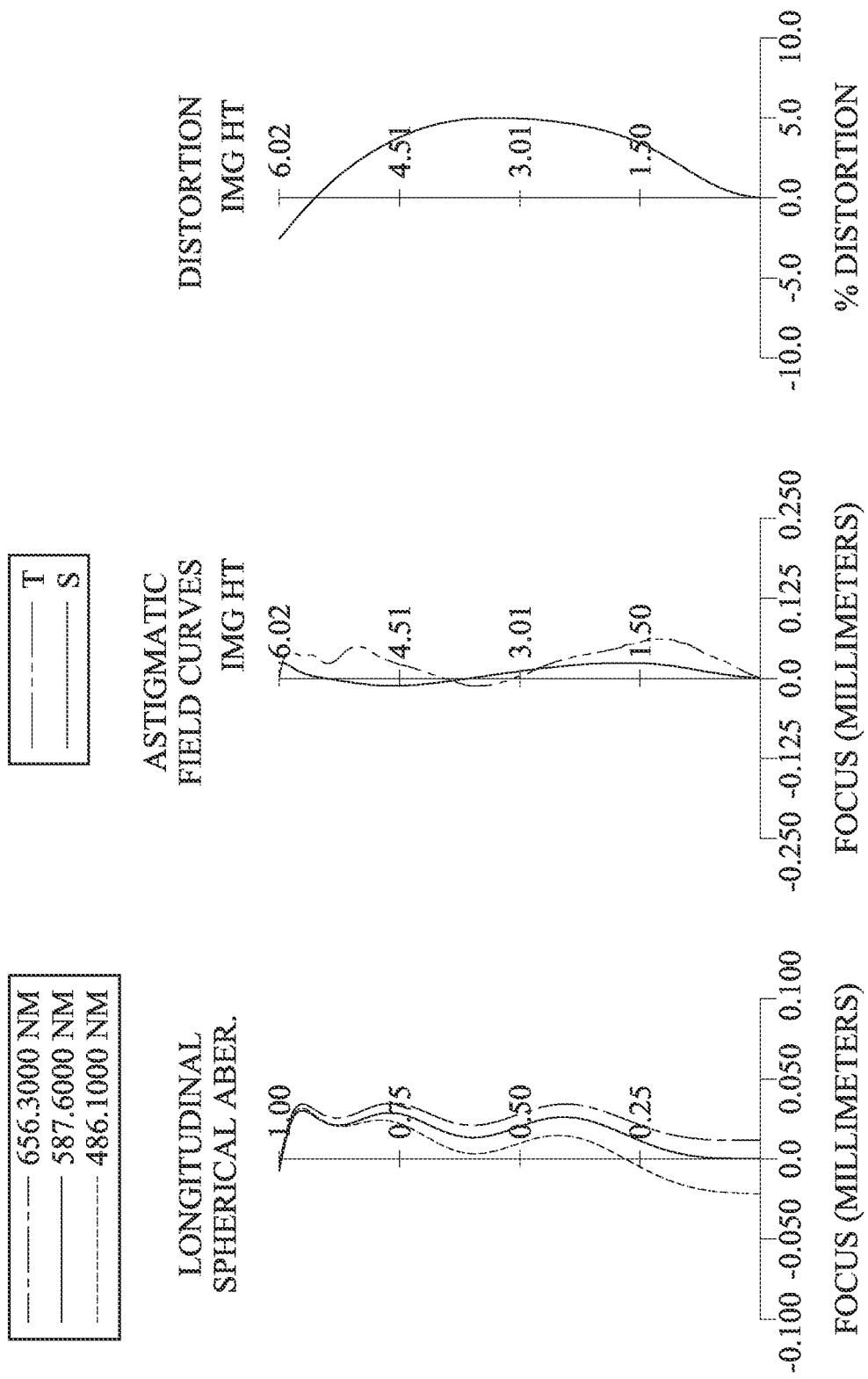
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens system (its reference numeral is omitted) of the present disclosure and an image sensor IS1. The imaging optical lens system includes, in order from an object side to an image side along an optical path, an aperture stop 100, a first lens element 110, a second lens element 120, a third lens element 130, a fourth lens element 140, a fifth lens element 150, a sixth lens element 160, a seventh lens element 170, a stop 101, an eighth lens element 180, a ninth lens element 190, a tenth lens element 193, an eleventh lens element 196, an IR-cut filter FT1 and an image surface IM1. The imaging optical lens system includes eleven lens elements (110, 120, 130, 140, 150, 160, 170, 180, 190, 193 and 196) with no additional lens element disposed between each of the adjacent eleven lens elements, wherein there is an air gap in a paraxial region between each of all adjacent lens elements. In this embodiment, an air gap in a paraxial region between two adjacent lens elements means the two adjacent lens elements are two non-cemented lens elements in paraxial regions thereof.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one concave critical point in an off-axis region thereof. The image-side surface 142 of the fourth lens element 140 has at least one convex critical point and at least one concave critical point in an off-axis region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one convex critical point and at least one concave critical point in an off-axis region thereof. The image-side surface 152 of the fifth lens element 150 has at least one convex critical point in an off-axis region thereof.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric.

The eighth lens element 180 with positive refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has at least one concave critical point in an off-axis region thereof. The image-side surface 182 of the eighth lens element 180 has at least one convex critical point in an off-axis region thereof.

The ninth lens element 190 with negative refractive power has an object-side surface 191 being convex in a paraxial region thereof and an image-side surface 192 being concave in a paraxial region thereof. The ninth lens element 190 is made of plastic material and has the object-side surface 191 and the image-side surface 192 being both aspheric. The object-side surface 191 of the ninth lens element 190 has at least one concave critical point in an off-axis region thereof. The image-side surface 192 of the ninth lens element 190 has at least one convex critical point in an off-axis region thereof.

The tenth lens element 193 with positive refractive power has an object-side surface 194 being convex in a paraxial region thereof and an image-side surface 195 being concave in a paraxial region thereof. The tenth lens element 193 is made of plastic material and has the object-side surface 194 and the image-side surface 195 being both aspheric. The object-side surface 194 of the tenth lens element 193 has at least one concave critical point in an off-axis region thereof. The image-side surface 195 of the tenth lens element 193 has at least one convex critical point in an off-axis region thereof.

The eleventh lens element 196 with negative refractive power has an object-side surface 197 being concave in a paraxial region thereof and an image-side surface 198 being concave in a paraxial region thereof. The eleventh lens element 196 is made of plastic material and has the object-side surface 197 and the image-side surface 198 being both aspheric. The object-side surface 197 of the eleventh lens element 196 has at least one inflection point in an off-axis region thereof. The image-side surface 198 of the eleventh lens element 196 has at least one convex critical point in an off-axis region thereof.

The IR-cut filter FT1 is made of glass material and located between the eleventh lens element 196 and the image surface IM1, and will not affect the focal length of the imaging optical lens system. The image sensor IS1 is disposed on or near the image surface IM1 of the imaging optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18 and 20.

In the imaging optical lens system of the image capturing unit according to the 1st embodiment, when a focal length of the imaging optical lens system is f, an f-number of the imaging optical lens system is Fno, and half of a maximum field of view of the imaging optical lens system is HFOV, these parameters have the following values: f=6.35 millimeters (mm), Fno=1.85, HFOV=44.1 degrees (deg.).

When an axial distance between the object-side surface 111 of the first lens element 110 and the image surface IM1 is TL, the following condition is satisfied: TL=8.58 [mm].

When a maximum image height of the imaging optical lens system is ImgH, the following condition is satisfied: ImgH=6.02 [mm].

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, an Abbe number of the ninth lens element 190 is V9, an Abbe number of the tenth lens element 193 is V10, an Abbe number of the eleventh lens element 196 is V11, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of the ninth lens element 190 is N9, a refractive index of the tenth lens element 193 is N10, and a refractive index of the eleventh lens element 196 is N11, the following conditions are satisfied: V1/N1=23.91; V2/N2=36.26; V3/N3=16.09; V4/N4=10.90; V5/N5=13.21; V6/N6=36.26; V7/N7=36.26; V8/N8=36.26; V9/N9=23.91; V10/N10=36.26; and V11/N11=36.26.

When a total number of lens elements having an Abbe number smaller than 20 in the imaging optical lens system is V20, the following condition is satisfied: V20=1.

When a total number of lens elements having an Abbe number smaller than 24 in the imaging optical lens system is V24, the following condition is satisfied: V24=2.

When a minimum value among Abbe numbers of all lens elements of the imaging optical lens system is Vmin, the following condition is satisfied: Vmin=18.4. In this embodiment, among the first through eleventh lens elements (110-196), the Abbe number of the fourth lens element 140 is smaller than Abbe numbers of the other lens elements, and Vmin is equal to the Abbe number of the fourth lens element 140.

When a maximum value among Abbe numbers of all lens elements of the imaging optical lens system is Vmax, the following condition is satisfied: Vmax=56.0. In this embodiment, among the first through eleventh lens elements (110-196), the Abbe number of the second lens element 120 is substantially equal to the Abbe number of the sixth lens element 160, the Abbe number of the seventh lens element 170, the Abbe number of the eighth lens element 180, the Abbe number of the tenth lens element 193 and the Abbe number of the eleventh lens element 196 and is larger than Abbe numbers of the other lens elements, and Vmax is equal to the Abbe number of the second lens element 120, the Abbe number of the sixth lens element 160, the Abbe number of the seventh lens element 170, the Abbe number of the eighth lens element 180, the Abbe number of the tenth lens element 193 or the Abbe number of the eleventh lens element 196.

When a maximum effective radius of the object-side surface 111 of the first lens element 110 is Y1R1, and a maximum effective radius of the image-side surface 198 of the eleventh lens element 196 is Y11R2, the following condition is satisfied: Y1R1N11R2=0.35.

When a vertical distance between a critical point on the image-side surface 195 of the tenth lens element 193 and the optical axis is Yc10R2, the following condition is satisfied: Yc10R2=1.99 [mm].

When a vertical distance between a critical point on the image-side surface 198 of the eleventh lens element 196 and the optical axis is Yc11R2, the following condition is satisfied: Yc11R2=1.38 [mm].

When the vertical distance between the critical point on the image-side surface 195 of the tenth lens element 193 and the optical axis is Yc10R2, and the vertical distance between the critical point on the image-side surface 198 of the eleventh lens element 196 and the optical axis is Yc11R2, the following condition is satisfied: Yc11R2Nc10R2=0.69.

When the vertical distance between the critical point on the image-side surface 198 of the eleventh lens element 196 and the optical axis is Yc11R2, and the focal length of the imaging optical lens system is f, the following condition is satisfied: Yc11R2/f=0.22.

When a curvature radius of the image-side surface 198 of the eleventh lens element 196 is R22, and the maximum image height of the imaging optical lens system is ImgH, the following condition is satisfied: R22/ImgH=1.16. When the focal length of the imaging optical lens system is f, and a curvature radius of a lens surface located at an image side of a maximum spacing distance is Ri, the following condition is satisfied: f/|Ri|=0.69. In this embodiment, a maximum spacing distance is a maximum distance in a paraxial region between two adjacent lens surfaces of two adjacent lens elements. In this embodiment, among distances between adjacent two of the first through eleventh lens elements (110-196), the maximum spacing distance is located between the tenth lens element 193 and the eleventh lens element 196. Therefore, a lens surface located at an object side of the maximum spacing distance is the image-side surface 195 of the tenth lens element 193, the lens surface located at the image side of the maximum spacing distance is the object-side surface 197 of the eleventh lens element 196, and Ri is a curvature radius of the object-side surface 197 of the eleventh lens element 196.

When a maximum value among central thicknesses of all lens elements of the imaging optical lens system is CTmax, and a minimum value among central thicknesses of all lens elements of the imaging optical lens system is CTmin, the following condition is satisfied: CTmax/CTmin=2.73. In this embodiment, among the first through eleventh lens elements (110-196), a central thickness of the second lens element 120 is larger than central thicknesses of the other lens elements of the imaging optical lens system, and CTmax is equal to the central thickness of the second lens element 120. In this embodiment, among the first through eleventh lens elements (110-196), a central thickness of the third lens element 130 is smaller than central thicknesses of the other lens elements of the imaging optical lens system, and CTmin is equal to the central thickness of the third lens element 130.

When a maximum value among axial distances between each of all adjacent lens elements of the imaging optical lens system is ATmax, and a minimum value among axial distances between each of all adjacent lens elements of the imaging optical lens system is ATmin, the following condition is satisfied: ATmax/ATmin=52.13. In this embodiment, an axial distance between two adjacent lens elements is a distance in a paraxial region between two adjacent lens surfaces of the two adjacent lens elements. In this embodiment, among the first through eleventh lens elements (110-196), an axial distance between the tenth lens element 193 and the eleventh lens element 196 is larger than the axial distances between all the other two adjacent lens elements of the imaging optical lens system, and ATmax is equal to the axial distance between the tenth lens element 193 and the eleventh lens element 196. In this embodiment, among the first through eleventh lens elements (110-196), an axial distance between the second lens element 120 and the third lens element 130 is smaller than the axial distances between all the other two adjacent lens elements of the imaging optical lens system, and ATmin is equal to the axial distance between the second lens element 120 and the third lens element 130.

When an axial distance between the object-side surface 111 of the first lens element 110 and the image-side surface 198 of the eleventh lens element 196 is Td, and a sum of central thicknesses of all lens elements of the imaging optical lens system is ΣCT, the following condition is satisfied: Td/ΣCT=1.51. In this embodiment, ΣCT is a sum of central thicknesses of the first lens element 110, the second lens element 120, the third lens element 130, the fourth lens element 140, the fifth lens element 150, the sixth lens element 160, the seventh lens element 170, the eighth lens element 180, the ninth lens element 190, the tenth lens element 193 and the eleventh lens element 196.

When an axial distance between the aperture stop 100 and the image-side surface 198 of the eleventh lens element 196 is Sd, and the axial distance between the object-side surface 111 of the first lens element 110 and the image-side surface 198 of the eleventh lens element 196 is Td, the following condition is satisfied: Sd/Td=0.93.

When the axial distance between the object-side surface 111 of the first lens element 110 and the image-side surface 198 of the eleventh lens element 196 is Td, and an axial distance between the object-side surface 151 of the fifth lens element 150 and the image-side surface 182 of the eighth lens element 180 is Dr9r16, the following condition is satisfied: Td/Dr9r16=3.77.

When the axial distance between the object-side surface 111 of the first lens element 110 and the image surface IM1 is TL, and an entrance pupil diameter of the imaging optical lens system is EPD, the following condition is satisfied: TL/EPD=2.50.

When the axial distance between the object-side surface 111 of the first lens element 110 and the image surface IM1 is TL, and the maximum image height of the imaging optical lens system is ImgH, the following condition is satisfied: TL/ImgH=1.43.

When the axial distance between the object-side surface 111 of the first lens element 110 and the image surface IM1 is TL, and the focal length of the imaging optical lens system is f, the following condition is satisfied: TL/f=1.35.

When the axial distance between the object-side surface 111 of the first lens element 110 and the image surface IM1 is TL, and the maximum effective radius of the image-side surface 198 of the eleventh lens element 196 is Y11R2, the following condition is satisfied: TLN11R2=1.73.

When the focal length of the imaging optical lens system is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a focal length of the eighth lens element 180 is f8, a focal length of the ninth lens element 190 is f9, a focal length of the tenth lens element 193 is f10, and a focal length of the eleventh lens element 196 is f11, the following conditions are satisfied: |f/f1|=0.09; |f/f2|=0.97; |f/f3|=0.33; |f/f4|=0.17; |f/f5|=0.08; |f/f6|=0.53; |f/f7|=0.30; |f/f8|=0.14; |f/f9|=0.16; |f/f10|=0.63; and |f/f11|=0.88.

When the focal length of the imaging optical lens system is f, the focal length of the second lens element 120 is f2, and the focal length of the third lens element 130 is f3, the following condition is satisfied: |f/f1|+|f/f2|+|f/f3|=1.39.

When the focal length of the imaging optical lens system is f, the focal length of the tenth lens element 193 is f10, and the focal length of the eleventh lens element 196 is f11, the following condition is satisfied: |f/f10|+|f/f11|=1.51.

When the maximum image height of the imaging optical lens system is ImgH, and an axial distance between the image-side surface 198 of the eleventh lens element 196 and the image surface IM1 is BL, the following condition is satisfied: ImgH/BL=8.72.

The detailed optical data of the 1st embodiment are shown in Table 1 and the aspheric surface data are shown in Table 2 below.

TABLE 1

1st Embodiment
f = 6.35 mm, Fno = 1.85, HFOV = 44.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.543 | | | | |
| 2 | Lens 1 | 2.880 | (ASP) | 0.304 | Plastic | 1.566 | 37.4 | 73.17 |
| 3 | | 2.977 | (ASP) | 0.065 | | | | |
| 4 | Lens 2 | 3.281 | (ASP) | 0.823 | Plastic | 1.544 | 56.0 | 6.52 |
| 5 | | 40.287 | (ASP) | 0.030 | | | | |
| 6 | Lens 3 | 45.989 | (ASP) | 0.301 | Plastic | 1.614 | 26.0 | −19.39 |
| 7 | | 9.431 | (ASP) | 0.383 | | | | |
| 8 | Lens 4 | 27.922 | (ASP) | 0.320 | Plastic | 1.686 | 18.4 | −36.82 |
| 9 | | 13.200 | (ASP) | 0.050 | | | | |
| 10 | Lens 5 | 103.229 | (ASP) | 0.391 | Plastic | 1.650 | 21.8 | −76.18 |
| 11 | | 33.403 | (ASP) | 0.050 | | | | |
| 12 | Lens 6 | 31.381 | (ASP) | 0.745 | Plastic | 1.544 | 56.0 | 11.88 |
| 13 | | −8.069 | (ASP) | 0.060 | | | | |
| 14 | Lens 7 | −6.561 | (ASP) | 0.321 | Plastic | 1.544 | 56.0 | −21.06 |
| 15 | | −15.619 | (ASP) | −0.331 | | | | |
| 16 | Stop | Plano | | 0.372 | | | | |
| 17 | Lens 8 | 21.545 | (ASP) | 0.483 | Plastic | 1.544 | 56.0 | 45.91 |
| 18 | | 155.666 | (ASP) | 0.315 | | | | |
| 19 | Lens 9 | 13.462 | (ASP) | 0.440 | Plastic | 1.566 | 37.4 | −39.16 |
| 20 | | 8.276 | (ASP) | 0.112 | | | | |
| 21 | Lens 10 | 2.399 | (ASP) | 0.592 | Plastic | 1.544 | 56.0 | 10.04 |
| 22 | | 3.905 | (ASP) | 1.564 | | | | |
| 23 | Lens 11 | −9.233 | (ASP) | 0.500 | Plastic | 1.544 | 56.0 | −7.23 |
| 24 | | 6.985 | (ASP) | 0.300 | | | | |
| 25 | IR-cut Filter | Plano | | 0.210 | Glass | 1.517 | 64.2 | — |
| 26 | | Plano | | 0.180 | | | | |
| 27 | Image | Plano | | — | | | | |

Note:
Reference wavelength is 587.6 nm (d-line).
An effective radius of the image-side surface 142 (Surface 9) is 1.858 mm.
An effective radius of the stop 101 (Surface 16) is 2.360 mm.

TABLE 2

Aspheric Coefficients

| Surface # | 2 | 3 | 4 | 5 | 6 |
|---|---|---|---|---|---|
| k= | 5.1058E−02 | −2.4946E−02 | −7.7148E−01 | 9.9000E+01 | 7.1369E+01 |
| A4= | 5.8799E−03 | 1.6518E−02 | 1.8460E−02 | −1.8802E−02 | −2.1642E−02 |
| A6= | −8.4031E−03 | −2.6482E−02 | −3.8066E−02 | −3.7932E−03 | 1.8767E−02 |
| A8= | 6.0044E−03 | 1.6673E−02 | 3.8810E−02 | 4.7613E−02 | 1.5759E−02 |
| A10= | −1.9267E−03 | −4.2290E−03 | −2.3715E−02 | −5.4101E−02 | −3.1141E−02 |
| A12= | 2.0378E−04 | 3.5160E−04 | 9.2707E−03 | 2.7436E−02 | 1.7902E−02 |
| A14= | — | — | −1.9940E−03 | −6.5635E−03 | −4.4313E−03 |
| A16= | — | — | 1.7342E−04 | 5.9973E−04 | 4.0820E−04 |

| Surface # | 7 | 8 | 9 | 10 | 11 |
|---|---|---|---|---|---|
| k= | 3.4204E+00 | 1.7454E+01 | 2.8891E+01 | 9.0086E+01 | 3.1721E+01 |
| A4= | −5.7701E−03 | −2.1487E−02 | 2.3264E−02 | 3.7239E−02 | −9.4173E−04 |
| A6= | 2.2464E−03 | −2.6349E−02 | −1.2416E−01 | −9.1224E−02 | 6.5001E−03 |
| A8= | 2.9714E−04 | 3.7268E−02 | 1.8049E−01 | 1.2431E−01 | −1.0091E−02 |
| A10= | −4.4084E−03 | −3.2426E−02 | −1.5795E−01 | −1.0499E−01 | 1.0002E−02 |
| A12= | 2.3683E−03 | 1.5362E−02 | 8.2259E−02 | 5.3084E−02 | −6.1196E−03 |
| A14= | −3.3725E−04 | −3.5024E−03 | −2.4463E−02 | −1.5472E−02 | 2.2721E−03 |
| A16= | — | 2.9747E−04 | 3.8299E−03 | 2.3918E−03 | −4.9814E−04 |
| A18= | — | — | −2.4489E−04 | −1.5181E−04 | 5.9279E−05 |
| A20= | — | — | — | — | −2.9581E−06 |

| Surface # | 12 | 13 | 14 | 15 | 17 |
|---|---|---|---|---|---|
| k= | 0.0000E+00 | −2.2495E−01 | −9.1467E+00 | 3.7022E+01 | 2.7770E+01 |
| A4= | −3.1004E−03 | −2.9042E−02 | −5.6778E−02 | −4.5056E−02 | −2.6103E−02 |
| A6= | 6.9087E−03 | 1.1508E−01 | 2.0318E−01 | 1.3026E−01 | 5.2828E−02 |
| A8= | −1.0170E−02 | −1.6915E−01 | −2.8271E−01 | −1.5216E−01 | −5.6395E−02 |
| A10= | 9.7411E−03 | 1.2456E−01 | 2.0432E−01 | 9.4342E−02 | 3.1163E−02 |

TABLE 2-continued

Aspheric Coefficients

| | | | | | |
|---|---|---|---|---|---|
| A12= | −5.7933E−03 | −5.2311E−02 | −8.6561E−02 | −3.5754E−02 | −1.0662E−02 |
| A14= | 2.0739E−03 | 1.3077E−02 | 2.2408E−02 | 8.5634E−03 | 2.2918E−03 |
| A16= | −4.3628E−04 | −1.9156E−03 | −3.4978E−03 | −1.2673E−03 | −2.9646E−04 |
| A18= | 4.9843E−05 | 1.4991E−04 | 3.0263E−04 | 1.0573E−04 | 2.0938E−05 |
| A20= | −2.3826E−06 | −4.7196E−06 | −1.1128E−05 | −3.7837E−06 | −6.1819E−07 |

| Surface # | 18 | 19 | 20 | 21 | 22 |
|---|---|---|---|---|---|
| k= | −1.0000E+00 | −4.7019E+01 | −4.8100E+00 | −1.1986E+00 | −8.3843E+00 |
| A4= | −8.6016E−03 | 3.5420E−02 | 2.3770E−02 | −3.0509E−02 | −4.3547E−04 |
| A6= | −5.9357E−03 | −2.2873E−02 | −2.3808E−02 | 1.4436E−03 | −2.2401E−03 |
| A8= | 3.8303E−03 | 3.8990E−03 | 8.2177E−03 | −3.9213E−04 | −4.5585E−04 |
| A10= | −1.1360E−03 | 1.0368E−03 | −1.7796E−03 | 8.0440E−05 | 2.7610E−04 |
| A12= | 1.8924E−05 | −7.3948E−04 | 2.3999E−04 | −1.0296E−05 | −5.1131E−05 |
| A14= | 6.1372E−05 | 1.8086E−04 | −1.9053E−05 | 9.6585E−07 | 5.0697E−06 |
| A16= | −1.2878E−05 | −2.3183E−05 | 8.1498E−07 | −5.4492E−08 | −2.8913E−07 |
| A18= | 1.0386E−06 | 1.5448E−06 | −1.5024E−08 | 1.5216E−09 | 8.9473E−09 |
| A20= | −3.0180E−08 | −4.2007E−08 | 3.6696E−11 | −1.5750E−11 | −1.1638E−10 |

| Surface # | 23 | 24 |
|---|---|---|
| k= | 1.3821E+00 | −1.9329E−01 |
| A4= | −4.6921E−02 | −2.1220E−02 |
| A6= | 3.4155E−03 | −3.4045E−04 |
| A8= | 6.2691E−04 | 6.0890E−04 |
| A10= | −1.2142E−04 | −9.8570E−05 |
| A12= | 9.0123E−06 | 8.2204E−06 |
| A14= | −3.4734E−07 | −4.1063E−07 |
| A16= | 6.6209E−09 | 1.2430E−08 |
| A18= | −3.7402E−11 | −2.1073E−10 |
| A20= | −3.2738E−13 | 1.5334E−12 |

In Table 1, the curvature radius, the thickness and the focal length are shown in millimeters (mm). Surface numbers 0-27 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
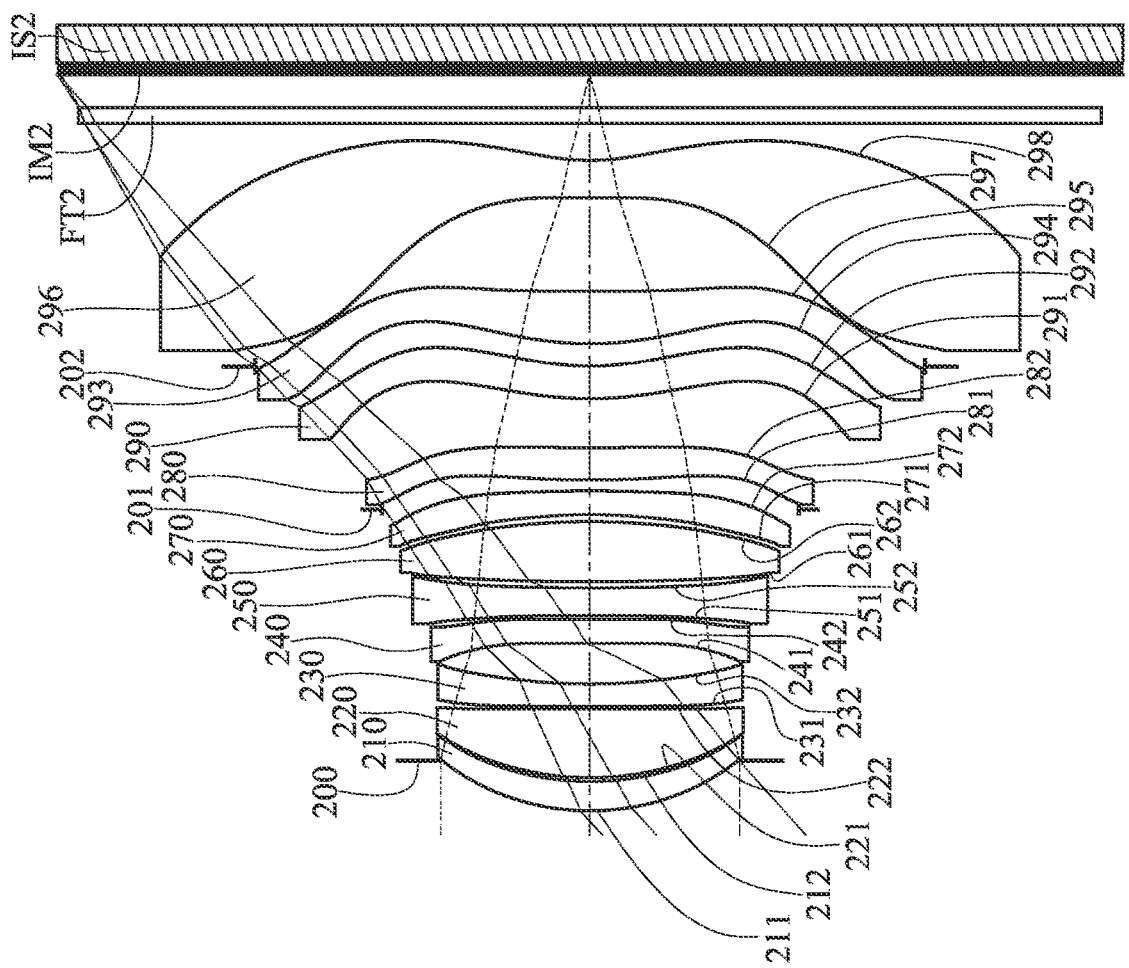
FIG. 3 is a schematic view of an image capturing unit according to the 2nd embodiment of the present disclosure.
Figure 4:
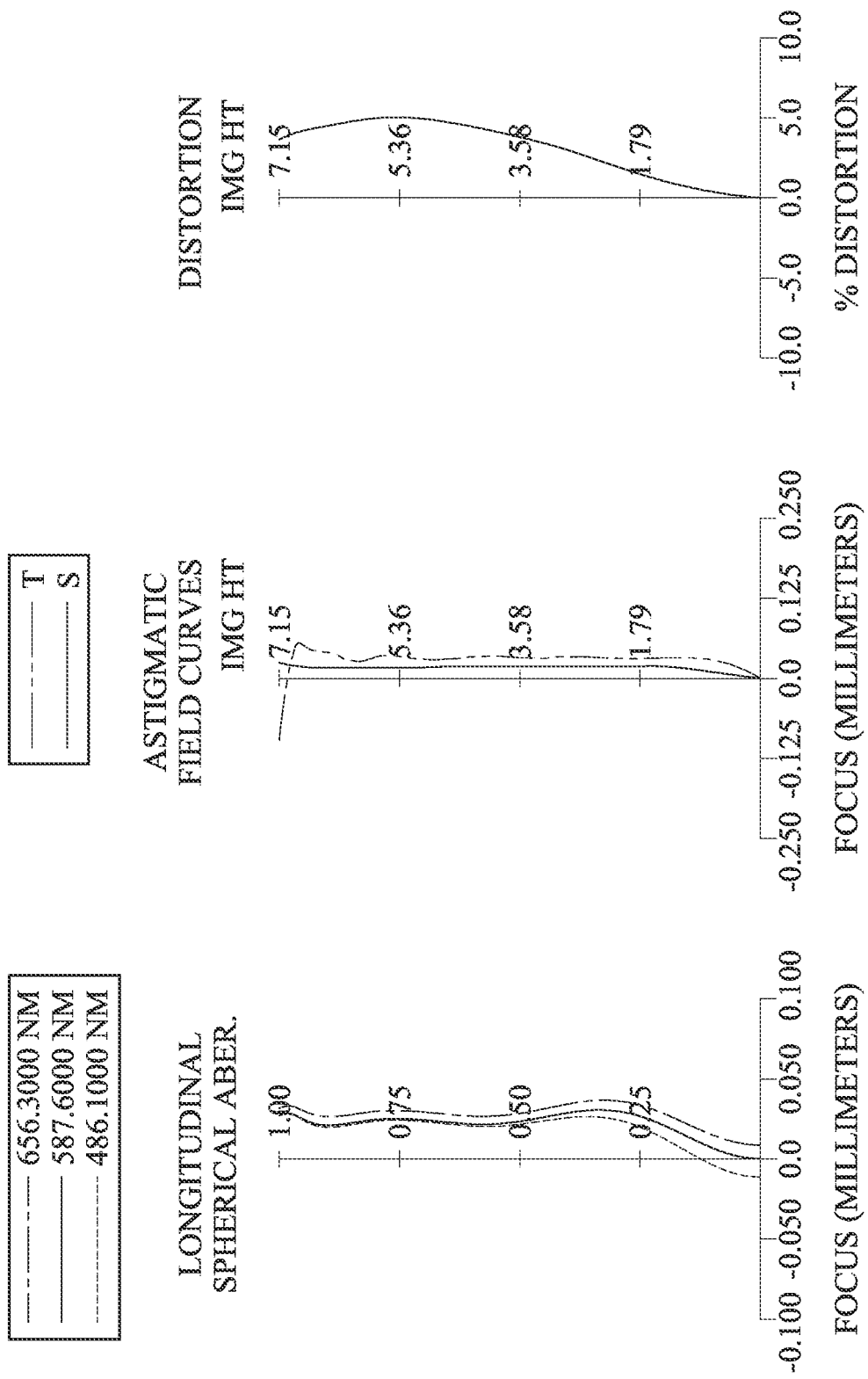
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens system (its reference numeral is omitted) of the present disclosure and an image sensor IS2. The imaging optical lens system includes, in order from an object side to an image side along an optical path, an aperture stop 200, a first lens element 210, a second lens element 220, a third lens element 230, a fourth lens element 240, a fifth lens element 250, a sixth lens element 260, a seventh lens element 270, a stop 201, an eighth lens element 280, a ninth lens element 290, a tenth lens element 293, a stop 202, an eleventh lens element 296, an IR-cut filter FT2 and an image surface IM2. The imaging optical lens system includes eleven lens elements (210, 220, 230, 240, 250, 260, 270, 280, 290, 293 and 296) with no additional lens element disposed between each of the adjacent eleven lens elements, wherein there is an air gap in a paraxial region between each of all adjacent lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The image-side surface 222 of the second lens element 220 has at least one convex critical point and at least one concave critical point in an off-axis region thereof.

The third lens element 230 with negative refractive power has the object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one concave critical point in an off-axis region thereof. The image-side surface 242 of the fourth lens element 240 has at least one convex critical point and at least one concave critical point in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric.

The seventh lens element 270 with negative refractive power has an object-side surface 271 being concave in a paraxial region thereof and an image-side surface 272 being convex in a paraxial region thereof. The seventh lens element 270 is made of plastic material and has the object-side surface 271 and the image-side surface 272 being both aspheric.

The eighth lens element 280 with positive refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has at least one concave critical point in an off-axis region thereof. The image-side surface 282 of the eighth lens element 280 has at least one convex critical point in an off-axis region thereof.

The ninth lens element 290 with negative refractive power has an object-side surface 291 being convex in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has at least one concave critical point in an off-axis region thereof. The image-side surface 292 of the ninth lens element 290 has at least one convex critical point in an off-axis region thereof.

The tenth lens element 293 with positive refractive power has an object-side surface 294 being convex in a paraxial region thereof and an image-side surface 295 being convex in a paraxial region thereof. The tenth lens element 293 is made of plastic material and has the object-side surface 294 and the image-side surface 295 being both aspheric. The object-side surface 294 of the tenth lens element 293 has at least one concave critical point in an off-axis region thereof. The image-side surface 295 of the tenth lens element 293 has at least one convex critical point and at least one concave critical point in an off-axis region thereof.

The eleventh lens element 296 with negative refractive power has an object-side surface 297 being convex in a paraxial region thereof and an image-side surface 298 being concave in a paraxial region thereof. The eleventh lens element 296 is made of plastic material and has the object-side surface 297 and the image-side surface 298 being both aspheric. The object-side surface 297 of the eleventh lens element 296 has at least one inflection point in an off-axis region thereof. The object-side surface 297 of the eleventh lens element 296 has at least one concave critical point in the off-axis region thereof. The image-side surface 298 of the eleventh lens element 296 has at least one convex critical point in an off-axis region thereof.

The IR-cut filter FT2 is made of glass material and located between the eleventh lens element 296 and the image surface IM2, and will not affect the focal length of the imaging optical lens system. The image sensor IS2 is disposed on or near the image surface IM2 of the imaging optical lens system.

The detailed optical data of the 2nd embodiment are shown in Table 3 and the aspheric surface data are shown in Table 4 below.

TABLE 3

2nd Embodiment
f = 7.70 mm, Fno = 1.92, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.670 | | | | |
| 2 | Lens 1 | 3.372 | (ASP) | 0.392 | Plastic | 1.544 | 56.0 | 42.05 |
| 3 | | 3.793 | (ASP) | 0.050 | | | | |
| 4 | Lens 2 | 3.871 | (ASP) | 0.928 | Plastic | 1.544 | 56.0 | 7.19 |
| 5 | | 358.362 | (ASP) | 0.030 | | | | |
| 6 | Lens 3 | 42.275 | (ASP) | 0.300 | Plastic | 1.614 | 26.0 | −14.92 |
| 7 | | 7.506 | (ASP) | 0.558 | | | | |
| 8 | Lens 4 | 98.129 | (ASP) | 0.320 | Plastic | 1.642 | 22.5 | 5539.21 |
| 9 | | 100.786 | (ASP) | 0.053 | | | | |
| 10 | Lens 5 | −30.627 | (ASP) | 0.370 | Plastic | 1.614 | 26.0 | −25.79 |
| 11 | | 32.902 | (ASP) | 0.082 | | | | |
| 12 | Lens 6 | 33.300 | (ASP) | 0.803 | Plastic | 1.544 | 56.0 | 13.82 |
| 13 | | −9.625 | (ASP) | 0.095 | | | | |
| 14 | Lens 7 | −7.646 | (ASP) | 0.320 | Plastic | 1.559 | 40.4 | −22.89 |
| 15 | | −19.300 | (ASP) | −0.254 | | | | |
| 16 | Stop | Plano | | 0.398 | | | | |
| 17 | Lens 8 | 15.640 | (ASP) | 0.437 | Plastic | 1.544 | 56.0 | 35.43 |
| 18 | | 82.134 | (ASP) | 0.656 | | | | |
| 19 | Lens 9 | 5.226 | (ASP) | 0.440 | Plastic | 1.566 | 37.4 | −26.46 |
| 20 | | 3.756 | (ASP) | 0.303 | | | | |
| 21 | Lens 10 | 4.502 | (ASP) | 0.710 | Plastic | 1.544 | 56.0 | 7.94 |
| 22 | | −100.000 | (ASP) | −1.016 | | | | |
| 23 | Stop | Plano | | 2.267 | | | | |
| 24 | Lens 11 | 26.646 | (ASP) | 0.500 | Plastic | 1.544 | 56.0 | −5.67 |
| 25 | | 2.744 | (ASP) | 0.500 | | | | |
| 26 | IR-cut Filter | Plano | | 0.210 | Glass | 1.517 | 64.2 | — |
| 27 | | Plano | | 0.439 | | | | |
| 28 | Image | Plano | | — | | | | |

Note:
Reference wavelength is 587.6 nm (d-line).
An effective radius of the stop 201 (Surface 16) is 2.800 mm.
An effective radius of the stop 202 (Surface 23) is 4.500 mm.

TABLE 4

Aspheric Coefficients

| Surface # | 2 | 3 | 4 | 5 | 6 |
|---|---|---|---|---|---|
| k= | 1.1926E−01 | 7.6470E−03 | −8.6152E−01 | 9.0000E+01 | 6.7740E+01 |
| A4= | −1.8840E−04 | −2.5469E−03 | −9.3591E−04 | −1.2022E−02 | −1.6530E−02 |
| A6= | 1.2159E−03 | 3.6118E−03 | 3.1263E−03 | 1.2775E−02 | 1.5069E−02 |
| A8= | −7.2618E−04 | −2.6841E−03 | −2.6644E−03 | −7.3187E−03 | −7.5112E−03 |
| A10= | 2.5275E−04 | 9.6756E−04 | 1.0783E−03 | 2.6126E−03 | 2.5483E−03 |
| A12= | −3.2303E−05 | −1.1567E−04 | −2.0433E−04 | −5.5399E−04 | −5.2174E−04 |
| A14= | — | — | 2.2658E−05 | 6.7987E−05 | 6.3505E−05 |
| A16= | — | — | −1.5630E−06 | −4.0658E−06 | −3.9404E−06 |

| Surface # | 7 | 8 | 9 | 10 | 11 |
|---|---|---|---|---|---|
| k= | 3.0184E+00 | −1.0000E+00 | 2.4808E+01 | 9.0000E+01 | 7.4218E+01 |
| A4= | −8.0350E−03 | −1.1260E−02 | 1.0875E−02 | 1.7665E−02 | 2.4639E−04 |
| A6= | 2.9118E−03 | −5.5671E−03 | −3.2374E−02 | −3.3353E−02 | −6.4590E−03 |
| A8= | −7.4411E−04 | 1.1194E−03 | 2.1431E−02 | 2.7011E−02 | 8.3403E−03 |
| A10= | 9.2069E−05 | 2.9352E−04 | −8.8352E−03 | −1.2849E−02 | −4.7325E−03 |
| A12= | −1.4908E−06 | −1.9997E−04 | 2.4744E−03 | 3.8423E−03 | 1.5527E−03 |
| A14= | 5.8901E−07 | 4.7881E−05 | −4.3734E−04 | −7.0584E−04 | −3.1141E−04 |
| A16= | — | −4.3597E−06 | 4.3736E−05 | 7.2300E−05 | 3.7756E−05 |
| A18= | — | — | −1.9020E−06 | −3.1612E−06 | −2.5555E−06 |
| A20= | — | — | — | — | 7.4629E−08 |

| Surface # | 12 | 13 | 14 | 15 | 17 |
|---|---|---|---|---|---|
| k= | 0.0000E+00 | −1.9175E−01 | −1.0725E+01 | 0.0000E+00 | −4.0984E+01 |
| A4= | −1.5635E−03 | −1.4516E−02 | −2.4562E−02 | −6.9942E−03 | 1.4859E−02 |
| A6= | 2.2326E−03 | 3.6131E−02 | 7.0602E−02 | 2.9633E−02 | −1.8938E−02 |
| A8= | −1.9968E−03 | −3.3382E−02 | −7.4116E−02 | −2.9485E−02 | 1.2307E−02 |
| A10= | 1.2095E−03 | 1.5465E−02 | 4.2191E−02 | 1.2368E−02 | −6.5663E−03 |
| A12= | −4.5215E−04 | −4.0850E−03 | −1.5632E−02 | −1.4356E−03 | 2.4687E−03 |
| A14= | 1.0192E−04 | 6.4232E−04 | 4.1248E−03 | −1.0370E−03 | −6.0673E−04 |
| A16= | −1.3480E−05 | −5.9187E−05 | −7.9956E−04 | 6.3491E−04 | 9.2906E−05 |
| A18= | 9.6859E−07 | 2.9135E−06 | 1.1191E−04 | −1.8715E−04 | −8.2716E−06 |
| A20= | −2.9160E−08 | −5.7661E−08 | −1.0644E−05 | 3.5456E−05 | 3.5583E−07 |
| A22= | — | — | 6.1051E−07 | −4.5879E−06 | −1.6696E−09 |
| A24= | — | — | −1.5828E−08 | 4.0555E−07 | −2.6190E−10 |
| A26= | — | — | — | −2.3503E−08 | — |
| A28= | — | — | — | 8.0646E−10 | — |
| A30= | — | — | — | −1.2440E−11 | — |

| Surface # | 18 | 19 | 20 | 21 | 22 |
|---|---|---|---|---|---|
| k= | −1.0000E+00 | 0.0000E+00 | −1.7659E+01 | −7.1450E−01 | −1.0000E+00 |
| A4= | 1.7924E+00 | 1.0535E+00 | 2.7329E−02 | −3.9156E−03 | 1.2910E−02 |
| A6= | −2.4934E+01 | −3.7514E+01 | −2.8509E−02 | −3.1550E−03 | −4.6542E−03 |
| A8= | 1.5149E+02 | 1.8468E+02 | 1.2697E−02 | 1.3054E−03 | 3.7636E−03 |
| A10= | −6.2518E+02 | −5.1138E+01 | −3.5298E−03 | −5.5290E−04 | −2.3468E−03 |
| A12= | 1.7467E+03 | −4.4375E+03 | 6.4762E−04 | 1.3290E−04 | 8.1832E−04 |
| A14= | −3.2537E+03 | 2.7889E+04 | −8.1036E−05 | −9.3874E−06 | −1.8144E−04 |
| A16= | 3.9414E+03 | −9.5794E+04 | 6.9683E−06 | −3.3130E−06 | 2.7564E−05 |
| A18= | −2.9669E+03 | 2.1847E+05 | −4.0412E−07 | 1.0967E−06 | −2.9691E−06 |
| A20= | 1.2636E+03 | −3.4947E+05 | 1.5035E−08 | −1.6333E−07 | 2.2927E−07 |
| A22= | −2.3923E+02 | 3.9596E+05 | −3.2243E−10 | 1.4743E−08 | −1.2612E−08 |
| A24= | 4.3069E+00 | −3.1187E+05 | 3.0160E−12 | −8.5069E−10 | 4.8224E−10 |
| A26= | — | 1.6229E+05 | — | 3.0781E−11 | −1.2173E−11 |
| A28= | — | −5.0051E+04 | — | −6.3823E−13 | 1.8228E−13 |
| A30= | — | 6.9044E+03 | — | 5.7972E−15 | −1.2256E−15 |

| Surface # | 24 | 25 |
|---|---|---|
| k= | 0.0000E+00 | −1.0000E+00 |
| A4= | −6.0898E−02 | −6.8385E−02 |
| A6= | 1.4920E−02 | 2.0357E−02 |
| A8= | −1.5739E−03 | −4.6449E−03 |
| A10= | −3.5557E−04 | 7.6685E−04 |
| A12= | 1.6326E−04 | −9.3068E−05 |
| A14= | −3.0724E−05 | 8.4565E−06 |
| A16= | 3.6641E−06 | −5.8040E−07 |
| A18= | −3.0452E−07 | 3.0076E−08 |
| A20= | 1.8093E−08 | −1.1661E−09 |
| A22= | −7.6589E−10 | 3.3202E−11 |
| A24= | 2.2536E−11 | −6.7183E−13 |
| A26= | −4.3761E−13 | 9.1235E−15 |
| A28= | 5.0376E−15 | −7.4403E−17 |
| A30= | −2.6021E−17 | 2.7495E−19 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 7.70 | R22/ImgH | 0.38 |
| Fno | 1.92 | f/|Ri| | 0.29 |
| HFOV [deg.] | 41.8 | CTmax/CTmin | 3.09 |
| TL [mm] | 9.89 | ATmax/ATmin | 41.70 |
| ImgH [mm] | 7.15 | Td/ΣCT | 1.58 |
| V1/N1 | 36.26 | Sd/Td | 0.92 |
| V2/N2 | 36.26 | Td/Dr9r16 | 3.88 |
| V3/N3 | 16.09 | TL/EPD | 2.47 |
| V4/N4 | 13.70 | TL/ImgH | 1.38 |
| V5/N5 | 16.09 | TL/f | 1.28 |
| V6/N6 | 36.26 | TL/Y11R2 | 1.71 |
| V7/N7 | 25.95 | |f/f1| | 0.18 |
| V8/N8 | 36.26 | |f/f2| | 1.07 |
| V9/N9 | 23.91 | |f/f3| | 0.52 |
| V10/N10 | 36.26 | |f/f4| | 0.00 |
| V11/N11 | 36.26 | |f/f5| | 0.30 |
| V20 | 0 | |f/f6| | 0.56 |
| V24 | 1 | |f/f7| | 0.34 |
| Vmin | 22.5 | |f/f8| | 0.22 |
| Vmax | 56.0 | |f/f9| | 0.29 |
| Y1R1/Y11R2 | 0.35 | |f/f10| | 0.97 |
| Yc10R2 [mm] | 1.98 | |f/f11| | 1.36 |
| Yc11R2 [mm] | 2.29 | |f/f1| + |f/f2| + |f/f3| | 1.77 |
| Yc11R2/Yc10R2 | 1.15 | |f/f10| + |f/f11| | 2.33 |
| Yc11R2/f | 0.30 | ImgH/BL | 6.22 |

3rd Embodiment

Figure 5:
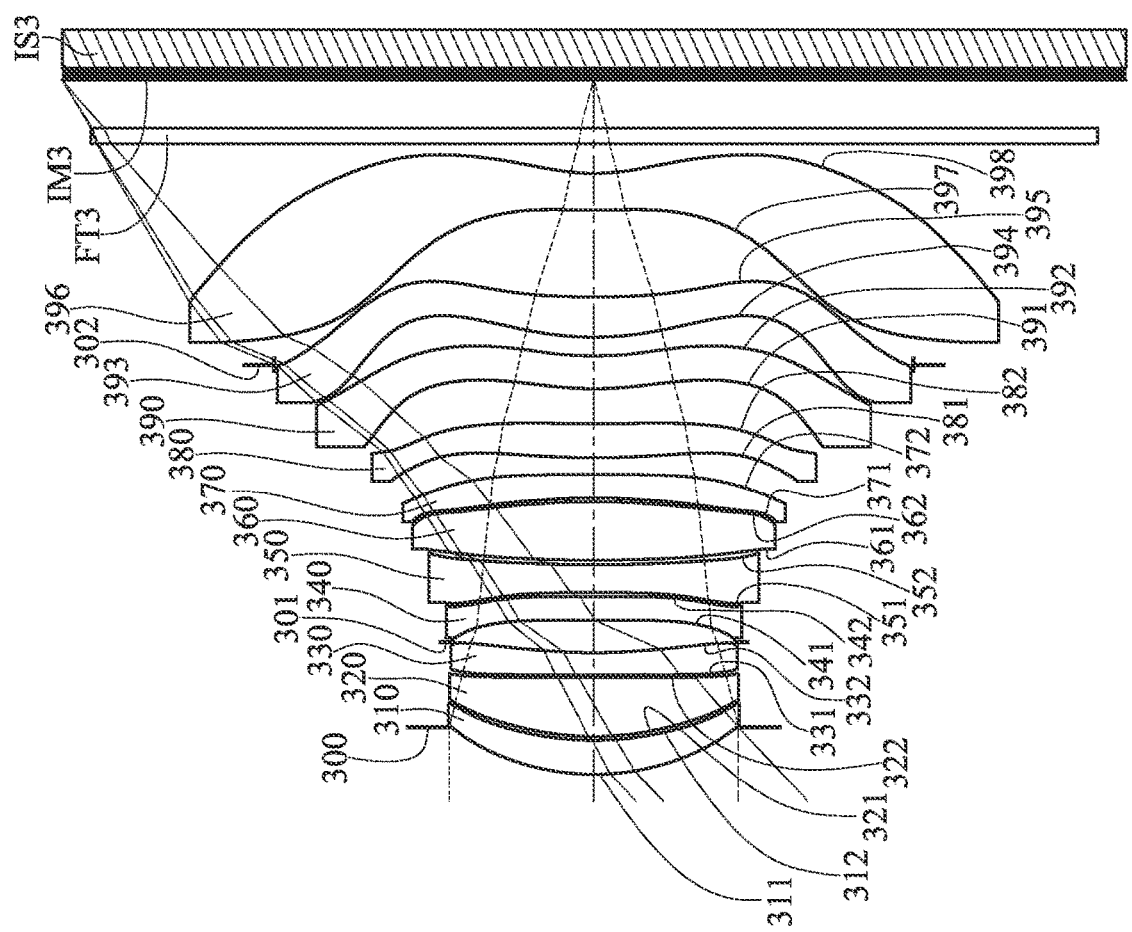
FIG. 5 is a schematic view of an image capturing unit according to the 3rd embodiment of the present disclosure.
Figure 6:
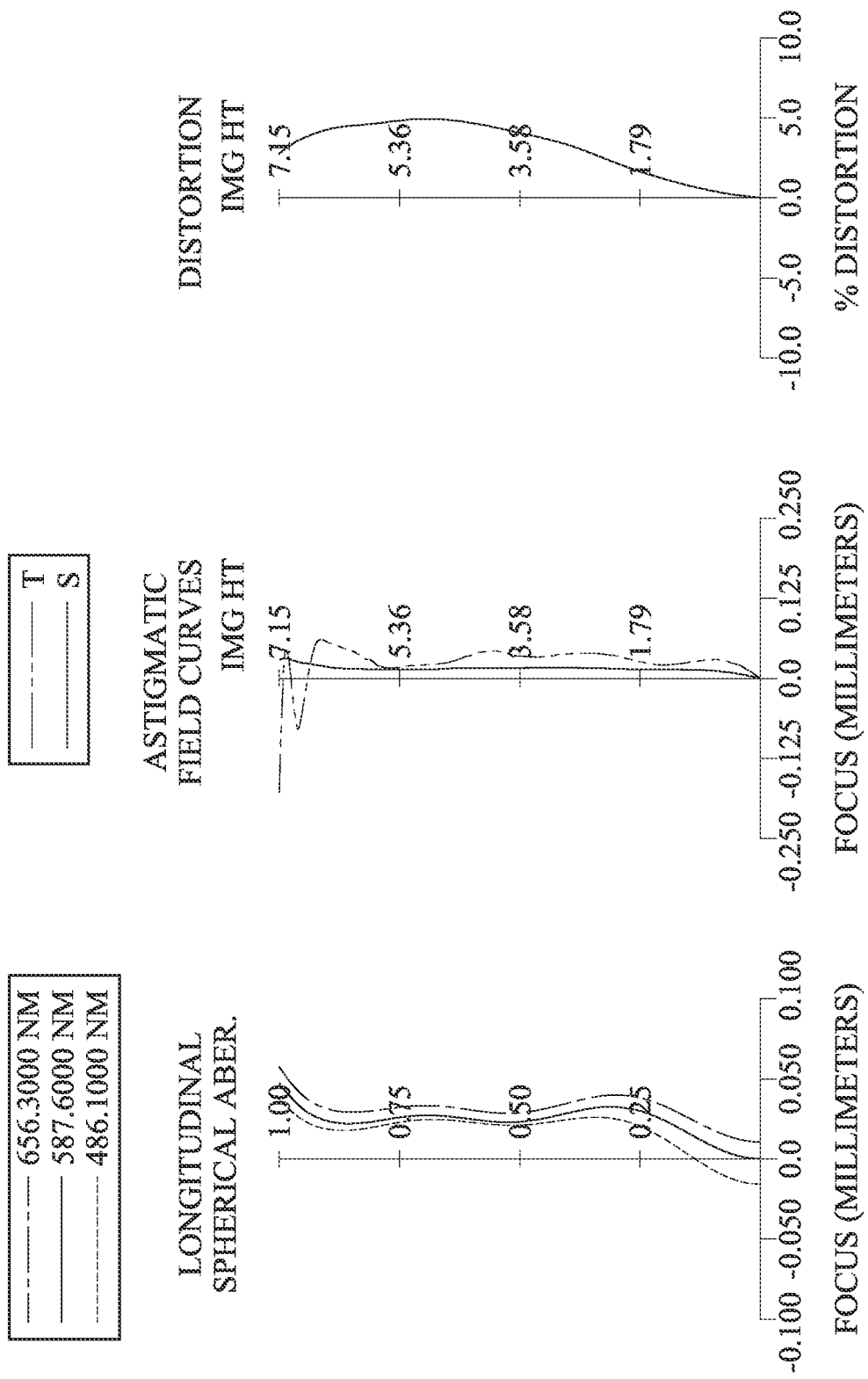
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens system (its reference numeral is omitted) of the present disclosure and an image sensor IS3. The imaging optical lens system includes, in order from an object side to an image side along an optical path, an aperture stop 300, a first lens element 310, a second lens element 320, a third lens element 330, a stop 301, a fourth lens element 340, a fifth lens element 350, a sixth lens element 360, a seventh lens element 370, an eighth lens element 380, a ninth lens element 390, a tenth lens element 393, a stop 302, an eleventh lens element 396, an IR-cut filter FT3 and an image surface IM3. The imaging optical lens system includes eleven lens elements (310, 320, 330, 340, 350, 360, 370, 380, 390, 393 and 396) with no additional lens element disposed between each of the adjacent eleven lens elements, wherein there is an air gap in a paraxial region between each of all adjacent lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The image-side surface 322 of the second lens element 320 has at least one convex critical point and at least one concave critical point in an off-axis region thereof.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one convex critical point in an off-axis region thereof.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one concave critical point in an off-axis region thereof. The image-side surface 342 of the fourth lens element 340 has at least one convex critical point and at least one concave critical point in an off-axis region thereof.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one convex critical point in an off-axis region thereof.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric.

The eighth lens element 380 with positive refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has at least one concave critical point in an off-axis region thereof. The image-side surface 382 of the eighth lens element 380 has at least one convex critical point in an off-axis region thereof.

The ninth lens element 390 with positive refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has at least one concave critical point in an off-axis region thereof. The image-side surface 392 of the ninth lens element 390 has at least one convex critical point in an off-axis region thereof.

The tenth lens element 393 with positive refractive power has an object-side surface 394 being convex in a paraxial region thereof and an image-side surface 395 being concave in a paraxial region thereof. The tenth lens element 393 is made of plastic material and has the object-side surface 394 and the image-side surface 395 being both aspheric. The object-side surface 394 of the tenth lens element 393 has at least one concave critical point in an off-axis region thereof. The image-side surface 395 of the tenth lens element 393 has at least one convex critical point in an off-axis region thereof.

The eleventh lens element 396 with negative refractive power has an object-side surface 397 being convex in a paraxial region thereof and an image-side surface 398 being concave in a paraxial region thereof. The eleventh lens element 396 is made of plastic material and has the object-side surface 397 and the image-side surface 398 being both aspheric. The object-side surface 397 of the eleventh lens element 396 has at least one inflection point in an off-axis region thereof. The object-side surface 397 of the eleventh lens element 396 has at least one concave critical point in the off-axis region thereof. The image-side surface 398 of the eleventh lens element 396 has at least one convex critical point in an off-axis region thereof.

The IR-cut filter FT3 is made of glass material and located between the eleventh lens element 396 and the image surface IM3, and will not affect the focal length of the imaging optical lens system. The image sensor IS3 is disposed on or near the image surface IM3 of the imaging optical lens system.

The detailed optical data of the 3rd embodiment are shown in Table 5 and the aspheric surface data are shown in Table 6 below.

TABLE 5

3rd Embodiment
f = 7.46 mm, Fno = 1.92, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.635 | | | | |
| 2 | Lens 1 | 3.346 | (ASP) | 0.460 | Plastic | 1.544 | 56.0 | 26.26 |
| 3 | | 4.157 | (ASP) | 0.050 | | | | |
| 4 | Lens 2 | 3.997 | (ASP) | 0.796 | Plastic | 1.544 | 56.0 | 7.60 |
| 5 | | 112.409 | (ASP) | 0.030 | | | | |
| 6 | Lens 3 | 38.070 | (ASP) | 0.300 | Plastic | 1.639 | 23.5 | −14.89 |
| 7 | | 7.583 | (ASP) | 0.138 | | | | |
| 8 | Stop | Plano | | 0.296 | | | | |
| 9 | Lens 4 | 39.339 | (ASP) | 0.320 | Plastic | 1.669 | 19.5 | 59.22 |
| 10 | | 5498.536 | (ASP) | 0.058 | | | | |
| 11 | Lens 5 | −18.596 | (ASP) | 0.370 | Plastic | 1.607 | 26.6 | −17.56 |
| 12 | | 25.199 | (ASP) | 0.061 | | | | |
| 13 | Lens 6 | 22.476 | (ASP) | 0.789 | Plastic | 1.534 | 55.9 | 13.02 |
| 14 | | −9.936 | (ASP) | 0.051 | | | | |
| 15 | Lens 7 | −7.843 | (ASP) | 0.322 | Plastic | 1.559 | 40.4 | −24.19 |
| 16 | | −18.964 | (ASP) | 0.226 | | | | |
| 17 | Lens 8 | 15.986 | (ASP) | 0.456 | Plastic | 1.544 | 56.0 | 48.43 |
| 18 | | 40.236 | (ASP) | 0.469 | | | | |
| 19 | Lens 9 | 5.288 | (ASP) | 0.440 | Plastic | 1.584 | 28.2 | 1056.41 |
| 20 | | 5.170 | (ASP) | 0.255 | | | | |
| 21 | Lens 10 | 5.052 | (ASP) | 0.540 | Plastic | 1.544 | 56.0 | 12.91 |
| 22 | | 17.308 | (ASP) | −0.914 | | | | |
| 23 | Stop | Plano | | 2.081 | | | | |
| 24 | Lens 11 | 16.458 | (ASP) | 0.500 | Plastic | 1.534 | 55.9 | −6.08 |
| 25 | | 2.683 | (ASP) | 0.400 | | | | |
| 26 | IR-cut Filter | Plano | | 0.210 | Glass | 1.517 | | — |
| 27 | | Plano | | 0.640 | | | | |
| 28 | Image | Plano | | — | | | | |

Note:
Reference wavelength is 587.6 nm (d-line).
An effective radius of the stop 301 (Surface 8) is 1.900 mm.
An effective radius of the stop 302 (Surface 23) is 4.300 mm.

TABLE 6

Aspheric Coefficients

| Surface # | 2 | 3 | 4 | 5 | 6 |
|---|---|---|---|---|---|
| k= | 8.4011E−02 | −9.8626E−02 | −1.1435E+00 | −9.9000E+01 | 7.9101E+01 |
| A4= | −3.6215E−04 | −1.8672E−03 | 3.6811E−04 | −8.7953E−03 | −1.5887E−02 |
| A6= | 1.1986E−03 | −1.3006E−03 | −1.8302E−03 | 2.4779E−03 | 6.2551E−03 |
| A8= | −8.3337E−04 | −4.8589E−04 | −6.1980E−04 | 5.8876E−03 | 5.0049E−03 |
| A10= | 3.3174E−04 | 8.3569E−04 | 1.0453E−03 | −6.1956E−03 | −6.1569E−03 |
| A12= | −4.0909E−05 | −1.4541E−04 | −2.6974E−04 | 2.6963E−03 | 2.7267E−03 |
| A14= | — | — | 2.6162E−05 | −5.5403E−04 | −5.5634E−04 |
| A16= | — | — | −1.4981E−06 | 4.4445E−05 | 4.4042E−05 |

TABLE 6-continued

Aspheric Coefficients

| Surface # | 7 | 9 | 10 | 11 | 12 |
|---|---|---|---|---|---|
| k= | −9.1647E+00 | −1.0000E+00 | −1.0000E+00 | 5.4753E+01 | 8.9330E+01 |
| A4= | −8.6796E−03 | −1.6332E−02 | 1.8024E−03 | 1.5745E−02 | 6.2194E−03 |
| A6= | 1.7101E−03 | −2.6580E−03 | −2.9148E−02 | −3.6598E−02 | −1.1444E−02 |
| A8= | 9.7728E−04 | −4.0866E−03 | 1.5831E−02 | 2.5818E−02 | 1.1923E−02 |
| A10= | −1.1897E−03 | 5.1171E−03 | −5.0720E−03 | −1.2190E−02 | −7.2470E−03 |
| A12= | 4.2479E−04 | −2.2148E−03 | 2.0520E−03 | 4.3446E−03 | 2.5598E−03 |
| A14= | −5.4791E−05 | 4.3372E−04 | −7.5260E−04 | −1.0328E−03 | −5.3382E−04 |
| A16= | — | −3.3864E−05 | 1.4709E−04 | 1.4098E−04 | 6.5511E−05 |
| A18= | — | — | −1.0928E−05 | −8.2330E−06 | −4.4301E−06 |
| A20= | — | — | — | — | 1.3059E−07 |

| Surface # | 13 | 14 | 15 | 16 | 17 |
|---|---|---|---|---|---|
| k= | 0.0000E+00 | −9.9775E+00 | −2.8487E+01 | 0.0000E+00 | −1.1916E+02 |
| A4= | −4.1119E−04 | −1.3563E−02 | −3.9672E−04 | 3.3999E−02 | 3.6740E−02 |
| A6= | 2.4487E−03 | 3.6405E−02 | 1.9498E−02 | −5.2578E−02 | −5.8913E−02 |
| A8= | −1.9884E−03 | −3.3317E−02 | −2.2342E−02 | 5.2294E−02 | 5.2102E−02 |
| A10= | 1.1969E−03 | 1.5482E−02 | 9.6509E−03 | −4.3534E−02 | −2.9973E−02 |
| A12= | −4.5203E−04 | −4.0860E−03 | −1.2289E−03 | 2.8101E−02 | 1.1144E−02 |
| A14= | 1.0192E−04 | 6.4141E−04 | −4.7647E−04 | −1.3835E−02 | −2.7053E−03 |
| A16= | −1.3481E−05 | −5.9190E−05 | 2.4204E−04 | 5.2541E−03 | 4.2590E−04 |
| A18= | 9.6843E−07 | 2.9115E−06 | −4.8816E−05 | −1.5424E−03 | −4.1938E−05 |
| A20= | −2.9082E−08 | −5.7926E−08 | 5.2352E−06 | 3.4494E−04 | 2.3518E−06 |
| A22= | — | — | −2.8477E−07 | −5.7125E−05 | −5.7489E−08 |
| A24= | — | — | 5.7620E−09 | 6.7235E−06 | — |
| A26= | — | — | — | −5.2826E−07 | — |
| A28= | — | — | — | 2.4727E−08 | — |
| A30= | — | — | — | −5.1994E−10 | — |

| Surface # | 18 | 19 | 20 | 21 | 22 |
|---|---|---|---|---|---|
| k= | −1.0000E+00 | 0.0000E+00 | 0.0000E+00 | −1.2810E+00 | −1.0000E+00 |
| A4= | 1.8908E−02 | 2.2534E−02 | 4.7121E−02 | 4.8761E−02 | 3.6996E−02 |
| A6= | −5.3564E−02 | −5.9579E−02 | −9.4938E−02 | −6.1264E−02 | −2.5126E−02 |
| A8= | 4.7054E−02 | 3.3604E−02 | 6.0686E−02 | 3.4831E−02 | 1.2842E−02 |
| A10= | −2.3902E−02 | −8.1826E−03 | −2.2560E−02 | −1.2314E−02 | −4.7709E−03 |
| A12= | 7.5825E−03 | −4.6282E−04 | 5.3156E−03 | 2.7976E−03 | 1.1602E−03 |
| A14= | −1.5450E−03 | 9.5862E−04 | −8.0116E−04 | −4.1423E−04 | −1.8562E−04 |
| A16= | 2.0137E−04 | −3.2825E−04 | 7.1583E−05 | 3.8880E−05 | 1.9601E−05 |
| A18= | −1.6165E−05 | 6.4754E−05 | −2.2553E−06 | −1.9812E−06 | −1.3188E−06 |
| A20= | 7.2596E−07 | −8.4838E−06 | −2.8054E−07 | −8.5885E−10 | 4.8208E−08 |
| A22= | −1.3935E−08 | 7.6490E−07 | 4.3211E−08 | 8.1237E−09 | −4.9805E−11 |
| A24= | — | −4.7106E−08 | −2.8455E−09 | −6.2598E−10 | −8.6329E−11 |
| A26= | — | 1.8953E−09 | 1.0572E−10 | 2.4545E−11 | 4.1718E−12 |
| A28= | — | −4.4872E−11 | −2.1507E−12 | −5.2070E−13 | −8.9479E−14 |
| A30= | — | 4.7338E−13 | 1.8663E−14 | 4.7607E−15 | 7.6823E−16 |

| Surface # | 24 | 25 |
|---|---|---|
| k= | 0.0000E+00 | −1.0000E+00 |
| A4= | −5.2732E−02 | −6.6074E−02 |
| A6= | 5.5672E−03 | 1.6092E−02 |
| A8= | 2.8881E−03 | −2.7244E−03 |
| A10= | −1.5314E−03 | 2.6573E−04 |
| A12= | 3.4162E−04 | −7.9016E−06 |
| A14= | −4.5089E−05 | −1.5593E−06 |
| A16= | 3.8990E−06 | 2.6083E−07 |
| A18= | −2.3051E−07 | −2.0911E−08 |
| A20= | 9.4286E−09 | 1.0502E−09 |
| A22= | −2.6335E−10 | −3.4402E−11 |
| A24= | 4.8052E−12 | 7.1561E−13 |
| A26= | −5.1703E−14 | −8.5942E−15 |
| A28= | 2.4904E−16 | 4.5412E−17 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.46 | R22/ImgH | 0.38 |
| Fno | 1.92 | f/|Ri| | 0.45 |
| HFOV [deg.] | 42.9 | CTmax/CTmin | 2.65 |
| TL [mm] | 9.34 | ATmax/ATmin | 38.90 |
| ImgH [mm] | 7.15 | Td/ΣCT | 1.53 |
| V1/N1 | 36.26 | Sd/Td | 0.92 |
| V2/N2 | 36.26 | Td/Dr9r16 | 3.56 |
| V3/N3 | 14.34 | TL/EPD | 2.40 |
| V4/N4 | 11.65 | TL/ImgH | 1.31 |
| V5/N5 | 16.57 | TL/f | 1.25 |
| V6/N6 | 36.46 | TL/Y11R2 | 1.72 |
| V7/N7 | 25.95 | |f/f1| | 0.28 |
| V8/N8 | 36.26 | |f/f2| | 0.98 |
| V9/N9 | 17.83 | |f/f3| | 0.50 |
| V10/N10 | 36.26 | |f/f4| | 0.13 |
| V11/N11 | 36.46 | |f/f5| | 0.42 |
| V20 | 1 | |f/f6| | 0.57 |
| V24 | 2 | |f/f7| | 0.31 |
| Vmin | 19.5 | |f/f8| | 0.15 |
| Vmax | 56.0 | |f/f9| | 0.01 |
| Y1R1/Y11R2 | 0.36 | |f/f10| | 0.58 |
| Yc10R2 [mm] | 2.16 | |f/f11| | 1.23 |
| Yc11R2 [mm] | 2.06 | |f/f1| + |f/f2| + |f/f3| | 1.77 |
| Yc11R2/Yc10R2 | 0.96 | |f/f10| + |f/f11| | 1.80 |
| Yc11R2/f | 0.28 | ImgH/BL | 5.72 |

4th Embodiment

Figure 7:
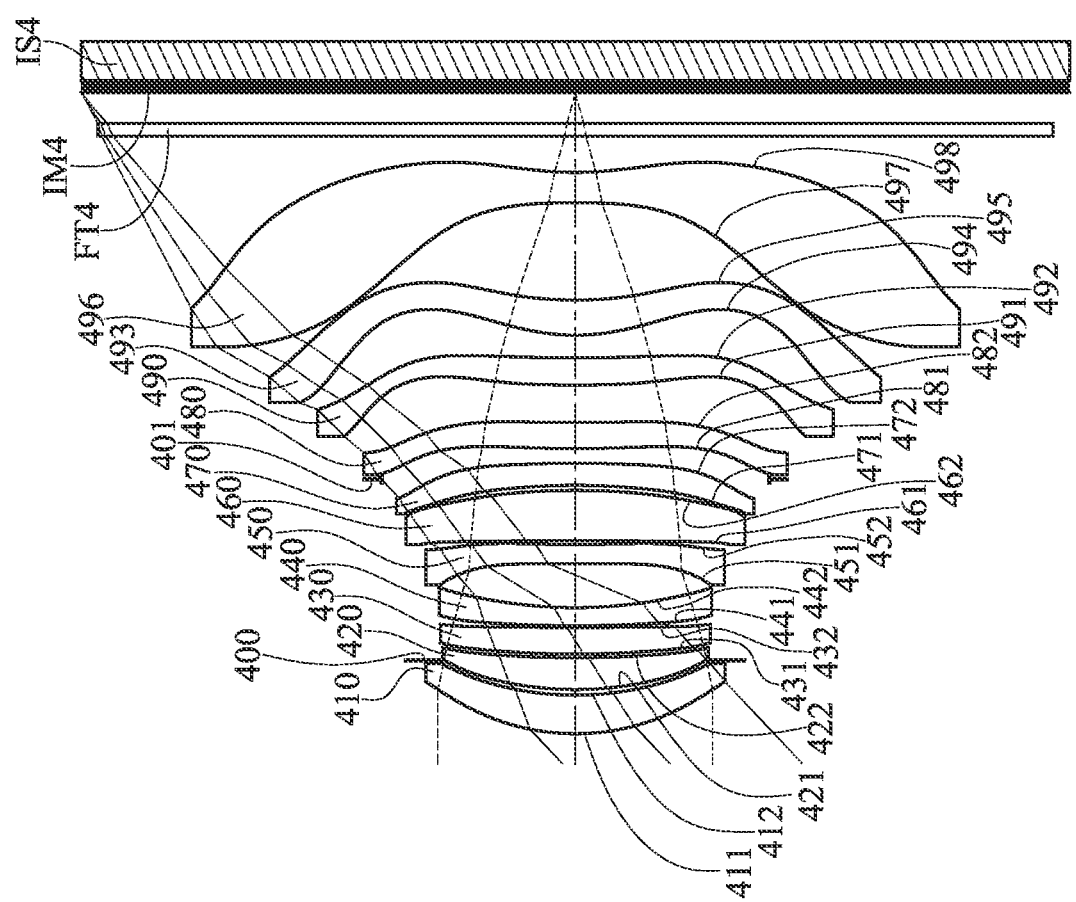
FIG. 7 is a schematic view of an image capturing unit according to the 4th embodiment of the present disclosure.
Figure 8:
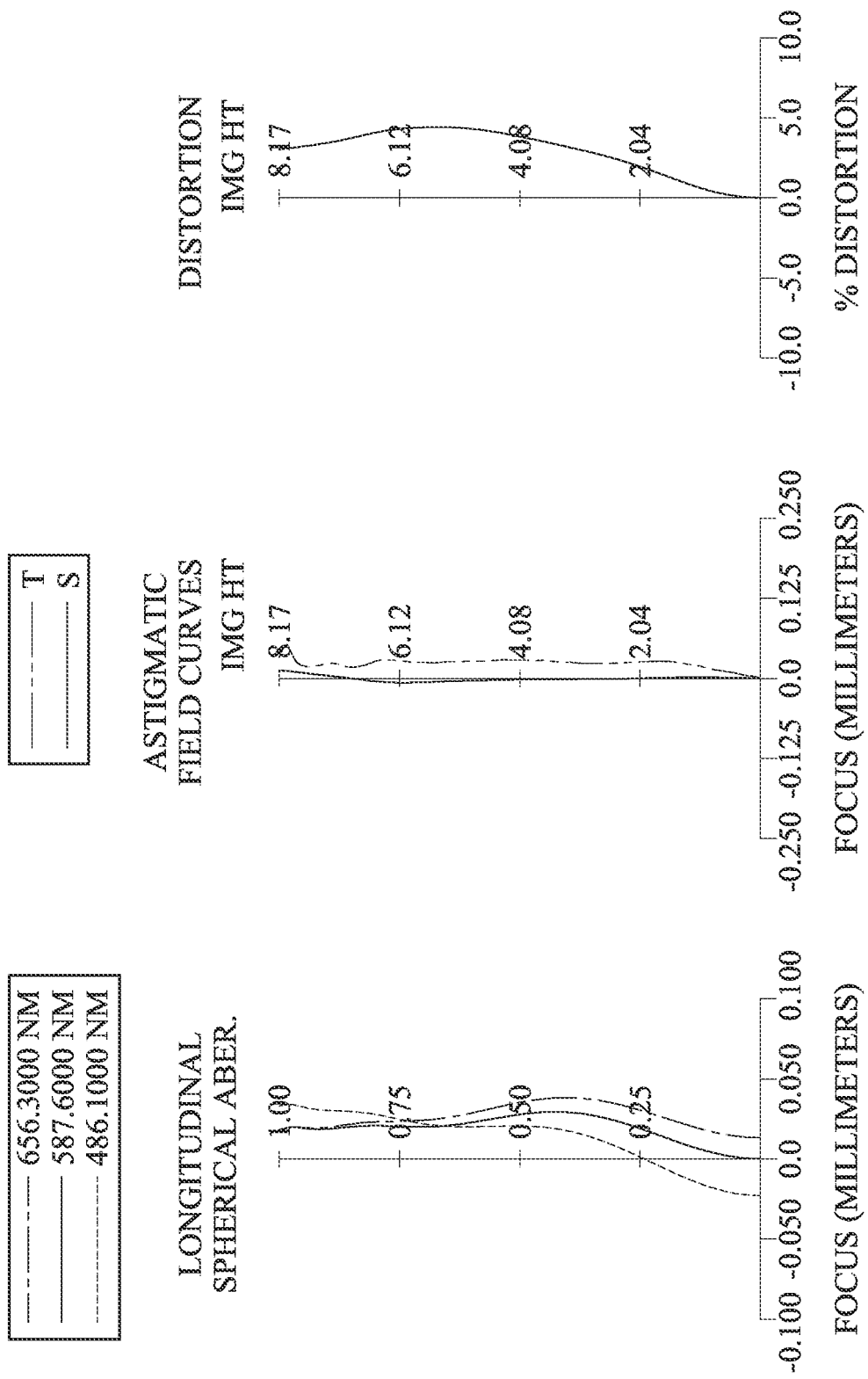
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens system (its reference numeral is omitted) of the present disclosure and an image sensor IS4. The imaging optical lens system includes, in order from an object side to an image side along an optical path, a first lens element 410, an aperture stop 400, a second lens element 420, a third lens element 430, a fourth lens element 440, a fifth lens element 450, a sixth lens element 460, a seventh lens element 470, a stop 401, an eighth lens element 480, a ninth lens element 490, a tenth lens element 493, an eleventh lens element 496, an IR-cut filter FT4 and an image surface IM4. The imaging optical lens system includes eleven lens elements (410, 420, 430, 440, 450, 460, 470, 480, 490, 493 and 496) with no additional lens element disposed between each of the adjacent eleven lens elements, wherein there is an air gap in a paraxial region between each of all adjacent lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one concave critical point in an off-axis region thereof. The image-side surface 452 of the fifth lens element 450 has at least one convex critical point and at least one concave critical point in an off-axis region thereof.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric.

The eighth lens element 480 with positive refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has at least one concave critical point in an off-axis region thereof. The image-side surface 482 of the eighth lens element 480 has at least one convex critical point in an off-axis region thereof.

The ninth lens element 490 with negative refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has at least one concave critical point in an off-axis region thereof. The image-side surface 492 of the ninth lens element 490 has at least one convex critical point in an off-axis region thereof.

The tenth lens element 493 with positive refractive power has an object-side surface 494 being convex in a paraxial region thereof and an image-side surface 495 being concave in a paraxial region thereof. The tenth lens element 493 is made of plastic material and has the object-side surface 494 and the image-side surface 495 being both aspheric. The object-side surface 494 of the tenth lens element 493 has at least one concave critical point in an off-axis region thereof. The image-side surface 495 of the tenth lens element 493 has at least one convex critical point in an off-axis region thereof.

The eleventh lens element 496 with negative refractive power has an object-side surface 497 being concave in a paraxial region thereof and an image-side surface 498 being concave in a paraxial region thereof. The eleventh lens element 496 is made of plastic material and has the object-side surface 497 and the image-side surface 498 being both aspheric. The object-side surface 497 of the eleventh lens element 496 has at least one inflection point in an off-axis region thereof. The object-side surface 497 of the eleventh lens element 496 has at least one convex critical point in the off-axis region thereof. The image-side surface 498 of the eleventh lens element 496 has at least one convex critical point in an off-axis region thereof.

The IR-cut filter FT4 is made of glass material and located between the eleventh lens element 496 and the image surface IM4, and will not affect the focal length of the imaging optical lens system. The image sensor IS4 is disposed on or near the image surface IM4 of the imaging optical lens system.

The detailed optical data of the 4th embodiment are shown in Table 7 and the aspheric surface data are shown in Table 8 below.

TABLE 7

4th Embodiment
f = 8.44 mm, Fno = 1.86, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.764 | (ASP) | 0.637 | Plastic | 1.544 | 55.9 | 22.77 |
| 2 | | 5.086 | (ASP) | 0.578 | | | | |
| 3 | Ape. Stop | Plano | | −0.484 | | | | |
| 4 | Lens 2 | 5.713 | (ASP) | 0.526 | Plastic | 1.544 | 55.9 | 15.13 |
| 5 | | 18.095 | (ASP) | 0.058 | | | | |
| 6 | Lens 3 | 13.890 | (ASP) | 0.439 | Plastic | 1.544 | 55.9 | 39.38 |
| 7 | | 39.098 | (ASP) | 0.030 | | | | |
| 8 | Lens 4 | 17.671 | (ASP) | 0.300 | Plastic | 1.634 | 23.8 | −20.63 |
| 9 | | 7.466 | (ASP) | 0.725 | | | | |
| 10 | Lens 5 | 67.809 | (ASP) | 0.320 | Plastic | 1.666 | 16.4 | −54.49 |
| 11 | | 23.595 | (ASP) | 0.061 | | | | |
| 12 | Lens 6 | −148.730 | (ASP) | 0.833 | Plastic | 1.544 | 55.9 | 23.99 |
| 13 | | −12.013 | (ASP) | 0.085 | | | | |
| 14 | Lens 7 | −9.875 | (ASP) | 0.365 | Plastic | 1.584 | 28.2 | −36.60 |
| 15 | | −18.596 | (ASP) | −0.270 | | | | |
| 16 | Stop | Plano | | 0.511 | | | | |
| 17 | Lens 8 | 19.524 | (ASP) | 0.434 | Plastic | 1.584 | 28.2 | 49.97 |
| 18 | | 58.435 | (ASP) | 0.619 | | | | |
| 19 | Lens 9 | 38.006 | (ASP) | 0.449 | Plastic | 1.559 | 40.4 | −222.25 |
| 20 | | 28.976 | (ASP) | 0.374 | | | | |
| 21 | Lens 10 | 3.403 | (ASP) | 0.581 | Plastic | 1.544 | 55.9 | 11.79 |
| 22 | | 6.817 | (ASP) | 1.611 | | | | |
| 23 | Lens 11 | −12.762 | (ASP) | 0.500 | Plastic | 1.544 | 55.9 | −6.91 |
| 24 | | 5.397 | (ASP) | 0.600 | | | | |
| 25 | IR-cut Filter | Plano | | 0.210 | Glass | 1.517 | 64.2 | — |
| 26 | | Plano | | 0.503 | | | | |
| 27 | Image | Plano | | — | | | | |

Note:
Reference wavelength is 587.6 nm (d-line).
An effective radius of the stop 401 (Surface 16) is 3.200 mm.

TABLE 8

Aspheric Coefficients

| Surface # | 1 | 2 | 4 | 5 | 6 |
|---|---|---|---|---|---|
| k = | 0.0000E+00 | 0.0000E+00 | −1.9334E−01 | 2.7774E+01 | 0.0000E+00 |
| A4 = | −2.3403E−04 | 7.8260E−04 | 1.2994E−03 | −7.2001E−05 | −1.1894E−03 |
| A6 = | −8.2006E−05 | −1.2161E−03 | −8.8266E−04 | −1.2796E−03 | −1.3331E−03 |
| A8 = | −4.2742E−06 | 4.4173E−04 | 2.4285E−04 | 6.8459E−04 | 6.5476E−04 |
| A10 = | 2.9004E−06 | −2.3645E−05 | 1.0620E−04 | −1.2773E−04 | −1.1016E−04 |
| A12 = | −1.0390E−06 | −3.6085E−06 | −4.0705E−05 | 1.0078E−05 | 9.1592E−06 |
| A14 = | — | — | 5.5797E−06 | — | — |
| A16 = | — | — | −3.2518E−07 | — | — |

| Surface # | 7 | 8 | 9 | 10 | 11 |
|---|---|---|---|---|---|
| k = | 6.2754E+01 | 1.8418E+01 | 2.3718E+00 | 9.9000E+01 | −6.0558E+00 |
| A4 = | −5.0157E−03 | −4.8630E−03 | −2.3808E−03 | −9.6343E−03 | −1.0441E−03 |
| A6 = | 2.3169E−04 | 6.2661E−04 | 6.4064E−05 | −2.0432E−03 | −7.4424E−03 |
| A8 = | 6.8437E−04 | 9.9041E−04 | 2.3207E−04 | 1.0948E−04 | 3.9909E−03 |
| A10 = | −2.7669E−04 | −5.7375E−06 | −1.4823E−04 | 5.9554E−06 | −1.4427E−03 |
| A12 = | 4.4859E−05 | 1.4098E−04 | 3.2266E−05 | −3.5266E−06 | 3.2097E−04 |
| A14 = | −8.3249E−07 | −1.5400E−05 | −2.1873E−06 | 3.5707E−06 | −3.7383E−05 |
| A16 = | −2.9303E−07 | 5.9917E−07 | — | −5.1164E−07 | 1.8635E−06 |
| A18 = | — | — | — | — | −1.5962E−08 |

TABLE 8-continued

Aspheric Coefficients

| Surface # | 12 | 13 | 14 | 15 | 17 |
|---|---|---|---|---|---|
| k = | 5.6707E+01 | 0.0000E+00 | −6.6677E+00 | 0.0000E+00 | −4.9987E+00 |
| A4 = | 4.0963E−03 | 1.8863E−03 | 7.4401E−03 | 3.0928E−03 | 1.1608E−03 |
| A6 = | −7.7983E−03 | −4.9019E−03 | −9.9853E−04 | 3.4005E−03 | −3.6958E−03 |
| A8 = | 5.7878E−03 | 1.7983E−03 | −3.6003E−03 | −5.3116E−03 | 5.0312E−04 |
| A10 = | −2.3353E−03 | 7.7554E−05 | 2.6446E−03 | 2.6703E−03 | 1.1769E−04 |
| A12 = | 5.6259E−04 | −2.1695E−04 | −9.3932E−04 | −8.0873E−04 | −6.1569E−05 |
| A14 = | −8.1080E−05 | 6.4055E−05 | 1.9099E−04 | 1.6165E−04 | 1.1184E−05 |
| A16 = | 6.4297E−06 | −8.9746E−06 | −2.2392E−05 | −2.2143E−05 | −1.0645E−06 |
| A18 = | −2.1611E−07 | 6.3466E−07 | 1.4089E−06 | 2.1412E−06 | 5.3763E−08 |
| A20 = | — | −1.8370E−08 | −3.6991E−08 | −1.4820E−07 | −1.1452E−09 |
| A22 = | — | — | — | 7.1139E−09 | — |
| A24 = | — | — | — | −2.0864E−10 | — |
| A26 = | — | — | — | 2.6795E−12 | — |

| Surface # | 18 | 19 | 20 | 21 | 22 |
|---|---|---|---|---|---|
| k = | −1.0000E+00 | 0.0000E+00 | 1.1727E+00 | −1.6339E+00 | −9.8122E+00 |
| A4 = | 7.4694E−03 | 1.9768E−02 | −3.8063E−03 | −9.5872E−03 | 1.4678E−02 |
| A6 = | −9.0251E−03 | −5.7647E−03 | 3.0599E−03 | 9.4222E−04 | −5.4866E−03 |
| A8 = | 2.7619E−03 | 6.4865E−04 | −1.3409E−03 | −7.9317E−04 | 5.8055E−04 |
| A10 = | −5.3558E−04 | −2.9950E−05 | 2.6533E−04 | 1.9973E−04 | −1.0207E−05 |
| A12 = | 7.4732E−05 | −5.8740E−06 | −3.1422E−05 | −2.4987E−05 | −3.4034E−06 |
| A14 = | −7.6457E−06 | 1.9184E−06 | 2.3256E−06 | 1.7534E−06 | 3.4731E−07 |
| A16 = | 5.3159E−07 | −2.9548E−07 | −1.0363E−07 | −7.0241E−08 | −1.5147E−08 |
| A18 = | −2.1390E−08 | 2.7633E−08 | 2.5182E−09 | 1.5082E−09 | 3.2251E−10 |
| A20 = | 3.6376E−10 | −1.5570E−09 | −2.5463E−11 | −1.3533E−11 | −2.7351E−12 |
| A22 = | — | 4.6409E−11 | — | — | — |
| A24 = | — | −3.9427E−13 | — | — | — |
| A26 = | — | −7.4500E−15 | — | — | — |

| Surface # | 23 | 24 |
|---|---|---|
| k = | 2.9960E−02 | −1.6009E+00 |
| A4 = | −1.4791E−02 | −1.6314E−02 |
| A6 = | −2.9710E−05 | 1.2091E−03 |
| A8 = | 1.4164E−04 | −5.3043E−05 |
| A10 = | −1.0622E−05 | 1.8051E−06 |
| A12 = | 3.3360E−07 | −9.7070E−08 |
| A14 = | −3.4572E−09 | 5.3852E−09 |
| A16 = | −6.3725E−11 | −1.7638E−10 |
| A18 = | 2.0095E−12 | 2.9182E−12 |
| A20 = | −1.5189E−14 | −1.9024E−14 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.44 | R22/ImgH | 0.66 |
| Fno | 1.86 | f/|Ri| | 0.66 |
| HFOV [deg.] | 43.1 | CTmax/CTmin | 2.78 |
| TL [mm] | 10.59 | ATmax/ATmin | 53.70 |
| ImgH [mm] | 8.17 | Td/ΣCT | 1.72 |
| V1/N1 | 36.23 | Sd/Td | 0.87 |
| V2/N2 | 36.23 | Td/Dr9r16 | 3.97 |
| V3/N3 | 36.23 | TL/EPD | 2.33 |
| V4/N4 | 14.59 | TL/ImgH | 1.30 |
| V5/N5 | 9.84 | TL/f | 1.26 |
| V6/N6 | 36.23 | TL/Y11R2 | 1.67 |
| V7/N7 | 17.83 | |f/f1| | 0.37 |
| V8/N8 | 17.83 | |f/f2| | 0.56 |
| V9/N9 | 25.95 | |f/f3| | 0.21 |
| V10/N10 | 36.23 | |f/f4| | 0.41 |
| V11/N11 | 36.23 | |f/f5| | 0.15 |
| V20 | 1 | |f/f6| | 0.35 |
| V24 | 2 | |f/f7| | 0.23 |
| Vmin | 16.4 | |f/f8| | 0.17 |
| Vmax | 55.9 | |f/f9| | 0.04 |
| Y1R1/Y11R2 | 0.39 | |f/f10| | 0.72 |
| Yc10R2 [mm] | 2.38 | |f/f11| | 1.22 |
| Yc11R2 [mm] | 2.10 | |f/f1| + |f/f2| + |f/f3| | 1.14 |
| Yc11R2/Yc10R2 | 0.88 | |f/f10| + |f/f11| | 1.94 |
| Yc11R2/f | 0.25 | ImgH/BL | 6.22 |

5th Embodiment

Figure 9:
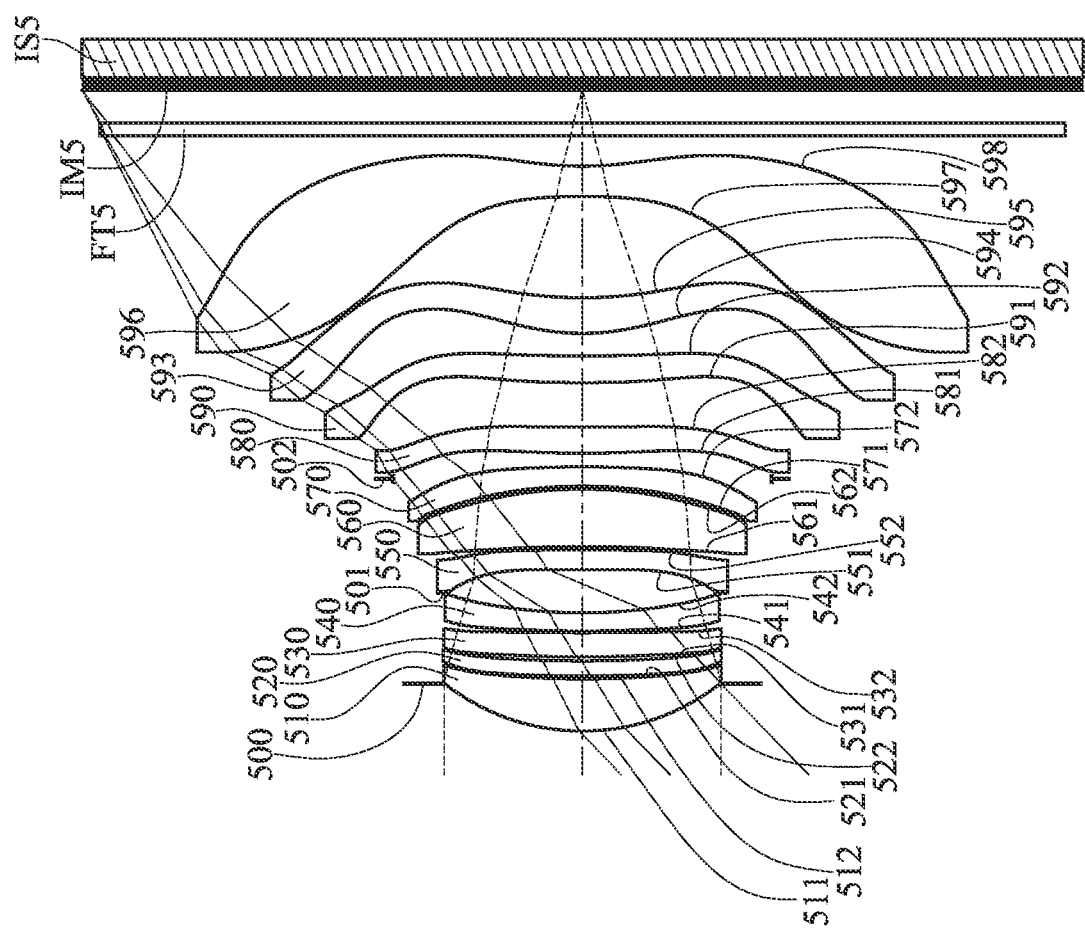
FIG. 9 is a schematic view of an image capturing unit according to the 5th embodiment of the present disclosure.
Figure 10:
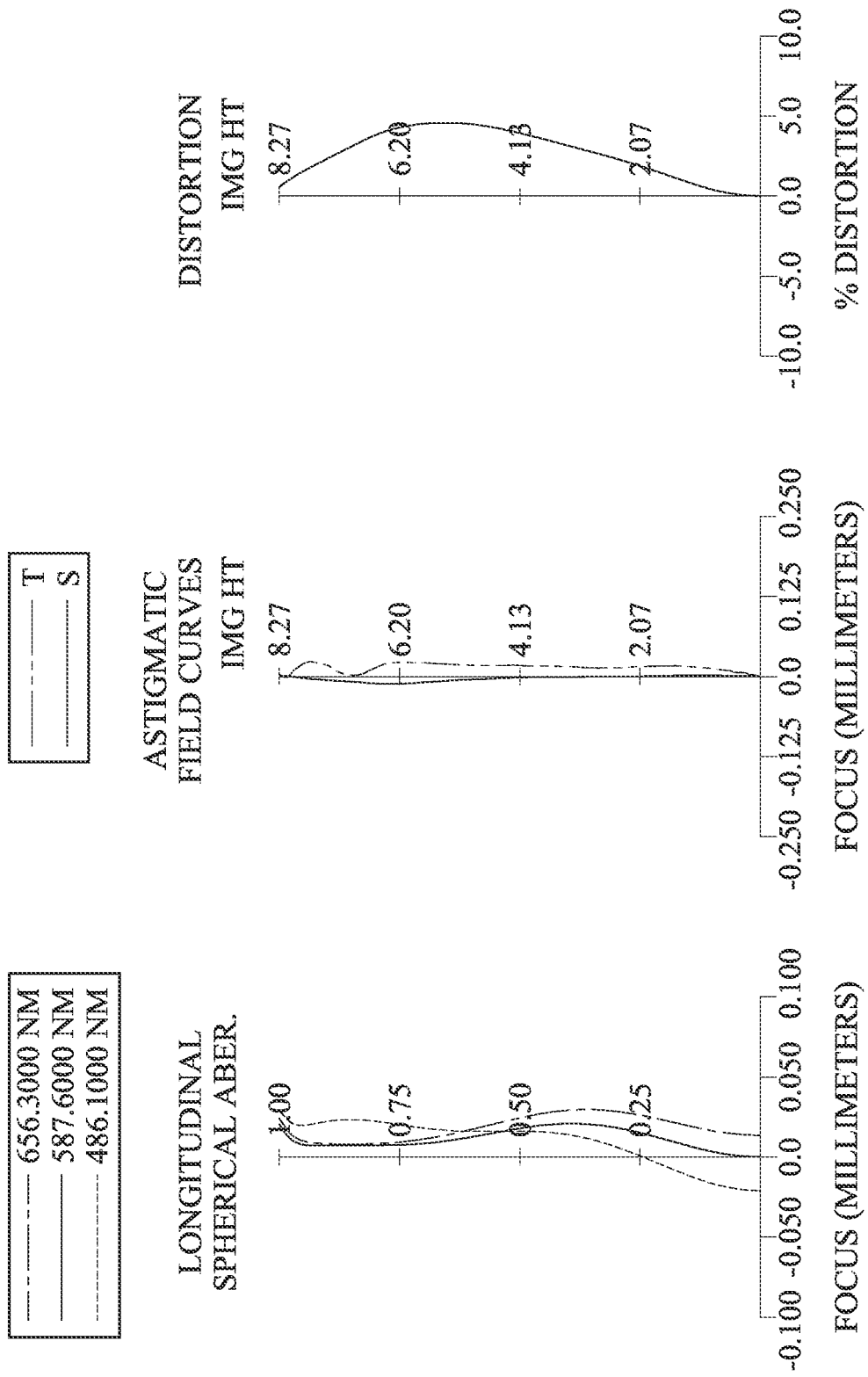
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens system (its reference numeral is omitted) of the present disclosure and an image sensor IS5. The imaging optical lens system includes, in order from an object side to an image side along an optical path, an aperture stop 500, a first lens element 510, a second lens element 520, a third lens element 530, a fourth lens element 540, a stop 501, a fifth lens element 550, a sixth lens element 560, a seventh lens element 570, a stop 502, an eighth lens element 580, a ninth lens element 590, a tenth lens element 593, an eleventh lens element 596, an IR-cut filter FT5 and an image surface IM5. The imaging optical lens system includes eleven lens elements (510, 520, 530, 540, 550, 560, 570, 580, 590, 593 and 596) with no additional lens element disposed between each of the adjacent eleven lens elements, wherein there is an air gap in a paraxial region between each of all adjacent lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one concave critical point in an off-axis region thereof. The image-side surface 552 of the fifth lens element 550 has at least one concave critical point in an off-axis region thereof.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric.

The eighth lens element 580 with positive refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has at least one concave critical point in an off-axis region thereof. The image-side surface 582 of the eighth lens element 580 has at least one convex critical point and at least one concave critical point in an off-axis region thereof.

The ninth lens element 590 with negative refractive power has an object-side surface 591 being convex in a paraxial region thereof and an image-side surface 592 being concave in a paraxial region thereof. The ninth lens element 590 is made of plastic material and has the object-side surface 591 and the image-side surface 592 being both aspheric. The object-side surface 591 of the ninth lens element 590 has at least one concave critical point in an off-axis region thereof. The image-side surface 592 of the ninth lens element 590 has at least one convex critical point in an off-axis region thereof.

The tenth lens element 593 with positive refractive power has an object-side surface 594 being convex in a paraxial region thereof and an image-side surface 595 being concave in a paraxial region thereof. The tenth lens element 593 is made of plastic material and has the object-side surface 594 and the image-side surface 595 being both aspheric. The object-side surface 594 of the tenth lens element 593 has at least one concave critical point in an off-axis region thereof. The image-side surface 595 of the tenth lens element 593 has at least one convex critical point in an off-axis region thereof.

The eleventh lens element 596 with negative refractive power has an object-side surface 597 being concave in a paraxial region thereof and an image-side surface 598 being concave in a paraxial region thereof. The eleventh lens element 596 is made of plastic material and has the object-side surface 597 and the image-side surface 598 being both aspheric. The object-side surface 597 of the eleventh lens element 596 has at least one inflection point in an off-axis region thereof. The image-side surface 598 of the eleventh lens element 596 has at least one convex critical point in an off-axis region thereof.

The IR-cut filter FT5 is made of glass material and located between the eleventh lens element 596 and the image surface IM5, and will not affect the focal length of the imaging optical lens system. The image sensor IS5 is disposed on or near the image surface IM5 of the imaging optical lens system.

The detailed optical data of the 5th embodiment are shown in Table 9 and the aspheric surface data are shown in Table 10 below.

TABLE 9

5th Embodiment
f = 8.51 mm, Fno = 1.86, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.780 | | | | |
| 2 | Lens 1 | 3.722 | (ASP) | 0.862 | Plastic | 1.544 | 56.0 | 8.83 |
| 3 | | 15.165 | (ASP) | 0.050 | | | | |
| 4 | Lens 2 | 26.754 | (ASP) | 0.248 | Plastic | 1.544 | 56.0 | −284.20 |

TABLE 9-continued

5th Embodiment
f = 8.51 mm, Fno = 1.86, HFOV = 44.0 deg.

| Surface # | | Curvature Radius | | Thickness | Material | Index | Abbe # | Focal Length |
|---|---|---|---|---|---|---|---|---|
| 5 | | 22.733 | (ASP) | 0.066 | | | | |
| 6 | Lens 3 | 19.247 | (ASP) | 0.400 | Plastic | 1.544 | 56.0 | 65.09 |
| 7 | | 41.854 | (ASP) | 0.030 | | | | |
| 8 | Lens 4 | 22.260 | (ASP) | 0.300 | Plastic | 1.669 | 19.5 | −22.53 |
| 9 | | 8.938 | (ASP) | 0.327 | | | | |
| 10 | Stop | Plano | | 0.389 | | | | |
| 11 | Lens 5 | 235.657 | (ASP) | 0.320 | Plastic | 1.686 | 18.4 | 286.00 |
| 12 | | −1171.972 | (ASP) | 0.061 | | | | |
| 13 | Lens 6 | −18.649 | (ASP) | 0.947 | Plastic | 1.534 | 55.9 | 23.35 |
| 14 | | −7.602 | (ASP) | 0.050 | | | | |
| 15 | Lens 7 | −7.332 | (ASP) | 0.320 | Plastic | 1.584 | 28.2 | −24.11 |
| 16 | | −15.532 | (ASP) | −0.200 | | | | |
| 17 | Stop | Plano | | 0.426 | | | | |
| 18 | Lens 8 | 19.805 | (ASP) | 0.430 | Plastic | 1.544 | 56.0 | 57.36 |
| 19 | | 53.793 | (ASP) | 0.737 | | | | |
| 20 | Lens 9 | 37.052 | (ASP) | 0.440 | Plastic | 1.584 | 28.2 | −169.69 |
| 21 | | 26.855 | (ASP) | 0.373 | | | | |
| 22 | Lens 10 | 3.700 | (ASP) | 0.590 | Plastic | 1.544 | 56.0 | 12.34 |
| 23 | | 7.781 | (ASP) | 1.675 | | | | |
| 24 | Lens 11 | −11.680 | (ASP) | 0.500 | Plastic | 1.534 | 55.9 | −6.69 |
| 25 | | 5.220 | (ASP) | 0.500 | | | | |
| 26 | IR-cut Filter | Plano | | 0.210 | Glass | 1.517 | 64.2 | — |
| 27 | | Plano | | 0.543 | | | | |
| 28 | Im- | Plano | | — | | | | |

Note:
Reference wavelength is 587.6 nm (d-line).
An effective radius of the stop 501 (Surface 10) is 2.200 mm.
An effective radius of the stop 502 (Surface 17) is 3.130 mm.

TABLE 10

Aspheric Coefficients

| Surface # | 2 | 3 | 4 | 5 | 6 |
|---|---|---|---|---|---|
| k = | 0.0000E+00 | 0.0000E+00 | 2.4449E+01 | 8.3085E+01 | 0.0000E+00 |
| A4 = | 2.1833E−04 | −3.0304E−04 | 1.4913E−03 | 1.8061E−03 | −7.4608E−04 |
| A6 = | 2.4256E−04 | 2.8600E−06 | −1.4783E−04 | −2.1593E−03 | −2.1207E−03 |
| A8 = | −1.0080E−04 | −3.2064E−05 | −1.4521E−04 | 7.5438E−04 | 9.4530E−04 |
| A10 = | 2.7126E−05 | 5.9801E−05 | 1.8460E−04 | −9.5698E−05 | −1.6204E−04 |
| A12 = | −3.3770E−06 | −7.2766E−06 | −4.7107E−05 | 4.5037E−06 | 1.2976E−05 |
| A14 = | — | — | 6.4508E−06 | — | — |
| A16 = | — | — | −4.1276E−07 | — | — |

| Surface # | 7 | 8 | 9 | 11 | 12 |
|---|---|---|---|---|---|
| k = | 7.2492E+01 | 5.9731E+01 | 8.7001E+00 | 9.9000E+01 | −9.9000E+01 |
| A4 = | −5.1836E−03 | −4.4815E−03 | −1.7357E−03 | −9.4131E−03 | 1.4974E−03 |
| A6 = | 6.7860E−04 | 9.5907E−04 | 6.8003E−05 | −2.4420E−03 | −9.7579E−03 |
| A8 = | 8.6462E−04 | 9.0077E−04 | 8.4742E−05 | 1.7719E−04 | 5.2723E−03 |
| A10 = | −5.9173E−04 | −7.5704E−04 | −9.5850E−05 | 4.9172E−06 | −1.8478E−03 |
| A12 = | 1.6261E−04 | 2.3944E−04 | 2.6559E−05 | −1.8435E−05 | 3.9457E−04 |
| A14 = | −1.8334E−05 | −3.2627E−05 | −2.1030E−06 | 8.8493E−06 | −4.3886E−05 |
| A16 = | 6.1959E−07 | 1.6021E−06 | — | −9.9732E−07 | 2.0039E−06 |
| A18 = | — | — | — | — | −5.5016E−09 |

| Surface # | 13 | 14 | 15 | 16 | 18 |
|---|---|---|---|---|---|
| k = | −8.5820E+01 | 0.0000E+00 | −5.0390E+00 | 0.0000E+00 | 2.8143E+01 |
| A4 = | 7.5690E−03 | 2.2142E−03 | 6.3695E−03 | 6.4560E−03 | 3.4579E−03 |
| A6 = | −1.1245E−02 | −6.9740E−03 | −3.8044E−03 | −3.1702E−04 | −5.2964E−03 |
| A8 = | 7.8576E−03 | 3.1381E−03 | −1.7376E−03 | −2.7237E−03 | 1.4331E−03 |
| A10 = | −3.0650E−03 | −1.6415E−04 | 2.2230E−03 | 9.5725E−04 | −2.6328E−04 |
| A12 = | 7.2023E−04 | −2.6569E−04 | −9.2754E−04 | 1.4822E−04 | 3.2477E−05 |
| A14 = | −1.0169E−04 | 9.3865E−05 | 2.0749E−04 | −2.3486E−04 | −2.8586E−06 |
| A16 = | 7.9353E−06 | −1.4574E−05 | −2.6475E−05 | 9.6695E−05 | 1.9476E−07 |
| A18 = | −2.6326E−07 | 1.1292E−06 | 1.8236E−06 | −2.3427E−05 | −8.8262E−09 |
| A20 = | — | −3.5928E−08 | −5.3110E−08 | 3.7502E−06 | 1.7609E−10 |
| A22 = | — | — | — | −4.0375E−07 | — |
| A24 = | — | — | — | 2.8284E−08 | — |
| A26 = | — | — | — | −1.1691E−09 | — |
| A28 = | — | — | — | 2.1681E−11 | — |

| Surface # | 19 | 20 | 21 | 22 | 23 |
|---|---|---|---|---|---|
| k = | −1.0000E+00 | 0.0000E+00 | 2.6591E+00 | −1.5268E+00 | −5.1137E+00 |
| A4 = | 4.7978E−03 | 1.5359E−02 | −1.4089E−03 | −9.2593E−03 | 9.2772E−03 |
| A6 = | −7.4665E−03 | −4.4460E−03 | 1.8652E−03 | 8.6511E−04 | −3.9283E−03 |

TABLE 10-continued

| Aspheric Coefficients | | | | | |
|---|---|---|---|---|---|
| A8 = | 2.5379E−03 | 2.0795E−04 | −1.2766E−03 | −6.7907E−04 | 3.4813E−04 |
| A10 = | −5.4480E−04 | 8.1946E−05 | 3.1632E−04 | 1.7031E−04 | 1.0638E−05 |
| A12 = | 7.9779E−05 | −2.2950E−05 | −4.4449E−05 | −2.1371E−05 | −4.5192E−06 |
| A14 = | −8.0608E−06 | 3.5050E−06 | 3.7649E−06 | 1.5098E−06 | 3.7994E−07 |
| A16 = | 5.3929E−07 | −4.1385E−07 | −1.8804E−07 | −6.1126E−08 | −1.5528E−08 |
| A18 = | −2.0997E−08 | 3.8019E−08 | 5.0867E−09 | 1.3318E−09 | 3.2025E−10 |
| A20 = | 3.5104E−10 | −2.3492E−09 | −5.7501E−11 | −1.2172E−11 | −2.6695E−12 |
| A22 = | — | 7.8588E−11 | — | — | — |
| A24 = | — | −7.4616E−13 | — | — | — |
| A26 = | — | −1.4979E−14 | — | — | — |

| Surface # | 24 | 25 |
|---|---|---|
| k = | −1.6837E−01 | −1.2841E+00 |
| A4 = | −1.6576E−02 | −1.7720E−02 |
| A6 = | 5.7829E−04 | 1.5979E−03 |
| A8 = | 6.0051E−05 | −1.0439E−04 |
| A10 = | −5.0930E−06 | 5.6649E−06 |
| A12 = | 1.2908E−07 | −2.7145E−07 |
| A14 = | 4.5394E−10 | 9.9666E−09 |
| A16 = | −8.7753E−11 | −2.3707E−10 |
| A18 = | 1.6830E−12 | 3.1219E−12 |
| A20 = | −1.0737E−14 | −1.7019E−14 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 8.51 | R22/ImgH | 0.63 |
| Fno | 1.86 | f/|Ri| | 0.73 |
| HFOV [deg.] | 44.0 | CTmax/CTmin | 3.82 |
| TL [mm] | 10.59 | ATmax/ATmin | 55.83 |
| ImgH [mm] | 8.27 | Td/ΣCT | 1.74 |
| V1/N1 | 36.26 | Sd/Td | 0.92 |
| V2/N2 | 36.26 | Td/Dr9r16 | 3.97 |
| V3/N3 | 36.26 | TL/EPD | 2.32 |
| V4/N4 | 11.65 | TL/ImgH | 1.28 |
| V5/N5 | 10.90 | TL/f | 1.24 |
| V6/N6 | 36.46 | TL/Y11R2 | 2.67 |
| V7/N7 | 17.83 | |f/f1| | 0.96 |
| V8/N8 | 36.26 | |f/f2| | 0.03 |
| V9/N9 | 17.83 | |f/f3| | 0.13 |
| V10/N10 | 36.26 | |f/f4| | 0.38 |
| V11/N11 | 36.46 | |f/f5| | 0.03 |
| V20 | 2 | |f/f6| | 0.36 |
| V24 | 2 | |f/f7| | 0.35 |
| Vmin | 18.4 | |f/f8| | 0.15 |
| Vmax | 56.0 | |f/f9| | 0.05 |
| Y1R1/Y11R2 | 0.36 | |f/f10| | 0.69 |
| Yc10R2 [mm] | 2.36 | |f/f11| | 1.27 |
| Yc11R2 [mm] | 2.17 | |f/f1| + |f/f2| + |f/f3| | 1.12 |
| Yc11R2/Yc10R2 | 0.92 | |f/f10| + |f/f11| | 1.96 |
| Yc11R2/f | 0.26 | ImgH/BL | 6.60 |

6th Embodiment

Figure 11:
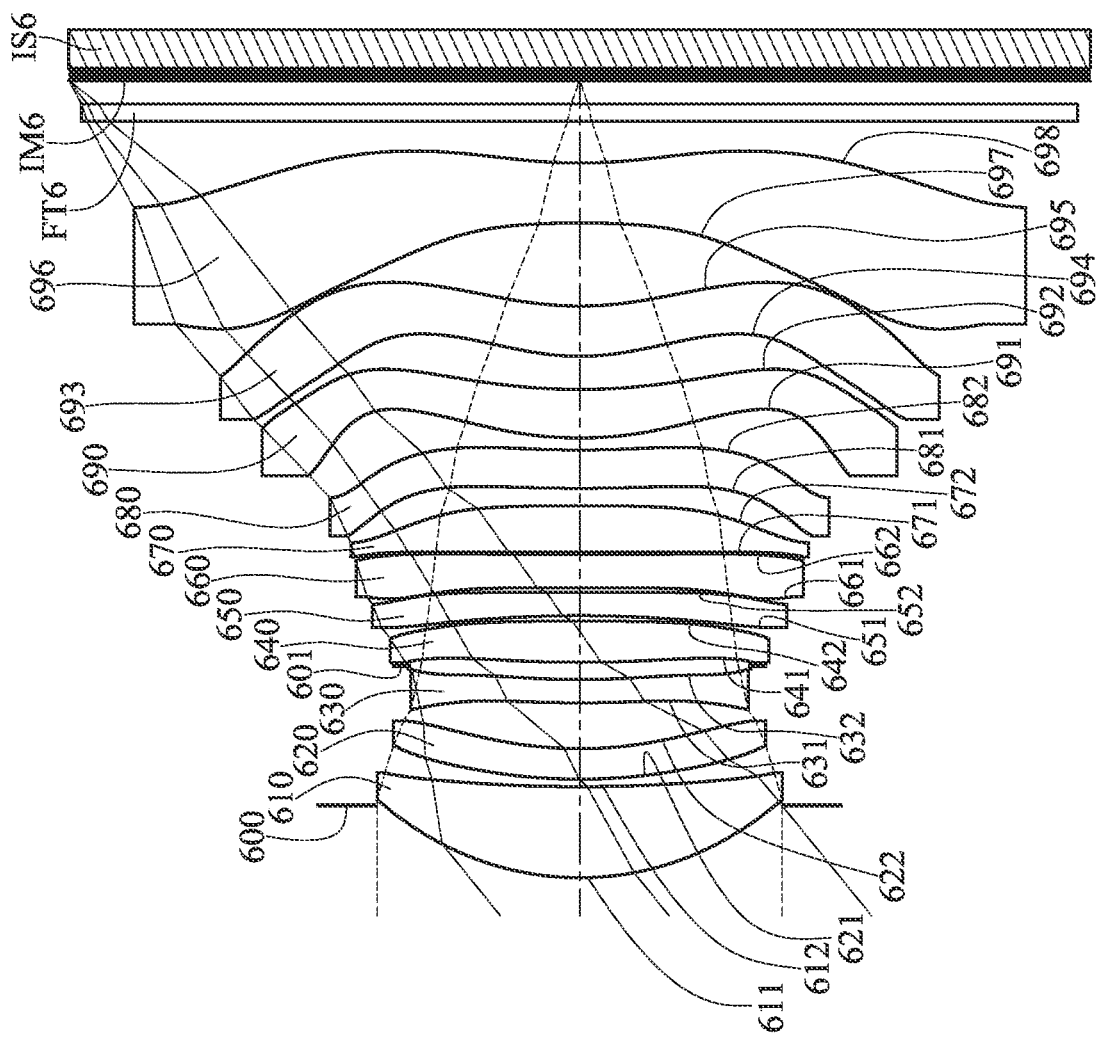
FIG. 11 is a schematic view of an image capturing unit according to the 6th embodiment of the present disclosure.
Figure 12:
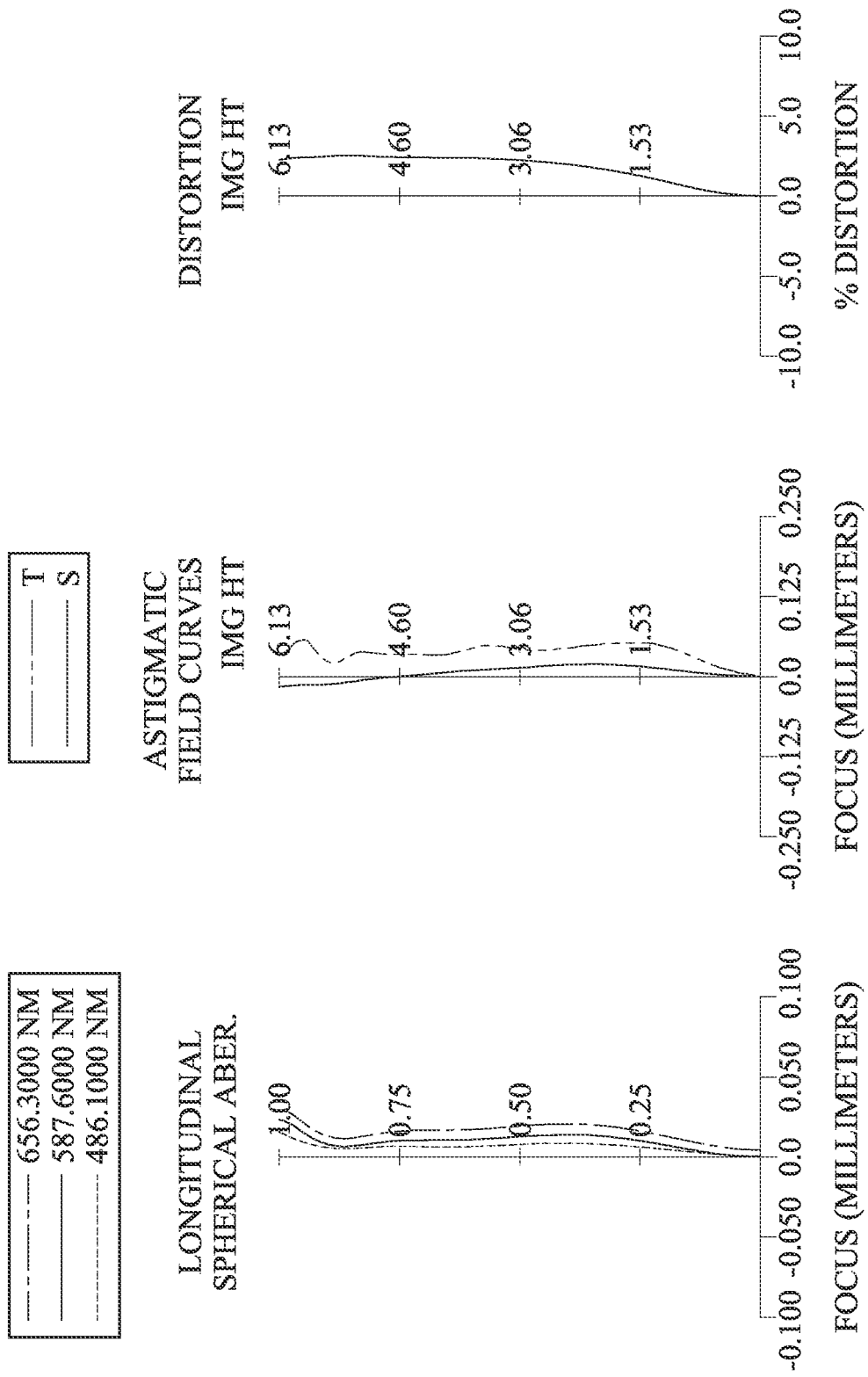
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens system (its reference numeral is omitted) of the present disclosure and an image sensor IS6. The imaging optical lens system includes, in order from an object side to an image side along an optical path, an aperture stop 600, a first lens element 610, a second lens element 620, a third lens element 630, a stop 601, a fourth lens element 640, a fifth lens element 650, a sixth lens element 660, a seventh lens element 670, an eighth lens element 680, a ninth lens element 690, a tenth lens element 693, an eleventh lens element 696, an IR-cut filter FT6 and an image surface IM6. The imaging optical lens system includes eleven lens elements (610, 620, 630, 640, 650, 660, 670, 680, 690, 693 and 696) with no additional lens element disposed between each of the adjacent eleven lens elements, wherein there is an air gap in a paraxial region between each of all adjacent lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one concave critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one concave critical point in an off-axis region thereof.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one convex critical point in an off-axis region thereof. The image-side surface 662 of the sixth lens element 660 has at least one convex critical point in an off-axis region thereof.

The seventh lens element 670 with positive refractive power has an object-side surface 671 being convex in a paraxial region thereof and an image-side surface 672 being convex in a paraxial region thereof. The seventh lens element 670 is made of plastic material and has the object-side surface 671 and the image-side surface 672 being both aspheric. The object-side surface 671 of the seventh lens element 670 has at least one concave critical point in an off-axis region thereof.

The eighth lens element 680 with negative refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has at least one concave critical point in an off-axis region thereof. The image-side surface 682 of the eighth lens element 680 has at least one convex critical point in an off-axis region thereof.

The ninth lens element 690 with positive refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has at least one concave critical point in an off-axis region thereof. The image-side surface 692 of the ninth lens element 690 has at least one convex critical point in an off-axis region thereof.

The tenth lens element 693 with positive refractive power has an object-side surface 694 being convex in a paraxial region thereof and an image-side surface 695 being concave in a paraxial region thereof. The tenth lens element 693 is made of plastic material and has the object-side surface 694 and the image-side surface 695 being both aspheric. The object-side surface 694 of the tenth lens element 693 has at least one concave critical point in an off-axis region thereof. The image-side surface 695 of the tenth lens element 693 has at least one convex critical point in an off-axis region thereof.

The eleventh lens element 696 with negative refractive power has an object-side surface 697 being concave in a paraxial region thereof and an image-side surface 698 being concave in a paraxial region thereof. The eleventh lens element 696 is made of plastic material and has the object-side surface 697 and the image-side surface 698 being both aspheric. The object-side surface 697 of the eleventh lens element 696 has at least one inflection point in an off-axis region thereof. The object-side surface 697 of the eleventh lens element 696 has at least one convex critical point in the off-axis region thereof. The image-side surface 698 of the eleventh lens element 696 has at least one convex critical point in an off-axis region thereof.

The IR-cut filter FT6 is made of glass material and located between the eleventh lens element 696 and the image surface IM6, and will not affect the focal length of the imaging optical lens system. The image sensor IS6 is disposed on or near the image surface IM6 of the imaging optical lens system.

The detailed optical data of the 6th embodiment are shown in Table 11 and the aspheric surface data are shown in Table 12 below.

TABLE 11

6th Embodiment
f = 7.39 mm, Fno = 1.52, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.870 | | | | |
| 2 | Lens 1 | 3.542 | (ASP) | 1.096 | Plastic | 1.545 | 56.1 | 7.41 |
| 3 | | 25.734 | (ASP) | 0.090 | | | | |
| 4 | Lens 2 | 7.563 | (ASP) | 0.366 | Plastic | 1.679 | 18.4 | −23.29 |
| 5 | | 5.016 | (ASP) | 0.551 | | | | |
| 6 | Lens 3 | 13.239 | (ASP) | 0.280 | Plastic | 1.701 | 14.9 | −53.67 |
| 7 | | 9.708 | (ASP) | 0.161 | | | | |
| 8 | Stop | Plano | | 0.046 | | | | |
| 9 | Lens 4 | 16.734 | (ASP) | 0.498 | Plastic | 1.544 | 56.0 | 18.22 |
| 10 | | −24.044 | (ASP) | 0.064 | | | | |
| 11 | Lens 5 | −12.545 | (ASP) | 0.280 | Plastic | 1.587 | 28.3 | −23.14 |
| 12 | | −165.123 | (ASP) | 0.055 | | | | |
| 13 | Lens 6 | −213.920 | (ASP) | 0.400 | Plastic | 1.544 | 56.0 | −154.47 |
| 14 | | 138.503 | (ASP) | 0.030 | | | | |
| 15 | Lens 7 | 163.824 | (ASP) | 0.557 | Plastic | 1.544 | 56.0 | 54.97 |
| 16 | | −36.543 | (ASP) | 0.209 | | | | |
| 17 | Lens 8 | 20.036 | (ASP) | 0.461 | Plastic | 1.587 | 28.3 | −86.73 |
| 18 | | 14.257 | (ASP) | 0.144 | | | | |
| 19 | Lens 9 | 4.839 | (ASP) | 0.584 | Plastic | 1.562 | 44.6 | 25.14 |
| 20 | | 7.041 | (ASP) | 0.399 | | | | |
| 21 | Lens 10 | 3.000 | (ASP) | 0.604 | Plastic | 1.544 | 56.0 | 16.50 |
| 22 | | 4.186 | (ASP) | 1.000 | | | | |
| 23 | Lens 11 | −11.553 | (ASP) | 0.720 | Plastic | 1.534 | 56.0 | −7.10 |
| 24 | | 5.772 | (ASP) | 0.500 | | | | |
| 25 | IR-cut Filter | Plano | | 0.210 | Glass | 1.517 | 64.2 | — |
| 26 | | Plano | | 0.277 | | | | |
| 27 | Image | Plano | | — | | | | |

Note:
Reference wavelength is 587.6 nm (d-line).
An effective radius of the stop 601 (Surface 8) is 2.050 mm.

TABLE 12

| Aspheric Coefficients | | | | | |
|---|---|---|---|---|---|
| Surface # | 2 | 3 | 4 | 5 | 6 |
| k = | −6.8678E−01 | −1.6771E+01 | −1.9535E+00 | −8.2295E−01 | −6.6608E+01 |
| A4 = | 1.3706E−03 | 1.4046E−02 | 1.8113E−02 | 7.0665E−03 | −5.4126E−03 |
| A6 = | 6.1667E−04 | −1.0795E−02 | −1.5153E−02 | −7.9962E−03 | −8.6571E−03 |
| A8 = | −2.9067E−04 | 4.2153E−03 | 5.9618E−03 | 2.3879E−03 | 2.6709E−03 |
| A10 = | 7.8674E−05 | −8.9032E−04 | −1.2091E−03 | −2.6164E−04 | −6.5990E−05 |
| A12 = | −1.1306E−05 | 9.8153E−05 | 1.2604E−04 | −2.7851E−05 | −7.8429E−05 |
| A14 = | 6.5186E−07 | −4.3350E−06 | −5.0295E−06 | 5.5239E−06 | 9.2057E−06 |

| Surface # | 7 | 9 | 10 | 11 | 12 |
|---|---|---|---|---|---|
| k = | 1.0153E+01 | −9.9000E+01 | 6.0000E+01 | −4.8089E+01 | 0.0000E+00 |
| A4 = | −4.1861E−03 | 1.2401E−02 | 1.3146E−02 | 1.8150E−03 | −1.0558E−03 |
| A6 = | −1.2830E−02 | −1.1767E−02 | −6.4397E−03 | 6.2320E−03 | 5.3358E−03 |
| A8 = | 5.2465E−03 | 2.4979E−03 | −2.2577E−03 | −7.8593E−03 | −5.2109E−03 |
| A10 = | −6.0776E−04 | 4.5546E−04 | 1.9973E−03 | 3.4886E−03 | 1.9695E−03 |
| A12 = | −1.9483E−05 | −3.3296E−04 | −5.2276E−04 | −7.4973E−04 | −3.9440E−04 |
| A14 = | 9.3293E−06 | 6.1994E−05 | 6.4056E−05 | 7.9581E−05 | 4.0790E−05 |
| A16 = | −4.1751E−07 | −4.2406E−06 | −3.2409E−06 | −3.3440E−06 | −1.6780E−06 |

| Surface # | 13 | 14 | 15 | 16 | 17 |
|---|---|---|---|---|---|
| k = | 0.0000E+00 | −9.9000E+01 | −9.9000E+01 | 0.0000E+00 | 0.0000E+00 |
| A4 = | −7.7760E−04 | −3.2751E−04 | −3.6875E−04 | −3.0997E−03 | −3.8360E−03 |
| A6 = | −6.9374E−04 | −6.0799E−05 | −4.5567E−05 | −1.1724E−03 | 7.6915E−04 |
| A8 = | −2.7864E−03 | −8.3407E−06 | −5.4669E−06 | −2.8102E−03 | −2.7792E−03 |
| A10 = | 1.5785E−03 | −1.0695E−06 | −7.0573E−07 | 1.6753E−03 | 1.0515E−03 |
| A12 = | −3.9892E−04 | −1.3019E−07 | −9.1981E−08 | −4.6243E−04 | −1.8409E−04 |
| A14 = | 5.8245E−05 | — | — | 7.8404E−05 | 1.5658E−05 |
| A16 = | −4.6944E−06 | — | — | −8.3255E−06 | −5.2989E−07 |
| A18 = | 1.5839E−07 | — | — | 5.0424E−07 | 2.2546E−09 |
| A20 = | — | — | — | −1.3151E−08 | — |

| Surface # | 18 | 19 | 20 | 21 | 22 |
|---|---|---|---|---|---|
| k = | 0.0000E+00 | −2.0591E+00 | 0.0000E+00 | −1.0996E+00 | −1.1661E+00 |
| A4 = | 5.0659E−03 | 2.1259E−02 | −7.1210E−03 | −2.7121E−02 | −2.2429E−04 |
| A6 = | −1.9473E−02 | −2.0499E−02 | 4.5156E−03 | −3.8790E−03 | −1.3579E−02 |
| A8 = | 9.9259E−03 | 8.5015E−03 | −2.2790E−03 | 3.1770E−03 | 6.2770E−03 |
| A10 = | −3.1304E−03 | −2.4143E−03 | 5.6770E−04 | −8.7808E−04 | −1.6382E−03 |
| A12 = | 6.5353E−04 | 4.8407E−04 | −8.1525E−05 | 1.2210E−04 | 2.7369E−04 |
| A14 = | −9.0256E−05 | −6.8754E−05 | 6.3513E−06 | −8.6739E−06 | −3.0613E−05 |
| A16 = | 7.7837E−06 | 6.6946E−06 | −1.9951E−07 | 2.4533E−07 | 2.3179E−06 |
| A18 = | −3.7005E−07 | −4.2824E−07 | −4.2968E−09 | 4.4694E−09 | −1.1705E−07 |
| A20 = | 7.2559E−09 | 1.6498E−08 | 4.5949E−10 | −4.3813E−10 | 3.7660E−09 |
| A22 = | — | −2.9241E−10 | −8.7926E−12 | 7.5465E−12 | −6.9647E−11 |
| A24 = | — | — | — | — | 5.6209E−13 |

| Surface # | 23 | 24 |
|---|---|---|
| k = | −6.8176E+00 | 0.0000E+00 |
| A4 = | −1.1977E−02 | −1.4071E−02 |
| A6 = | −3.7577E−03 | −1.8603E−03 |
| A8 = | 1.7207E−03 | 1.1231E−03 |
| A10 = | −2.5276E−04 | −2.4832E−04 |
| A12 = | 1.6026E−05 | 3.3608E−05 |
| A14 = | −6.4217E−08 | −3.0687E−06 |
| A16 = | −5.7756E−08 | 1.9509E−07 |
| A18 = | 4.0307E−09 | −8.6567E−09 |
| A20 = | −1.3202E−10 | 2.6275E−10 |
| A22 = | 2.2178E−12 | −5.1922E−12 |
| A24 = | −1.5419E−14 | 6.0105E−14 |
| A26 = | — | −3.0884E−16 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.39 | R22/ImgH | 0.94 |
| Fno | 1.52 | f/|Ri| | 0.64 |
| HFOV [deg.] | 39.0 | CTmax/CTmin | 3.91 |
| TL [mm] | 9.58 | ATmax/ATmin | 33.33 |
| ImgH [mm] | 6.13 | Td/ΣCT | 1.47 |
| V1/N1 | 36.30 | Sd/Td | 0.90 |
| V2/N2 | 10.98 | Td/Dr9r16 | 4.31 |

-continued

6th Embodiment

| | | | |
|---|---|---|---|
| V3/N3 | 8.76 | TL/EPD | 1.97 |
| V4/N4 | 36.26 | TL/ImgH | 1.56 |
| V5/N5 | 17.83 | TL/f | 1.30 |
| V6/N6 | 36.26 | TL/Y11R2 | 3.67 |
| V7/N7 | 36.26 | |f/f1| | 1.00 |
| V8/N8 | 17.83 | |f/f2| | 0.32 |
| V9/N9 | 28.57 | |f/f3| | 0.14 |
| V10/N10 | 36.26 | |f/f4| | 0.41 |
| V11/N11 | 36.48 | |f/f5| | 0.32 |
| V20 | 2 | |f/f6| | 0.05 |
| V24 | 2 | |f/f7| | 0.13 |
| Vmin | 14.9 | |f/f8| | 0.09 |
| Vmax | 56.1 | |f/f9| | 0.29 |
| Y1R1/Y11R2 | 0.45 | |f/f10| | 0.45 |
| Yc10R2 [mm] | 2.26 | |f/f11| | 1.04 |
| Yc11R2 [mm] | 2.00 | |f/f1| + |f/f2| + |f/f3| | 1.45 |
| Yc11R2/Yc10R2 | 0.88 | |f/f10| + |f/f11| | 1.49 |
| Yc11R2/f | 0.27 | ImgH/BL | 6.21 |

7th Embodiment

Figure 13:
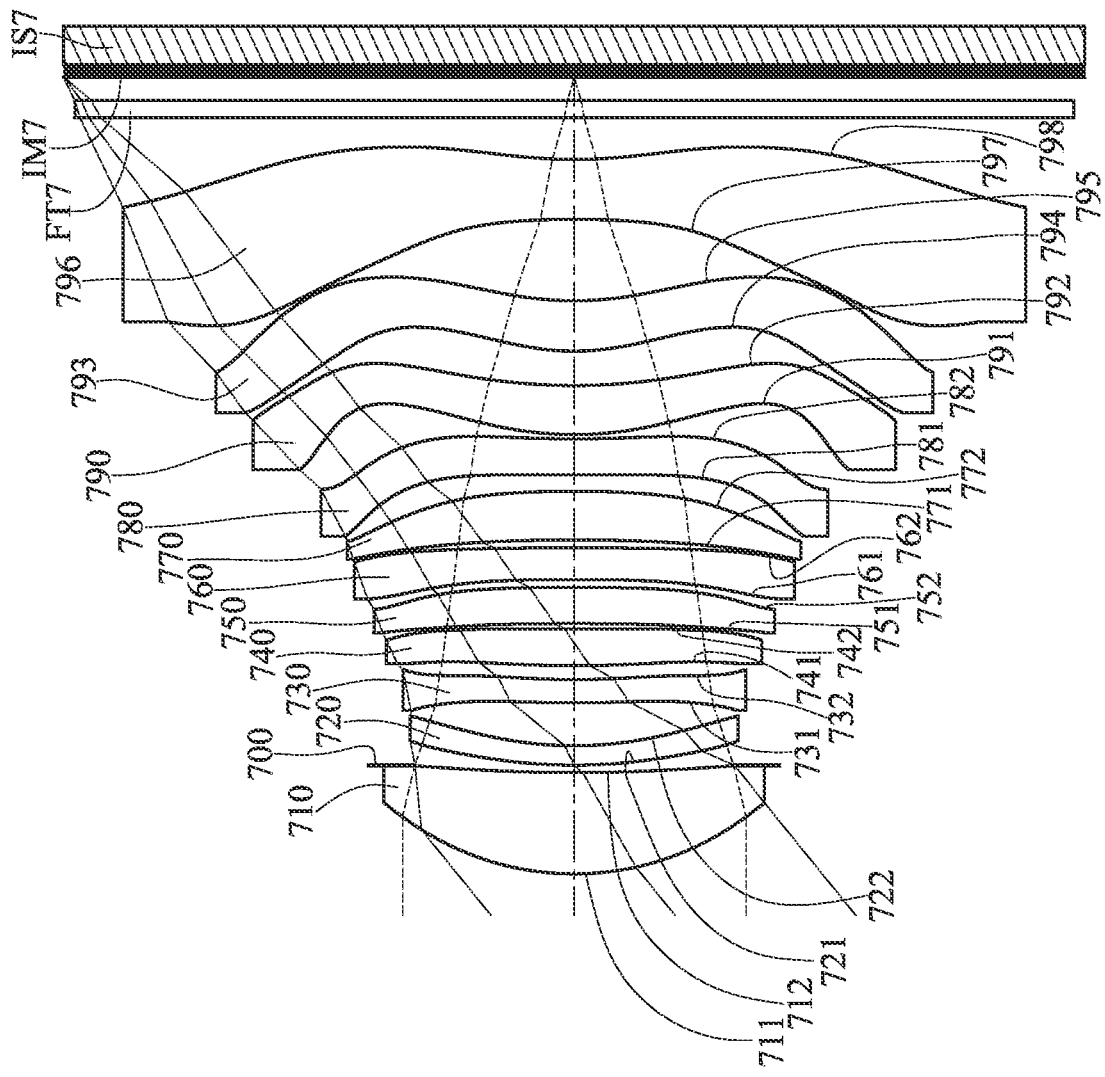
FIG. 13 is a schematic view of an image capturing unit according to the 7th embodiment of the present disclosure.
Figure 14:
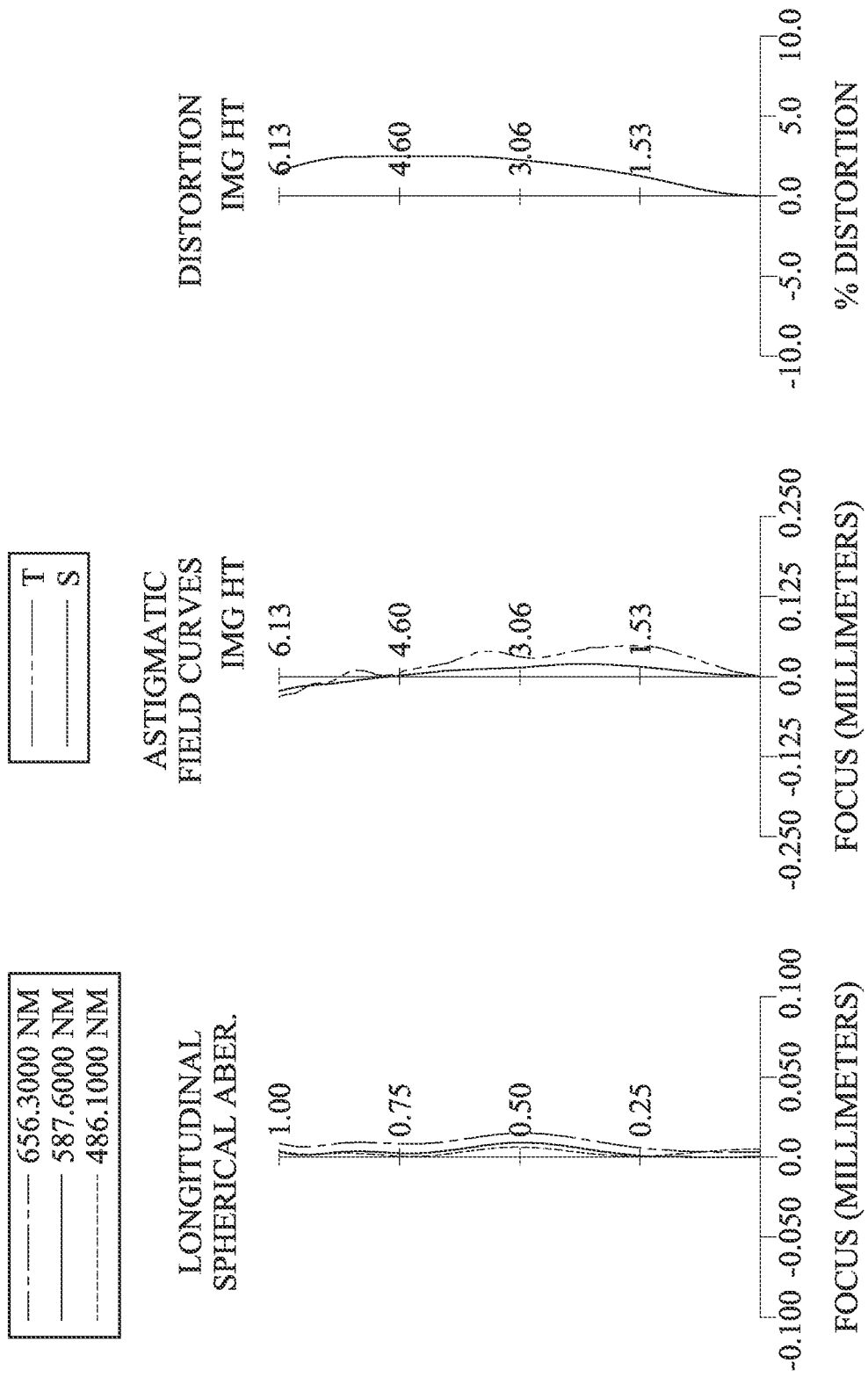
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens system (its reference numeral is omitted) of the present disclosure and an image sensor IS7. The imaging optical lens system includes, in order from an object side to an image side along an optical path, a first lens element 710, an aperture stop 700, a second lens element 720, a third lens element 730, a fourth lens element 740, a fifth lens element 750, a sixth lens element 760, a seventh lens element 770, an eighth lens element 780, a ninth lens element 790, a tenth lens element 793, an eleventh lens element 796, an IR-cut filter FT7 and an image surface IM7. The imaging optical lens system includes eleven lens elements (710, 720, 730, 740, 750, 760, 770, 780, 790, 793 and 796) with no additional lens element disposed between each of the adjacent eleven lens elements, wherein there is an air gap in a paraxial region between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one concave critical point in an off-axis region thereof.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one concave critical point in an off-axis region thereof.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with positive refractive power has an object-side surface 771 being concave in a paraxial region thereof and an image-side surface 772 being convex in a paraxial region thereof. The seventh lens element 770 is made of plastic material and has the object-side surface 771 and the image-side surface 772 being both aspheric.

The eighth lens element 780 with negative refractive power has an object-side surface 781 being concave in a paraxial region thereof and an image-side surface 782 being concave in a paraxial region thereof. The eighth lens element 780 is made of plastic material and has the object-side surface 781 and the image-side surface 782 being both aspheric. The image-side surface 782 of the eighth lens element 780 has at least one convex critical point in an off-axis region thereof.

The ninth lens element 790 with positive refractive power has an object-side surface 791 being convex in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has at least one concave critical point in an off-axis region thereof. The image-side surface 792 of the ninth lens element 790 has at least one convex critical point in an off-axis region thereof.

The tenth lens element 793 with positive refractive power has an object-side surface 794 being convex in a paraxial region thereof and an image-side surface 795 being concave in a paraxial region thereof. The tenth lens element 793 is made of plastic material and has the object-side surface 794 and the image-side surface 795 being both aspheric. The object-side surface 794 of the tenth lens element 793 has at least one concave critical point in an off-axis region thereof. The image-side surface 795 of the tenth lens element 793 has at least one convex critical point in an off-axis region thereof.

The eleventh lens element 796 with negative refractive power has an object-side surface 797 being concave in a paraxial region thereof and an image-side surface 798 being concave in a paraxial region thereof. The eleventh lens element 796 is made of plastic material and has the object-side surface 797 and the image-side surface 798 being both aspheric. The object-side surface 797 of the eleventh lens element 796 has at least one inflection point in an off-axis region thereof. The object-side surface 797 of the eleventh lens element 796 has at least one convex critical point in the off-axis region thereof. The image-side surface 798 of the eleventh lens element 796 has at least one convex critical point in an off-axis region thereof.

The IR-cut filter FT7 is made of glass material and located between the eleventh lens element 796 and the image surface IM7, and will not affect the focal length of the imaging optical lens system. The image sensor IS7 is disposed on or near the image surface IM7 of the imaging optical lens system.

The detailed optical data of the 7th embodiment are shown in Table 13 and the aspheric surface data are shown in Table 14 below.

TABLE 13

7th Embodiment
f = 7.43 mm, Fno = 1.80, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.445 | (ASP) | 1.220 | Plastic | 1.545 | 56.1 | 6.95 |
| 2 | | 33.333 | (ASP) | 0.088 | | | | |
| 3 | Ape. Stop | Plano | | 0.000 | | | | |
| 4 | Lens 2 | 7.296 | (ASP) | 0.233 | Plastic | 1.679 | 18.4 | −19.42 |
| 5 | | 4.637 | (ASP) | 0.516 | | | | |
| 6 | Lens 3 | 13.977 | (ASP) | 0.280 | Plastic | 1.686 | 18.4 | −44.10 |
| 7 | | 9.482 | (ASP) | 0.168 | | | | |
| 8 | Lens 4 | 15.281 | (ASP) | 0.443 | Plastic | 1.544 | 56.0 | 23.16 |
| 9 | | −71.128 | (ASP) | 0.063 | | | | |
| 10 | Lens 5 | −22.907 | (ASP) | 0.437 | Plastic | 1.559 | 40.4 | 213.30 |
| 11 | | −19.345 | (ASP) | 0.093 | | | | |
| 12 | Lens 6 | −22.685 | (ASP) | 0.380 | Plastic | 1.587 | 28.3 | −58.55 |
| 13 | | −67.107 | (ASP) | 0.096 | | | | |
| 14 | Lens 7 | −21.450 | (ASP) | 0.584 | Plastic | 1.544 | 56.0 | 82.83 |
| 15 | | −14.672 | (ASP) | 0.201 | | | | |
| 16 | Lens 8 | −5515.024 | (ASP) | 0.430 | Plastic | 1.587 | 28.3 | −26.30 |
| 17 | | 15.487 | (ASP) | 0.052 | | | | |
| 18 | Lens 9 | 4.519 | (ASP) | 0.588 | Plastic | 1.562 | 44.6 | 22.25 |
| 19 | | 6.745 | (ASP) | 0.414 | | | | |
| 20 | Lens 10 | 2.854 | (ASP) | 0.606 | Plastic | 1.544 | 56.0 | 15.46 |
| 21 | | 3.995 | (ASP) | 0.980 | | | | |
| 22 | Lens 11 | −11.537 | (ASP) | 0.720 | Plastic | 1.534 | 56.0 | −7.09 |
| 23 | | 5.761 | (ASP) | 0.500 | | | | |
| 24 | IR-cut Filter | Plano | | 0.210 | Glass | 1.517 | 64.2 | — |
| 25 | | Plano | | 0.279 | | | | |
| 26 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k = | −6.1429E−01 | −2.7342E+01 | −2.8806E+00 | −7.6508E−01 | −7.8077E+01 |
| A4 = | 2.4929E−03 | 1.8974E−02 | 2.7154E−02 | 1.2275E−02 | −7.9517E−03 |
| A6 = | −3.2298E−04 | −1.7286E−02 | −2.9630E−02 | −1.7578E−02 | −7.9377E−03 |
| A8 = | 2.6663E−04 | 8.3870E−03 | 1.5025E−02 | 8.5622E−03 | 2.6728E−03 |
| A10 = | −8.6921E−05 | −2.3120E−03 | −4.1464E−03 | −2.2221E−03 | 5.5795E−05 |
| A12 = | 1.4514E−05 | 3.3823E−04 | 6.0502E−04 | 2.8831E−04 | −1.3522E−04 |
| A14 = | −1.1160E−06 | −2.0531E−05 | −3.5269E−05 | −1.4396E−05 | 1.4270E−05 |

| Surface # | 7 | 8 | 9 | 10 | 11 |
|---|---|---|---|---|---|
| k = | 3.5886E+00 | −9.5712E+01 | 4.8867E+01 | −4.2964E+01 | 0.0000E+00 |
| A4 = | −5.0998E−03 | 1.0213E−02 | 2.3158E−02 | 2.7274E−02 | 1.8369E−02 |
| A6 = | −1.4113E−02 | −1.0178E−02 | −3.1723E−02 | −3.7408E−02 | −2.2643E−02 |
| A8 = | 5.4699E−03 | −1.5952E−04 | 1.5868E−02 | 2.0932E−02 | 1.0713E−02 |
| A10 = | 2.9611E−05 | 2.5449E−03 | −3.2765E−03 | −5.7938E−03 | −2.9340E−03 |
| A12 = | −3.7229E−04 | −1.1040E−03 | 5.7018E−05 | 7.7992E−04 | 4.4967E−04 |
| A14 = | 8.1030E−05 | 1.9433E−04 | 6.7079E−05 | −3.9148E−05 | −3.4320E−05 |
| A16 = | −5.6326E−06 | −1.2431E−05 | −6.4545E−06 | −2.8876E−07 | 9.9551E−07 |

| Surface # | 12 | 13 | 14 | 15 | 16 |
|---|---|---|---|---|---|
| k = | 0.0000E+00 | 2.6526E+01 | 1.4879E+01 | 0.0000E+00 | 0.0000E+00 |
| A4 = | 7.4454E−03 | 4.2365E−03 | 2.6601E−03 | −1.1787E−02 | −1.0026E−02 |
| A6 = | −1.1894E−02 | −8.0909E−03 | −5.1484E−03 | 6.1298E−03 | 9.6923E−03 |
| A8 = | 3.0420E−03 | 4.5740E−03 | 2.9265E−03 | −5.6967E−03 | −7.8819E−03 |
| A10 = | 7.4283E−04 | −1.2798E−03 | −8.4306E−04 | 2.4004E−03 | 2.6299E−03 |
| A12 = | −5.9947E−04 | 1.8451E−04 | 1.2810E−04 | −5.4437E−04 | −4.5166E−04 |
| A14 = | 1.3991E−04 | −1.3051E−05 | −9.7546E−06 | 7.2071E−05 | 3.8332E−05 |
| A16 = | −1.4680E−05 | 3.4952E−07 | 2.9258E−07 | −5.4066E−06 | −1.2262E−06 |
| A18 = | 5.8952E−07 | — | — | 1.8750E−07 | −3.0558E−09 |
| A20 = | — | — | — | −8.4541E−10 | — |

TABLE 14-continued

Aspheric Coefficients

| Surface # | 17 | 18 | 19 | 20 | 21 |
|---|---|---|---|---|---|
| k = | 0.0000E+00 | −2.1189E+00 | 0.0000E+00 | −1.1365E+00 | −1.1990E+00 |
| A4 = | 4.4339E−03 | 1.9489E−02 | −9.2325E−03 | −2.6219E−02 | 1.1213E−03 |
| A6 = | −1.6773E−02 | −2.0684E−02 | 6.2346E−03 | −3.8421E−03 | −1.4535E−02 |
| A8 = | 8.5948E−03 | 9.9989E−03 | −2.5314E−03 | 2.4942E−03 | 6.1036E−03 |
| A10 = | −3.0759E−03 | −3.3963E−03 | 4.5546E−04 | −5.5313E−04 | −1.4724E−03 |
| A12 = | 7.7013E−04 | 7.9632E−04 | −2.9523E−05 | 4.8481E−05 | 2.3149E−04 |
| A14 = | −1.2749E−04 | −1.2715E−04 | −3.2281E−06 | 1.0801E−06 | −2.4688E−05 |
| A16 = | 1.2932E−05 | 1.3476E−05 | 7.8129E−07 | −5.5049E−07 | 1.7977E−06 |
| A18 = | −7.1546E−07 | −9.1042E−07 | −6.2731E−08 | 4.3878E−08 | −8.7760E−08 |
| A20 = | 1.6409E−08 | 3.5714E−08 | 2.3600E−09 | −1.5245E−09 | 2.7353E−09 |
| A22 = | — | −6.2049E−10 | −3.4935E−11 | 2.0326E−11 | −4.8950E−11 |
| A24 = | — | — | — | — | 3.8049E−13 |

| Surface # | 22 | 23 |
|---|---|---|
| k = | −6.5518E+00 | 0.0000E+00 |
| A4 = | −9.9700E−03 | −1.2280E−02 |
| A6 = | −4.9110E−03 | −2.8664E−03 |
| A8 = | 1.9600E−03 | 1.4065E−03 |
| A10 = | −2.6532E−04 | −2.9559E−04 |
| A12 = | 1.3248E−05 | 3.9094E−05 |
| A14 = | 5.0203E−07 | −3.5415E−06 |
| A16 = | −1.0604E−07 | 2.2502E−07 |
| A18 = | 6.3627E−09 | −9.9987E−09 |
| A20 = | −1.9832E−10 | 3.0355E−10 |
| A22 = | 3.2562E−12 | −5.9865E−12 |
| A24 = | −2.2356E−14 | 6.9009E−14 |
| A26 = | — | −3.5250E−16 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 7.43 | R22/ImgH | 0.94 |
| Fno | 1.80 | f/|Ri| | 0.64 |
| HFOV [deg.] | 39.1 | CTmax/CTmin | 5.24 |
| TL [mm] | 9.58 | ATmax/ATmin | 18.85 |
| ImgH [mm] | 6.13 | Td/ΣCT | 1.45 |
| V1/N1 | 36.30 | Sd/Td | 0.85 |
| V2/N2 | 10.98 | Td/Dr9r16 | 3.87 |
| V3/N3 | 10.90 | TL/EPD | 2.32 |
| V4/N4 | 36.26 | TL/ImgH | 1.56 |
| V5/N5 | 25.95 | TL/f | 1.29 |
| V6/N6 | 17.83 | TL/Y11R2 | 4.67 |
| V7/N7 | 36.26 | |f/f1| | 1.07 |
| V8/N8 | 17.83 | |f/f2| | 0.38 |
| V9/N9 | 28.57 | |f/f3| | 0.17 |
| V10/N10 | 36.26 | |f/f4| | 0.32 |
| V11/N11 | 36.48 | |f/f5| | 0.03 |
| V20 | 2 | |f/f6| | 0.13 |
| V24 | 2 | |f/f7| | 0.09 |
| Vmin | 18.4 | |f/f8| | 0.28 |
| Vmax | 56.1 | |f/f9| | 0.33 |
| Y1R1/Y11R2 | 0.42 | |f/f10| | 0.48 |
| Yc10R2 [mm] | 2.20 | |f/f11| | 1.05 |
| Yc11R2 [mm] | 2.03 | |f/f1| + |f/f2| + |f/f3| | 1.62 |
| Yc11R2/Yc10R2 | 0.93 | |f/f10| + |f/f11| | 1.53 |
| Yc11R2/f | 0.27 | ImgH/BL | 6.20 |

8th Embodiment

Figure 15:
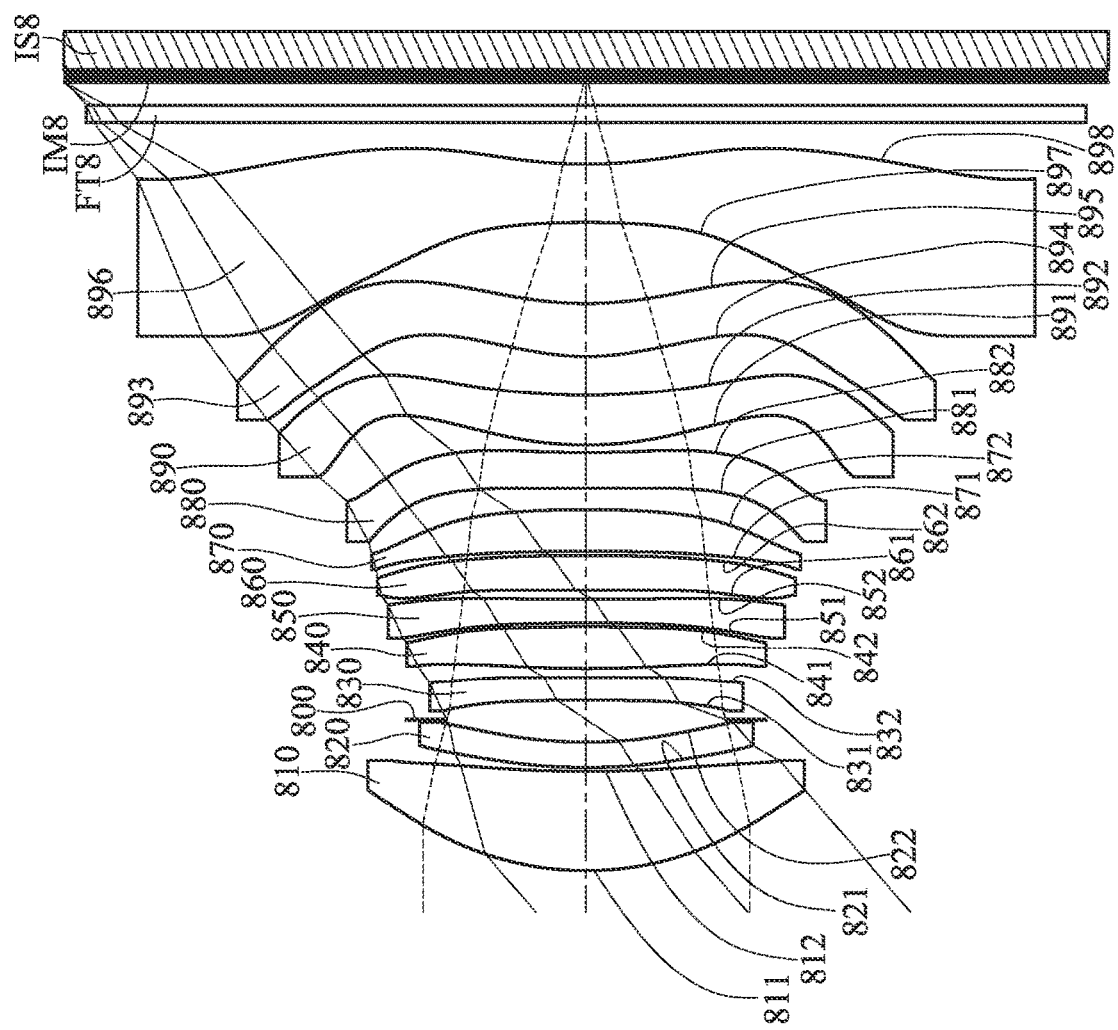
FIG. 15 is a schematic view of an image capturing unit according to the 8th embodiment of the present disclosure.
Figure 16:
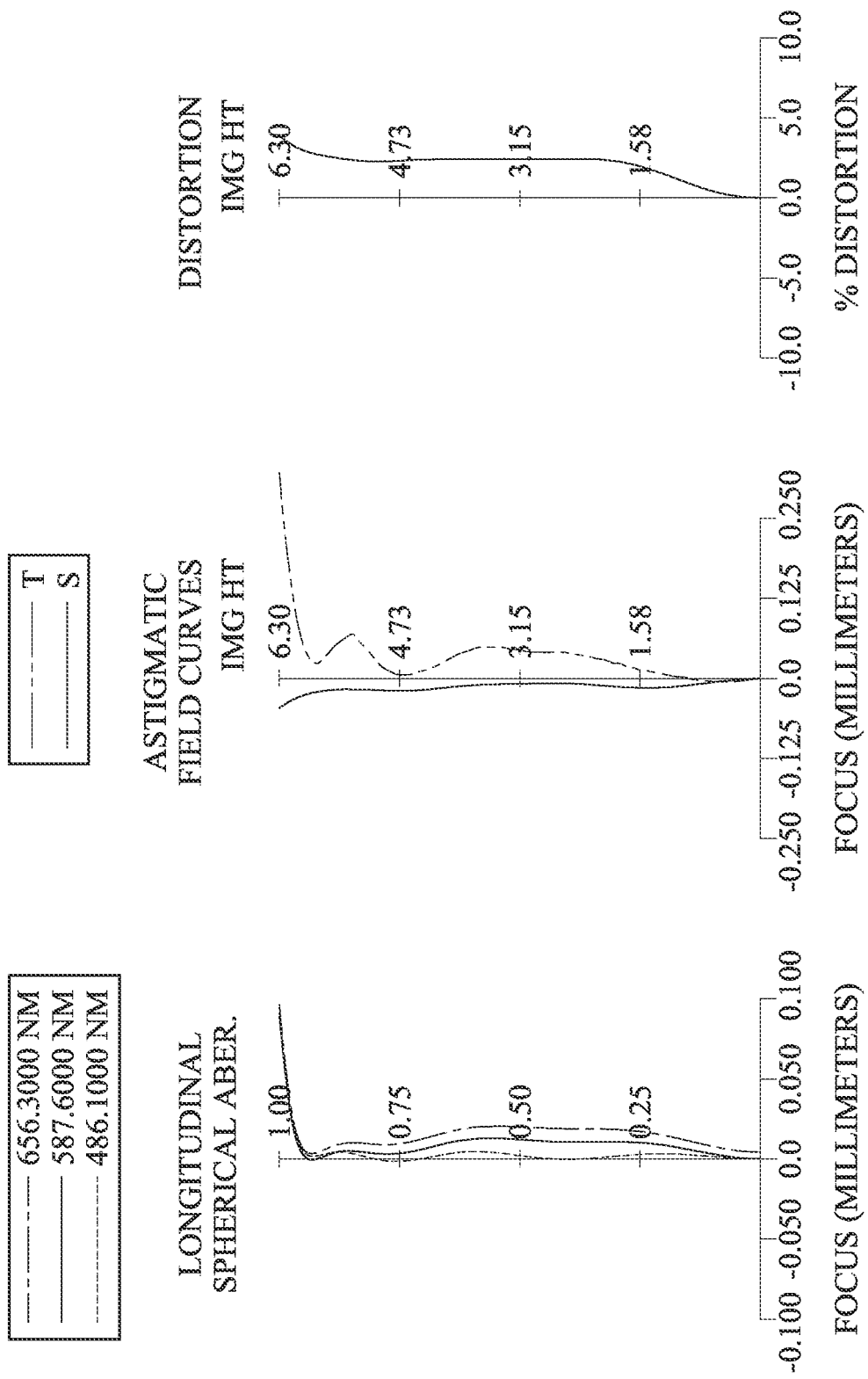
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens system (its reference numeral is omitted) of the present disclosure and an image sensor IS8. The imaging optical lens system includes, in order from an object side to an image side along an optical path, a first lens element 810, a second lens element 820, an aperture stop 800, a third lens element 830, a fourth lens element 840, a fifth lens element 850, a sixth lens element 860, a seventh lens element 870, an eighth lens element 880, a ninth lens element 890, a tenth lens element 893, an eleventh lens element 896, an IR-cut filter FT8 and an image surface IM8. The imaging optical lens system includes eleven lens elements (810, 820, 830, 840, 850, 860, 870, 880, 890, 893 and 896) with no additional lens element disposed between each of the adjacent eleven lens elements, wherein there is an air gap in a paraxial region between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one convex critical point in an off-axis region thereof.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has at least one concave critical point in an off-axis region thereof.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axis region thereof.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one convex critical point in an off-axis region thereof.

The seventh lens element 870 with positive refractive power has an object-side surface 871 being concave in a paraxial region thereof and an image-side surface 872 being convex in a paraxial region thereof. The seventh lens element 870 is made of plastic material and has the object-side surface 871 and the image-side surface 872 being both aspheric.

The eighth lens element 880 with negative refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has at least one concave critical point in an off-axis region thereof. The image-side surface 882 of the eighth lens element 880 has at least one convex critical point in an off-axis region thereof.

The ninth lens element 890 with positive refractive power has an object-side surface 891 being convex in a paraxial region thereof and an image-side surface 892 being concave in a paraxial region thereof. The ninth lens element 890 is made of plastic material and has the object-side surface 891 and the image-side surface 892 being both aspheric. The object-side surface 891 of the ninth lens element 890 has at least one concave critical point in an off-axis region thereof. The image-side surface 892 of the ninth lens element 890 has at least one convex critical point in an off-axis region thereof.

The tenth lens element 893 with positive refractive power has an object-side surface 894 being convex in a paraxial region thereof and an image-side surface 895 being concave in a paraxial region thereof. The tenth lens element 893 is made of plastic material and has the object-side surface 894 and the image-side surface 895 being both aspheric. The object-side surface 894 of the tenth lens element 893 has at least one concave critical point in an off-axis region thereof. The image-side surface 895 of the tenth lens element 893 has at least one convex critical point in an off-axis region thereof.

The eleventh lens element 896 with negative refractive power has an object-side surface 897 being concave in a paraxial region thereof and an image-side surface 898 being concave in a paraxial region thereof. The eleventh lens element 896 is made of plastic material and has the object-side surface 897 and the image-side surface 898 being both aspheric. The object-side surface 897 of the eleventh lens element 896 has at least one inflection point in an off-axis region thereof. The image-side surface 898 of the eleventh lens element 896 has at least one convex critical point and at least one concave critical point in an off-axis region thereof.

The IR-cut filter FT8 is made of glass material and located between the eleventh lens element 896 and the image surface IM8, and will not affect the focal length of the imaging optical lens system. The image sensor IS8 is disposed on or near the image surface IM8 of the imaging optical lens system.

The detailed optical data of the 8th embodiment are shown in Table 15 and the aspheric surface data are shown in Table 16 below.

TABLE 15

8th Embodiment
f = 7.02 mm, Fno = 1.78, HFOV = 40.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.793 (ASP) | 1.196 | Plastic | 1.545 | 56.1 | 8.01 |
| 2 | | 25.785 (ASP) | 0.046 | | | | |
| 3 | Lens 2 | 8.329 (ASP) | 0.306 | Plastic | 1.686 | 18.4 | −30.75 |
| 4 | | 5.882 (ASP) | 0.273 | | | | |
| 5 | Ape. Stop | Plano | 0.235 | | | | |
| 6 | Lens 3 | −60.558 (ASP) | 0.280 | Plastic | 1.686 | 18.4 | −49.82 |
| 7 | | 78.628 (ASP) | 0.110 | | | | |
| 8 | Lens 4 | 17.187 (ASP) | 0.502 | Plastic | 1.544 | 56.0 | 17.65 |
| 9 | | −21.530 (ASP) | 0.050 | | | | |
| 10 | Lens 5 | −17.271 (ASP) | 0.280 | Plastic | 1.634 | 23.8 | −22.24 |
| 11 | | 77.235 (ASP) | 0.114 | | | | |
| 12 | Lens 6 | −2123.931 (ASP) | 0.417 | Plastic | 1.544 | 56.0 | 45.16 |
| 13 | | −24.288 (ASP) | 0.053 | | | | |
| 14 | Lens 7 | −24.424 (ASP) | 0.500 | Plastic | 1.544 | 56.0 | 71.19 |
| 15 | | −15.087 (ASP) | 0.260 | | | | |
| 16 | Lens 8 | 66.969 (ASP) | 0.430 | Plastic | 1.634 | 23.8 | −34.41 |
| 17 | | 16.415 (ASP) | 0.092 | | | | |
| 18 | Lens 9 | 4.920 (ASP) | 0.601 | Plastic | 1.562 | 44.6 | 23.06 |
| 19 | | 7.583 (ASP) | 0.470 | | | | |
| 20 | Lens 10 | 3.035 (ASP) | 0.641 | Plastic | 1.566 | 37.4 | 15.42 |

TABLE 15-continued

8th Embodiment
f = 7.02 mm, Fno = 1.78, HFOV = 40.8 deg.

| Surface # | | Curvature Radius | | Thickness | Material | Index | Abbe # | Focal Length |
|---|---|---|---|---|---|---|---|---|
| 21 | | 4.296 | (ASP) | 0.980 | | | | |
| 22 | Lens 11 | −11.496 | (ASP) | 0.700 | Plastic | 1.534 | 56.0 | −7.24 |
| 23 | | 5.948 | (ASP) | 0.500 | | | | |
| 24 | IR-cut Filter | Plano | | 0.210 | Glass | 1.517 | 64.2 | — |
| 25 | | Plano | | 0.286 | | | | |
| 26 | Image | Plano | | — | | | | |

Note:
Reference wavelength is 587.6 nm (d-line).

TABLE 16

Aspheric Coefficients

| Surface # | 1 | 2 | 3 | 4 | 6 |
|---|---|---|---|---|---|
| k = | −9.2212E−01 | −9.0995E+01 | −3.6784E+00 | −4.4944E−01 | −1.0219E+01 |
| A4 = | 1.6615E−03 | 3.1316E−02 | 3.4265E−02 | 1.2860E−02 | −5.6883E−03 |
| A6 = | −2.1600E−05 | −2.9646E−02 | −3.0907E−02 | −1.4605E−02 | −4.3722E−03 |
| A8 = | 3.7500E−04 | 1.4659E−02 | 1.2806E−02 | 8.0781E−03 | −2.0417E−03 |
| A10 = | −2.2506E−04 | −4.3790E−03 | −2.8150E−03 | 1.4224E−03 | 3.0328E−03 |
| A12 = | 6.2494E−05 | 7.8512E−04 | 2.4602E−04 | 1.4224E−03 | −1.2624E−03 |
| A14 = | −8.7108E−06 | −7.8171E−05 | 1.9081E−05 | −2.7820E−04 | 2.7269E−04 |
| A16 = | 4.6536E−07 | 3.3634E−06 | −3.8861E−06 | 2.1157E−05 | −2.8202E−05 |

| Surface # | 7 | 8 | 9 | 10 | 11 |
|---|---|---|---|---|---|
| k = | 4.9989E+01 | −5.1967E+01 | 5.9893E+01 | 6.7525E+00 | 0.0000E+00 |
| A4 = | −2.0733E−03 | 7.1452E−03 | 1.4738E−02 | 2.0790E−02 | 1.6885E−02 |
| A6 = | −2.8409E−03 | 2.1486E−03 | −1.1449E−02 | −2.8283E−02 | −2.2130E−02 |
| A8 = | −9.0298E−03 | −1.2466E−02 | 2.3087E−03 | 1.5194E−02 | 1.1436E−02 |
| A10 = | 8.3547E−03 | 7.9269E−03 | −6.2108E−04 | −4.3131E−03 | −3.0798E−03 |
| A12 = | −2.8580E−03 | −2.1946E−03 | 3.7998E−04 | 6.3955E−04 | 3.6858E−04 |
| A14 = | 4.6047E−04 | 2.8915E−04 | −9.8116E−05 | −4.2768E−05 | 3.0221E−06 |
| A16 = | −3.0418E−05 | −1.5129E−05 | 8.3132E−06 | 7.9962E−07 | −4.7569E−06 |
| A18 = | — | — | — | — | 3.1074E−07 |

| Surface # | 12 | 13 | 14 | 15 | 16 |
|---|---|---|---|---|---|
| k = | 0.0000E+00 | 4.8989E+01 | 4.0947E+01 | 0.0000E+00 | 0.0000E+00 |
| A4 = | 2.0669E−03 | −6.2783E−03 | −3.4755E−03 | −1.1833E−02 | −6.0914E−03 |
| A6 = | −6.6470E−03 | 7.8198E−03 | 9.6576E−03 | 8.2358E−03 | −6.3707E−03 |
| A8 = | 3.9820E−03 | −5.6648E−03 | −9.0069E−03 | −6.7565E−03 | 5.3398E−03 |
| A10 = | −2.2904E−03 | 2.0945E−03 | 3.7278E−03 | 2.7730E−03 | −2.4268E−03 |
| A12 = | 8.0434E−04 | −4.2364E−04 | −7.8369E−04 | −8.0665E−04 | 5.9296E−04 |
| A14 = | −1.4774E−05 | 4.3915E−05 | 8.2145E−05 | 1.8328E−04 | −8.0503E−05 |
| A16 = | 1.3502E−05 | −1.8125E−06 | −3.4275E−06 | −2.8466E−05 | 5.6358E−06 |
| A18 = | −4.8677E−07 | — | — | 2.5076E−06 | −1.5429E−07 |
| A20 = | — | — | — | −9.2314E−08 | — |

| Surface # | 17 | 18 | 19 | 20 | 21 |
|---|---|---|---|---|---|
| k = | 0.0000E+00 | −1.5851E+00 | 0.0000E+00 | −1.1008E+00 | −1.1712E+00 |
| A4 = | 1.7797E−02 | 2.5276E−02 | −2.4924E−02 | −3.8234E−02 | −7.6324E−03 |
| A6 = | −4.0771E−02 | −2.6974E−02 | 2.6241E−02 | 8.5866E−03 | −4.5702E−03 |
| A8 = | 2.4097E−02 | 1.4328E−02 | −1.4068E−02 | −2.4474E−03 | 1.9959E−03 |
| A10 = | −8.4076E−03 | −5.4372E−03 | 4.4262E−03 | 4.8740E−04 | −5.3377E−04 |
| A12 = | 1.8675E−03 | 1.4684E−03 | −8.9706E−04 | −7.7207E−05 | 9.6387E−05 |
| A14 = | −2.6871E−04 | −2.7719E−04 | 1.1943E−04 | 9.5964E−06 | −1.1810E−05 |
| A16 = | 2.4311E−05 | 3.5158E−05 | −1.0374E−05 | −8.0694E−07 | 9.6711E−07 |
| A18 = | −1.2559E−06 | −2.8281E−06 | 5.6610E−07 | 4.0918E−08 | −5.1391E−08 |
| A20 = | 2.8285E−08 | 1.2950E−07 | −1.7609E−08 | −1.1140E−09 | 1.6802E−09 |
| A22 = | — | −2.5565E−09 | 2.3797E−10 | 1.2429E−11 | −3.0313E−11 |
| A24 = | — | — | — | — | 2.2715E−13 |

| Surface # | 22 | 23 |
|---|---|---|
| k = | −2.5985E+00 | 0.0000E+00 |
| A4 = | −3.3357E−03 | 2.9438E−03 |
| A6 = | −9.6107E−03 | −9.4829E−03 |
| A8 = | 3.1611E−03 | 2.8873E−03 |
| A10 = | −4.0640E−04 | −4.9885E−04 |
| A12 = | 1.7996E−05 | 5.6978E−05 |
| A14 = | 1.2344E−06 | −4.5098E−06 |

TABLE 16-continued

| Aspheric Coefficients | | |
|---|---|---|
| A16 = | −2.1261E−07 | 2.5101E−07 |
| A18 = | 1.2873E−08 | −9.7868E−09 |
| A20 = | −4.1619E−10 | 2.6147E−10 |
| A22 = | 7.1557E−12 | −4.5555E−12 |
| A24 = | −5.1644E−14 | 4.6587E−14 |
| A26 = | — | −2.1197E−16 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 7.02 | R22/ImgH | 0.94 |
| Fno | 1.78 | f/|Ri| | 0.61 |
| HFOV [deg.] | 40.8 | CTmax/CTmin | 4.27 |
| TL [mm] | 9.53 | ATmax/ATmin | 21.30 |
| ImgH [mm] | 6.30 | Td/ΣCT | 1.46 |
| V1/N1 | 36.30 | Sd/Td | 0.79 |
| V2/N2 | 10.90 | Td/Dr9r16 | 4.16 |
| V3/N3 | 10.90 | TL/EPD | 2.42 |
| V4/N4 | 36.26 | TL/ImgH | 1.51 |
| V5/N5 | 14.59 | TL/f | 1.36 |
| V6/N6 | 36.26 | TL/Y11R2 | 5.67 |
| V7/N7 | 36.26 | |f/f1| | 0.88 |
| V8/N8 | 14.59 | |f/f2| | 0.23 |
| V9/N9 | 28.57 | |f/f3| | 0.14 |
| V10/N10 | 23.91 | |f/f4| | 0.40 |
| V11/N11 | 36.48 | |f/f5| | 0.32 |
| V20 | 2 | |f/f6| | 0.16 |
| V24 | 4 | |f/f7| | 0.10 |
| Vmin | 18.4 | |f/f8| | 0.20 |
| Vmax | 56.1 | |f/f9| | 0.30 |
| Y1R1/Y11R2 | 0.49 | |f/f10| | 0.46 |
| Yc10R2 [mm] | 2.17 | |f/f11| | 0.97 |
| Yc11R2 [mm] | 2.14 | |f/f1| + |f/f2| + |f/f3| | 1.25 |
| Yc11R2/Yc10R2 | 0.99 | |f/f10| + |f/f11| | 1.43 |
| Yc11R2/f | 0.30 | ImgH/BL | 6.33 |

9th Embodiment

Figure 17:
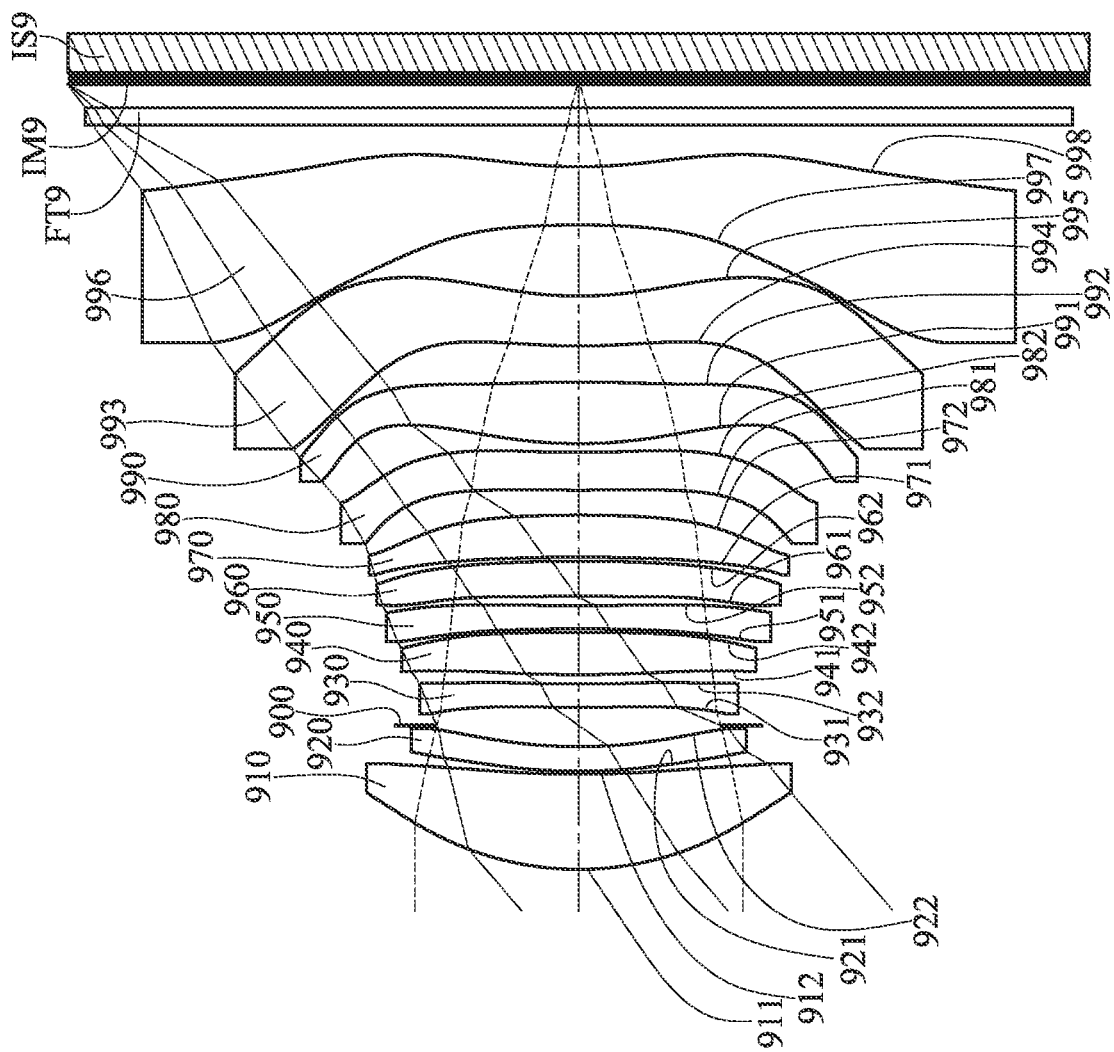
FIG. 17 is a schematic view of an image capturing unit according to the 9th embodiment of the present disclosure.
Figure 18:
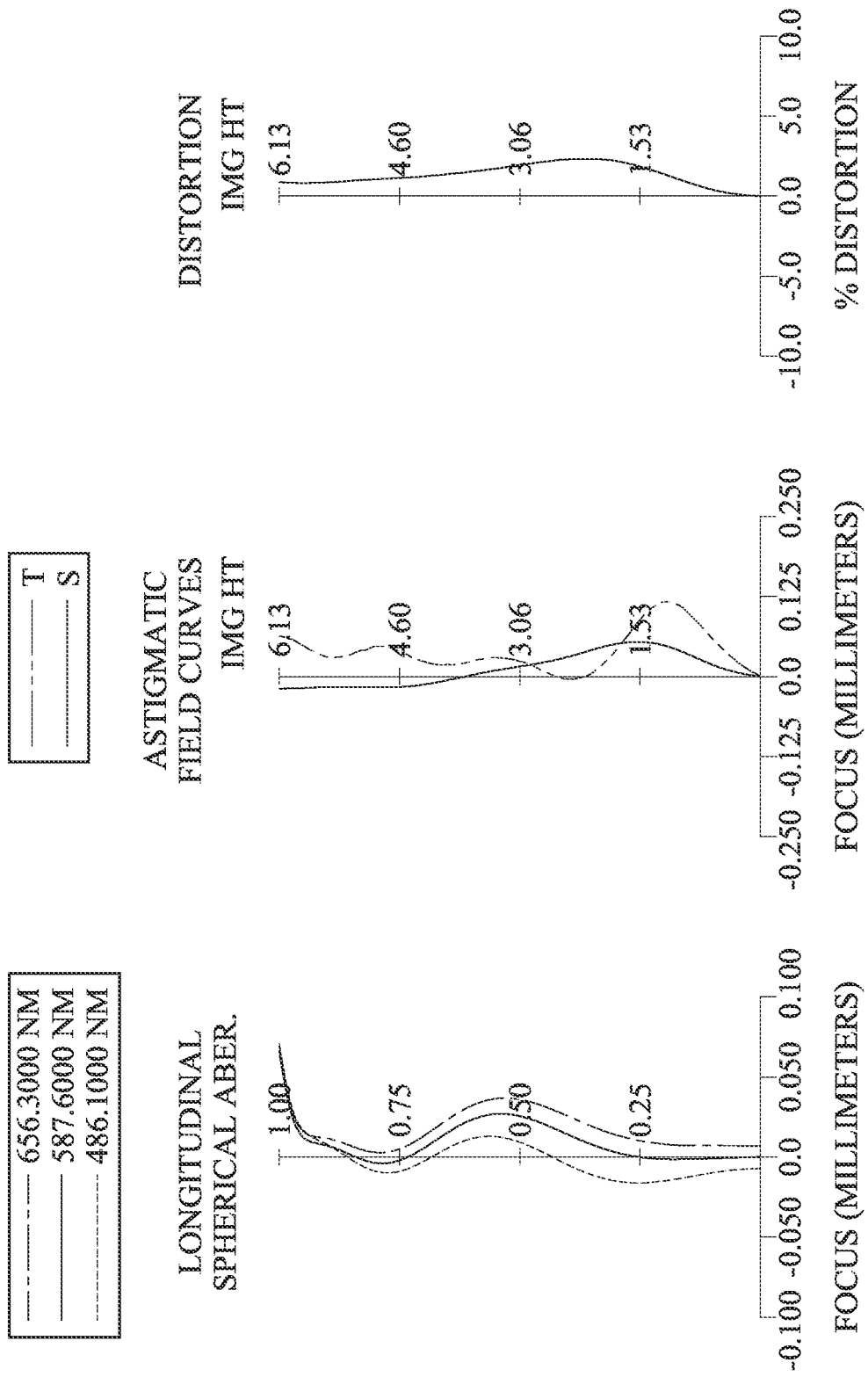
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens system (its reference numeral is omitted) of the present disclosure and an image sensor IS9. The imaging optical lens system includes, in order from an object side to an image side along an optical path, a first lens element 910, a second lens element 920, an aperture stop 900, a third lens element 930, a fourth lens element 940, a fifth lens element 950, a sixth lens element 960, a seventh lens element 970, an eighth lens element 980, a ninth lens element 990, a tenth lens element 993, an eleventh lens element 996, an IR-cut filter FT9 and an image surface IM9. The imaging optical lens system includes eleven lens elements (910, 920, 930, 940, 950, 960, 970, 980, 990, 993 and 996) with no additional lens element disposed between each of the adjacent eleven lens elements, wherein there is an air gap in a paraxial region between each of all adjacent lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one concave critical point in an off-axis region thereof. The image-side surface 932 of the third lens element 930 has at least one convex critical point in an off-axis region thereof.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one concave critical point in an off-axis region thereof.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axis region thereof.

The sixth lens element 960 with positive refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one convex critical point in an off-axis region thereof.

The seventh lens element 970 with positive refractive power has an object-side surface 971 being concave in a paraxial region thereof and an image-side surface 972 being convex in a paraxial region thereof. The seventh lens element 970 is made of plastic material and has the object-side surface 971 and the image-side surface 972 being both aspheric.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has at least one concave critical point in an off-axis region thereof. The image-side surface 982 of the eighth lens element 980 has at least one convex critical point in an off-axis region thereof.

The ninth lens element 990 with positive refractive power has an object-side surface 991 being convex in a paraxial region thereof and an image-side surface 992 being convex in a paraxial region thereof. The ninth lens element 990 is made of plastic material and has the object-side surface 991 and the image-side surface 992 being both aspheric. The object-side surface 991 of the ninth lens element 990 has at least one concave critical point in an off-axis region thereof.

The tenth lens element 993 with negative refractive power has an object-side surface 994 being convex in a paraxial region thereof and an image-side surface 995 being concave in a paraxial region thereof. The tenth lens element 993 is made of plastic material and has the object-side surface 994 and the image-side surface 995 being both aspheric. The object-side surface 994 of the tenth lens element 993 has at least one concave critical point in an off-axis region thereof. The image-side surface 995 of the tenth lens element 993 has at least one convex critical point in an off-axis region thereof.

The eleventh lens element 996 with negative refractive power has an object-side surface 997 being concave in a paraxial region thereof and an image-side surface 998 being concave in a paraxial region thereof. The eleventh lens element 996 is made of plastic material and has the object-side surface 997 and the image-side surface 998 being both aspheric. The object-side surface 997 of the eleventh lens element 996 has at least one inflection point in an off-axis region thereof. The image-side surface 998 of the eleventh lens element 996 has at least one convex critical point.

The IR-cut filter FT9 is made of glass material and located between the eleventh lens element 996 and the image surface IM9, and will not affect the focal length of the imaging optical lens system. The image sensor IS9 is disposed on or near the image surface IM9 of the imaging optical lens system.

The detailed optical data of the 9th embodiment are shown in Table 17 and the aspheric surface data are shown in Table 18 below.

TABLE 17

9th Embodiment
f = 7.05 mm, Fno = 1.79, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.722 | (ASP) | 1.146 | Plastic | 1.545 | 56.1 | 8.07 |
| 2 | | 21.545 | (ASP) | 0.037 | | | | |
| 3 | Lens 2 | 9.362 | (ASP) | 0.293 | Plastic | 1.686 | 18.4 | −29.94 |
| 4 | | 6.349 | (ASP) | 0.256 | | | | |
| 5 | Ape. Stop | Plano | | 0.218 | | | | |
| 6 | Lens 3 | 35.453 | (ASP) | 0.280 | Plastic | 1.686 | 18.4 | −73.16 |
| 7 | | 20.710 | (ASP) | 0.113 | | | | |
| 8 | Lens 4 | 19.251 | (ASP) | 0.510 | Plastic | 1.544 | 56.0 | 18.70 |
| 9 | | −21.381 | (ASP) | 0.041 | | | | |
| 10 | Lens 5 | −19.354 | (ASP) | 0.280 | Plastic | 1.634 | 23.8 | −25.31 |
| 11 | | 94.377 | (ASP) | 0.110 | | | | |
| 12 | Lens 6 | −163.283 | (ASP) | 0.422 | Plastic | 1.544 | 56.0 | 48.52 |
| 13 | | −22.743 | (ASP) | 0.050 | | | | |
| 14 | Lens 7 | −22.211 | (ASP) | 0.505 | Plastic | 1.544 | 56.0 | 131.13 |
| 15 | | −17.073 | (ASP) | 0.300 | | | | |
| 16 | Lens 8 | 43.192 | (ASP) | 0.455 | Plastic | 1.634 | 23.8 | −61.23 |
| 17 | | 20.362 | (ASP) | 0.104 | | | | |
| 18 | Lens 9 | 6.041 | (ASP) | 0.740 | Plastic | 1.562 | 44.6 | 8.44 |
| 19 | | −21.118 | (ASP) | 0.434 | | | | |
| 20 | Lens 10 | 6.919 | (ASP) | 0.600 | Plastic | 1.566 | 37.4 | −21.62 |
| 21 | | 4.281 | (ASP) | 0.856 | | | | |
| 22 | Lens 11 | −11.956 | (ASP) | 0.700 | Plastic | 1.534 | 56.0 | −7.32 |
| 23 | | 5.929 | (ASP) | 0.500 | | | | |
| 24 | IR-cut Filter | Plano | | 0.210 | Glass | 1.517 | 64.2 | — |
| 25 | | Plano | | 0.271 | | | | |
| 26 | Image | Plano | | — | | | | |

Note:
Reference wavelength is 587.6 nm (d-line).

TABLE 18

Aspheric Coefficients

| Surface # | 1 | 2 | 3 | 4 | 6 |
|---|---|---|---|---|---|
| k = | −9.4030E−01 | −9.9000E+01 | −4.8377E+00 | −5.1437E−01 | −9.9000E+01 |
| A4 = | 3.7812E−03 | 3.6882E−02 | 3.9241E−02 | 1.2358E−02 | −5.7781E−03 |
| A6 = | −2.3569E−03 | −3.7305E−02 | −3.7892E−02 | −1.2987E−02 | −4.4563E−03 |
| A8 = | 1.7707E−03 | 1.8992E−02 | 1.6854E−02 | 5.0872E−03 | −2.8888E−03 |
| A10 = | −7.2121E−04 | −5.7120E−03 | −3.9813E−03 | −1.2545E−03 | 4.3003E−03 |
| A12 = | 1.6430E−04 | 1.0213E−03 | 4.1458E−04 | 1.8302E−04 | −1.9548E−03 |
| A14 = | −1.9790E−05 | −1.0117E−04 | 6.5715E−06 | −9.4261E−06 | 4.3030E−04 |
| A16 = | 9.5735E−07 | 4.3317E−06 | −3.3856E−06 | −1.0429E−06 | −4.0254E−05 |

TABLE 18-continued

Aspheric Coefficients

| Surface # | 7 | 8 | 9 | 10 | 11 |
|---|---|---|---|---|---|
| k = | 5.0000E+01 | -4.1568E+01 | 5.9952E+01 | -4.6099E-01 | 0.0000E+00 |
| A4 = | -5.5174E-04 | 8.7335E-03 | 1.4548E-02 | 2.1948E-02 | 1.6499E-02 |
| A6 = | -4.9659E-03 | -1.2475E-03 | -1.2018E-02 | -2.9380E-02 | -1.8701E-02 |
| A8 = | -7.3923E-03 | -9.2864E-03 | 3.3687E-03 | 1.5621E-02 | 5.7316E-03 |
| A10 = | 7.6037E-03 | 6.1038E-03 | -1.3252E-03 | -4.4000E-03 | 5.2023E-04 |
| A12 = | -2.6480E-03 | -1.5763E-03 | 5.9651E-04 | 6.5621E-04 | -8.2554E-04 |
| A14 = | 4.2670E-04 | 1.8206E-04 | -1.3020E-04 | -4.5864E-05 | 2.2432E-04 |
| A16 = | -2.8019E-05 | -7.8875E-06 | 1.0193E-05 | 1.0525E-06 | -2.6452E-05 |
| A18 = | — | — | — | — | 1.1893E-06 |

| Surface # | 12 | 13 | 14 | 15 | 16 |
|---|---|---|---|---|---|
| k = | 0.0000E+00 | 4.9386E+01 | 4.9078E+01 | 0.0000E+00 | 0.0000E+00 |
| A4 = | 2.0356E-03 | -6.3962E-03 | -4.5918E-03 | -7.3015E-03 | -1.4633E-03 |
| A6 = | -5.0185E-03 | 6.8868E-03 | 1.3913E-02 | -6.4204E-03 | -1.7361E-02 |
| A8 = | 1.5289E-03 | -5.1383E-03 | -1.2649E-02 | 9.5285E-03 | 1.4281E-02 |
| A10 = | -6.9813E-04 | 1.9720E-03 | 5.1911E-03 | -7.0194E-03 | -6.3201E-03 |
| A12 = | 2.6136E-04 | -4.1406E-04 | -1.0953E-03 | 2.6952E-03 | 1.5534E-03 |
| A14 = | -4.5651E-05 | 4.4273E-05 | 1.1614E-04 | -5.7980E-04 | -2.1410E-04 |
| A16 = | 3.4640E-06 | -1.8643E-06 | -4.9246E-06 | 7.0919E-05 | 1.5254E-05 |
| A18 = | -8.3521E-08 | — | — | -4.6025E-06 | -4.2652E-07 |
| A20 = | — | — | — | 1.2270E-07 | — |

| Surface # | 17 | 18 | 19 | 20 | 21 |
|---|---|---|---|---|---|
| k = | 0.0000E+00 | -1.7751E+00 | 0.0000E+00 | -2.4102E-01 | -1.3202E+00 |
| A4 = | 2.6229E-02 | 1.8071E-02 | -1.0670E-02 | -4.0558E-02 | -1.9257E-02 |
| A6 = | -5.5722E-02 | -2.0525E-02 | 2.8981E-02 | 2.0041E-02 | 3.9347E-03 |
| A8 = | 3.6293E-02 | 8.6790E-03 | -2.0257E-02 | -1.0606E-02 | -1.8997E-03 |
| A10 = | -1.3889E-02 | -2.5046E-03 | 7.5330E-03 | 3.2392E-03 | 5.7394E-04 |
| A12 = | 3.3514E-03 | 5.6568E-04 | -1.7344E-03 | -6.1745E-04 | -1.0583E-04 |
| A14 = | -5.1783E-04 | -1.0661E-04 | 2.5717E-04 | 7.5980E-05 | 1.2712E-05 |
| A16 = | 4.9749E-05 | 1.5343E-05 | -2.4565E-05 | -5.9841E-06 | -1.0308E-06 |
| A18 = | -2.7040E-06 | -1.4685E-06 | 1.4566E-06 | 2.8977E-07 | 5.6413E-08 |
| A20 = | 6.3523E-08 | 8.0052E-08 | -4.8565E-08 | -7.8354E-09 | -1.9981E-09 |
| A22 = | — | -1.8481E-09 | 6.9200E-10 | 9.0433E-11 | 4.1201E-11 |
| A24 = | — | — | — | — | -3.7364E-13 |

| Surface # | 22 | 23 |
|---|---|---|
| k = | -1.9198E+00 | 0.0000E+00 |
| A4 = | -9.2068E-03 | -1.3751E-02 |
| A6 = | -2.0319E-03 | -1.9436E-04 |
| A8 = | 3.3386E-04 | 2.1790E-04 |
| A10 = | 1.4167E-04 | -3.8753E-05 |
| A12 = | -4.6783E-05 | 5.1963E-06 |
| A14 = | 6.1955E-06 | -5.1364E-07 |
| A16 = | -4.6314E-07 | 3.4938E-08 |
| A18 = | 2.1094E-08 | -1.6009E-09 |
| A20 = | -5.8246E-10 | 4.8639E-11 |
| A22 = | 8.9914E-12 | -9.4209E-13 |
| A24 = | -5.9676E-14 | 1.0563E-14 |
| A26 = | — | -5.2329E-17 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 7.05 | R22/ImgH | 0.97 |
| Fno | 1.79 | f/|Ri| | 0.59 |
| HFOV [deg.] | 40.7 | CTmax/CTmin | 4.09 |
| TL [mm] | 9.43 | ATmax/ATmin | 23.14 |
| ImgH [mm] | 6.13 | Td/ΣCT | 1.42 |
| V1/N1 | 36.30 | Sd/Td | 0.80 |
| V2/N2 | 10.90 | Td/Dr9r16 | 3.98 |
| V3/N3 | 10.90 | TL/EPD | 2.40 |
| V4/N4 | 36.26 | TL/ImgH | 1.54 |
| V5/N5 | 14.59 | TL/f | 1.34 |
| V6/N6 | 36.26 | TL/Y11R2 | 6.67 |
| V7/N7 | 36.26 | |f/f1| | 0.87 |
| V8/N8 | 14.59 | |f/f2| | 0.24 |
| V9/N9 | 28.57 | |f/f3| | 0.10 |
| V10/N10 | 23.91 | |f/f4| | 0.38 |
| V11/N11 | 36.48 | |f/f5| | 0.28 |
| V20 | 2 | |f/f6| | 0.15 |
| V24 | 4 | |f/f7| | 0.05 |

-continued

| 9th Embodiment | | | |
|---|---|---|---|
| Vmin | 18.4 | \|f/f8\| | 0.12 |
| Vmax | 56.1 | \|f/f9\| | 0.83 |
| Y1R1/Y11R2 | 0.48 | \|f/f10\| | 0.33 |
| Yc10R2 [mm] | 2.04 | \|f/f11\| | 0.96 |
| Yc11R2 [mm] | 1.96 | \|f/f1\| + \|f/f2\| + \|f/f3\| | 1.20 |
| Yc11R2/Yc10R2 | 0.96 | \|f/f10\| + \|f/f11\| | 1.29 |
| Yc11R2/f | 0.28 | ImgH/BL | 6.25 |

10th Embodiment

Figure 19:
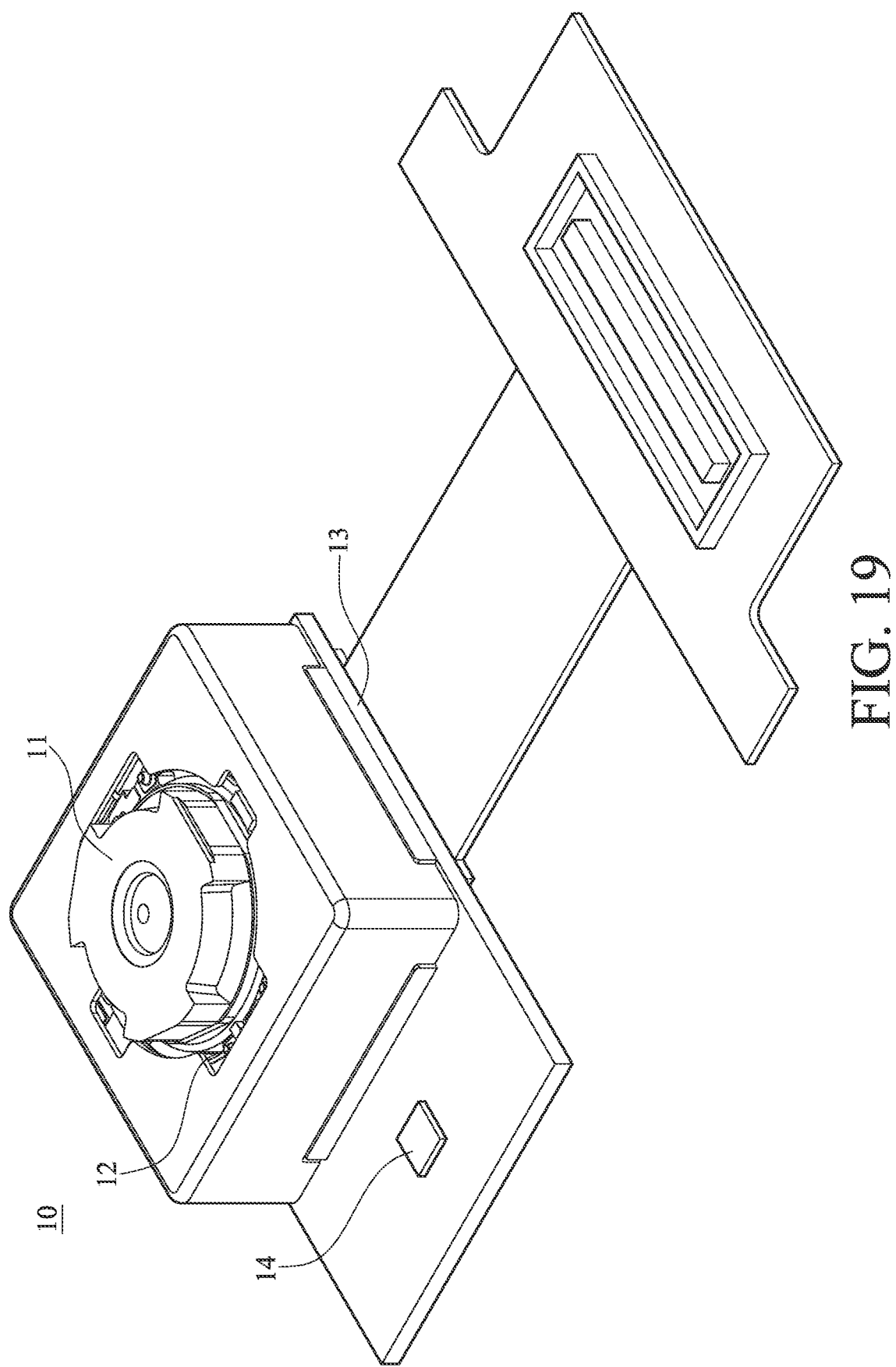
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the imaging optical lens system disclosed in the 1st embodiment, a barrel and a holder member (their reference numerals are omitted) for holding the imaging optical lens system. However, the lens unit 11 may alternatively be provided with the imaging optical lens system disclosed in other abovementioned embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

11th Embodiment

Figure 20:
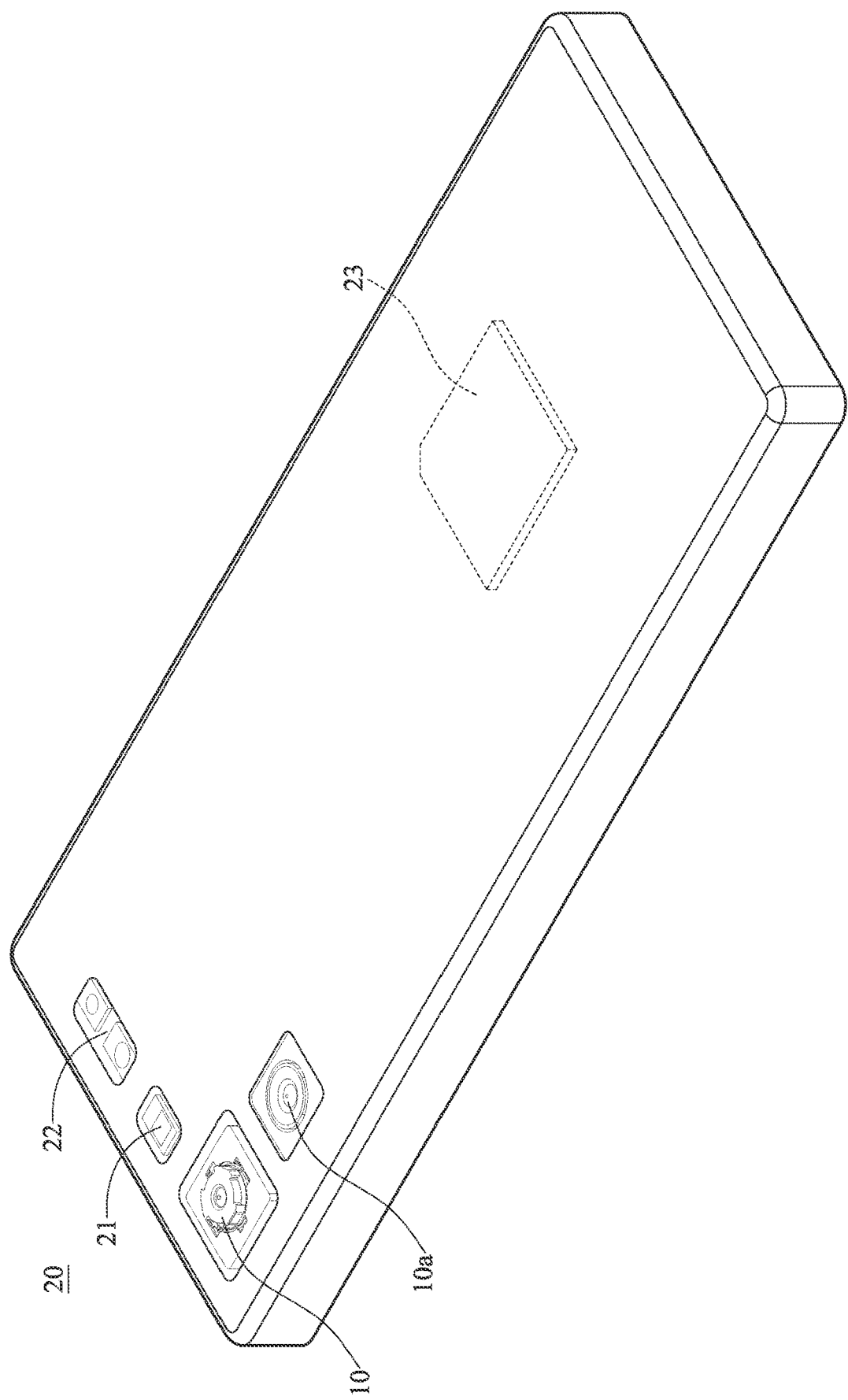
FIG. 20 is one perspective view of an electronic device according to the 11th embodiment of the present disclosure.
Figure 21:
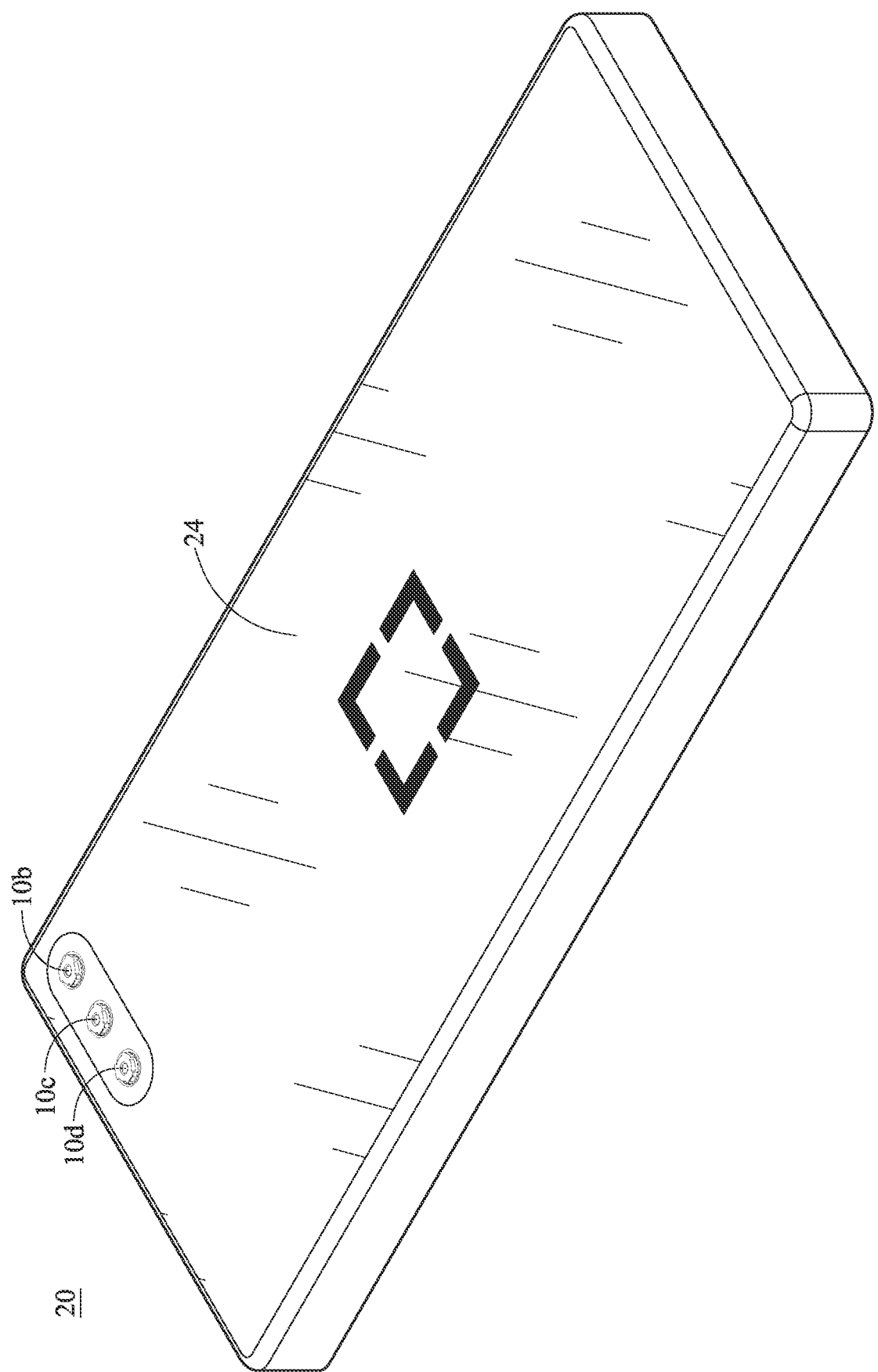
FIG. 21 is another perspective view of the electronic device in FIG. 20.
Figure 22:
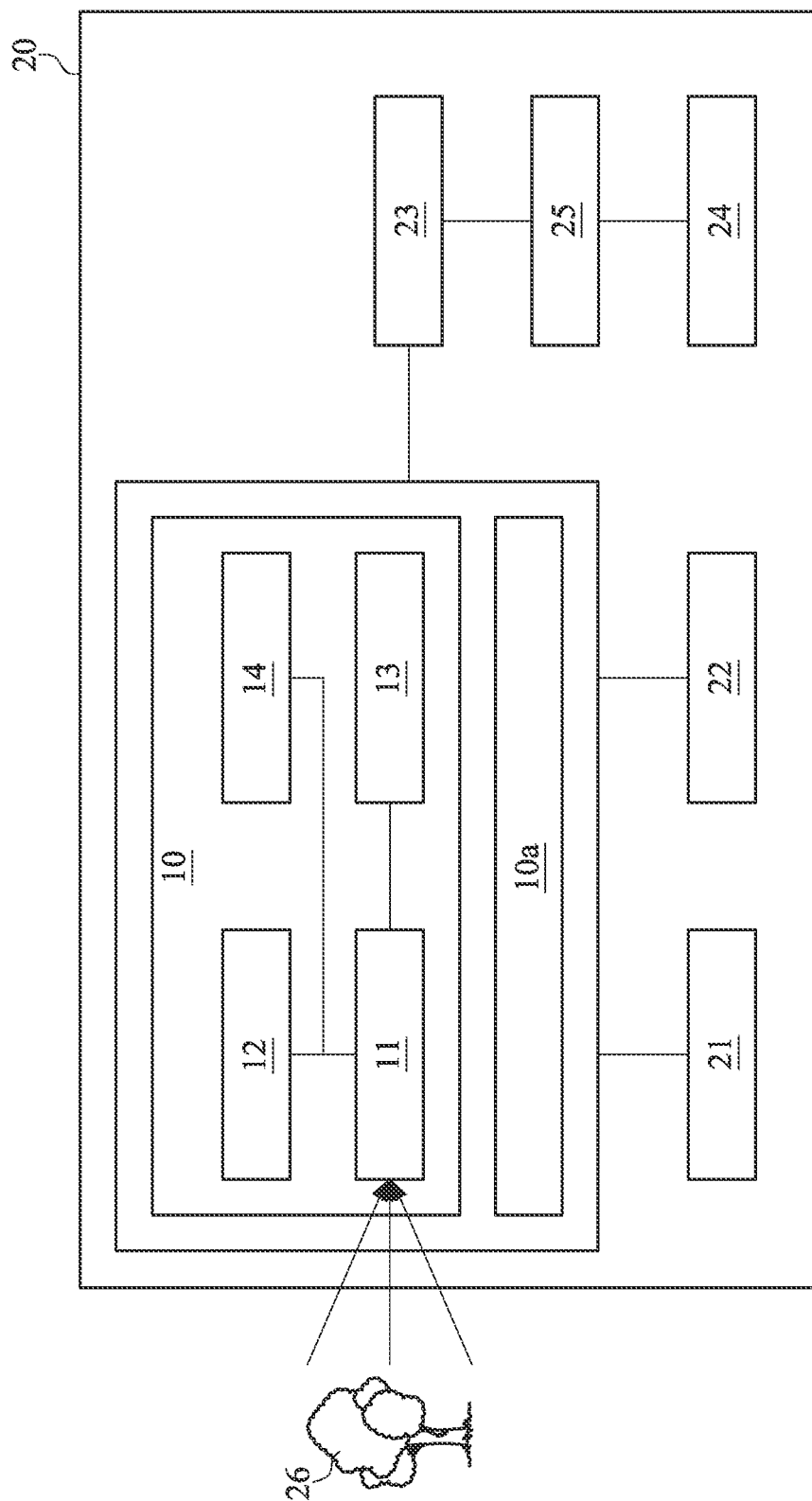
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 20 is a smartphone including the image capturing unit 10 disclosed in the 10th embodiment, an image capturing unit 10a, an image capturing unit 10b, an image capturing unit 10c, an image capturing unit 10d, a flash module 21, a focus assist module 22, an image signal processor 23, a user interface 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the user interface 24 are disposed on the opposite side of the electronic device 20 and the user interface 24 is a display unit, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the imaging optical lens system of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the imaging optical lens system of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10, 10a have different fields of view, such that the electronic device 20 can have various magnification ratios so as to meet the requirement of optical zoom functionality. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate images. The user interface 24 can include a touch screen, and the user is able to interact with the user interface 24 and the image software processor 25 having multiple functions to capture images and complete image processing. Alternatively, the user may capture images via a physical button. The image processed by the image software processor 25 can be displayed on the user interface 24.

12th Embodiment

Figure 23:
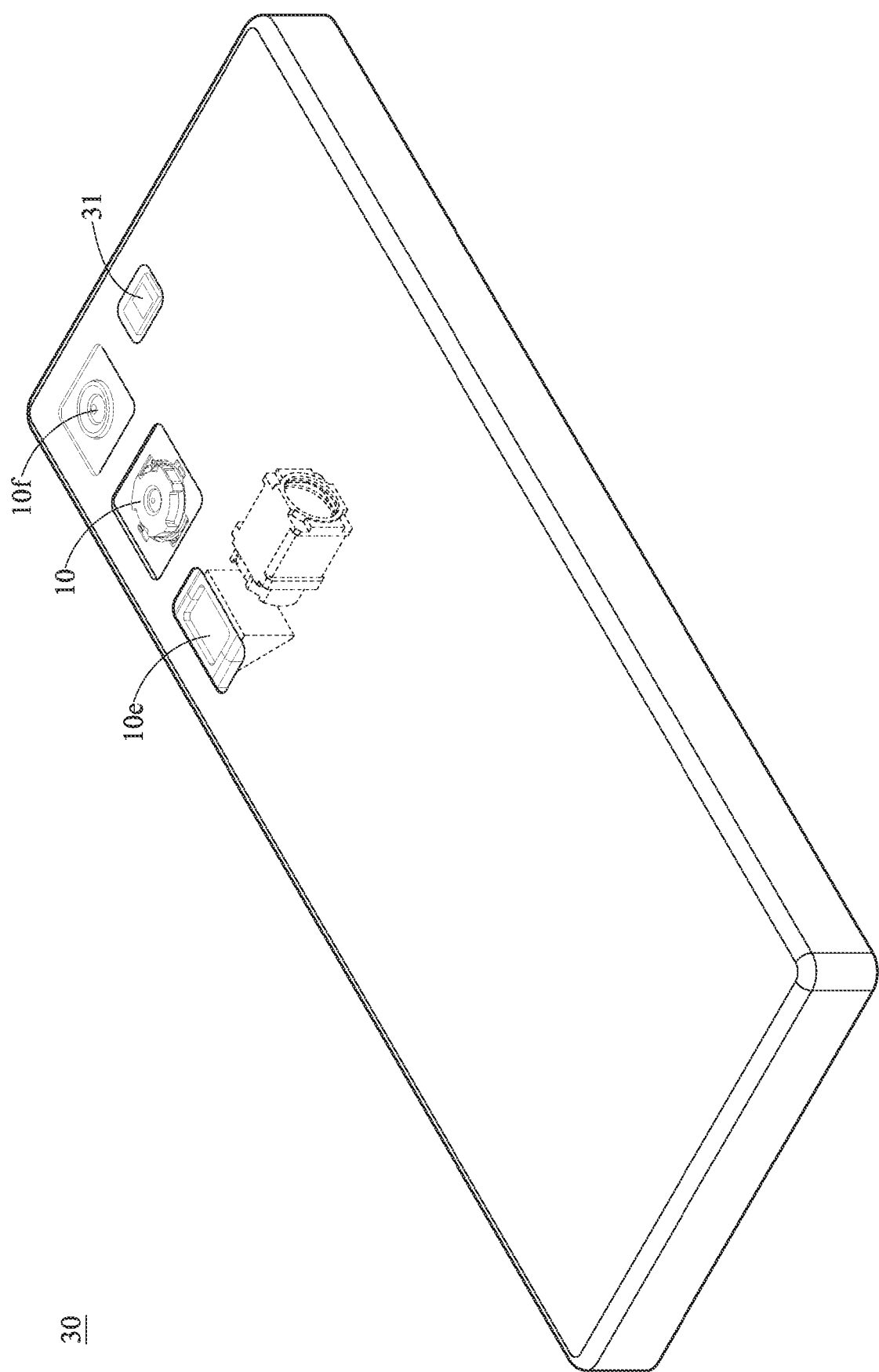
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 30 is a smartphone including the image capturing unit 10 disclosed in the 10th embodiment, an image capturing unit 10e, an image capturing unit 10f, a flash module 31, a focus assist module, an image signal processor, a display unit and an image software processor (not shown). The image capturing unit 10, the image capturing unit 10e and the image capturing unit 10f are disposed on the same side of the electronic device 30, while the display unit is disposed on the opposite side of the electronic device 30. Furthermore, each of the image capturing units 10e and 10f can include the imaging optical lens system of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 26 to FIG. 28 which can be referred to foregoing descriptions corresponding to FIG. 26 to FIG. 28 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

13th Embodiment

Figure 24:
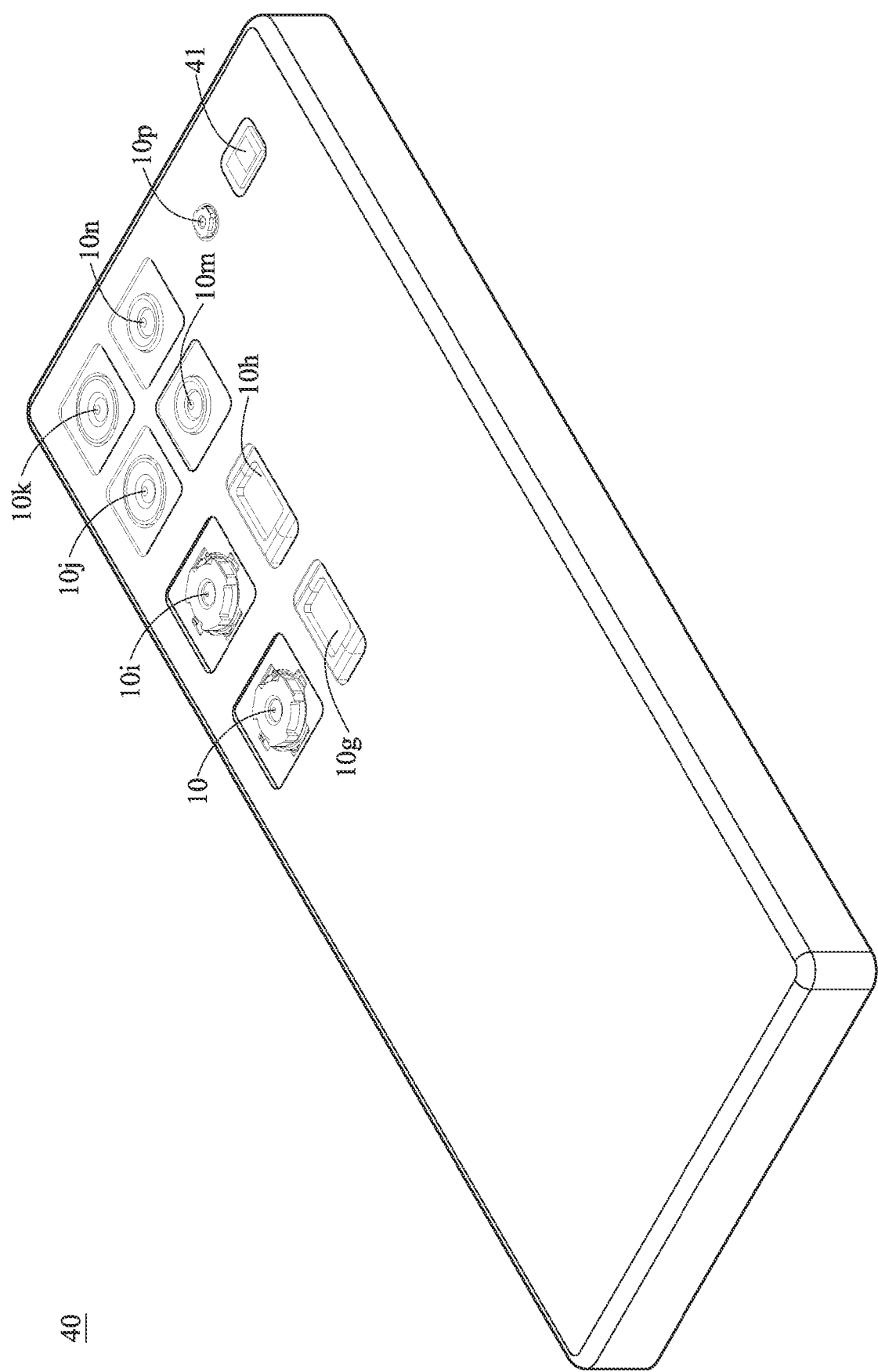
FIG. 24 is one perspective view of an electronic device according to the 13th embodiment of the present disclosure.

FIG. 24 is one perspective view of an electronic device according to the 13th embodiment of the present disclosure.

In this embodiment, an electronic device 40 is a smartphone including the image capturing unit 10 disclosed in the 10th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display unit and an image software processor (not shown). The image capturing units 10, 10g, 10h, 10i, 10j, 10k, 10m, 10n and 10p are disposed on the same side of the electronic device 40, while the display unit is disposed on the opposite side of the electronic device 40. Furthermore, each of the image capturing units 10g, 10h, 10i, 10j, 10k, 10m, 10n and 10p can include the imaging optical lens system of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing unit 10g and 10h can be similar to, for example, one of the structures shown in FIG. 26 to FIG. 28 which can be referred to foregoing descriptions corresponding to FIG. 26 to FIG. 28 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate images, and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising eleven lens elements, the eleven lens elements being, in order from an object side to an image side along an optical path, a first lens element, a second lens element, a third lens element, a fourth lens element, a fifth lens element, a sixth lens element, a seventh lens element, an eighth lens element, a ninth lens element, a tenth lens element and an eleventh lens element, a total number of lens elements of the imaging optical lens system is eleven, and there is an air gap in a paraxial region between each of all adjacent lens elements of the imaging optical lens system;

wherein the first lens element has positive refractive power, the ninth lens element has positive refractive power, at least one of an object-side surface and an image-side surface of the eleventh lens element has at least one inflection point in an off-axis region thereof, the imaging optical lens system further comprises an aperture stop, and at least one of an object-side surface and an image-side surface of each of at least two lens elements located between the aperture stop and an image surface of the imaging optical lens system is concave in a paraxial region thereof and has at least one convex critical point in an off-axis region thereof;

wherein an axial distance between an object-side surface of the first lens element and the image surface is TL, a maximum image height of the imaging optical lens system is ImgH, a maximum value among axial distances between each of all adjacent lens elements of the imaging optical lens system is ATmax, a minimum value among axial distances between each of all adjacent lens elements of the imaging optical lens system is ATmin, an Abbe number of the second lens element is V2, an Abbe number of the third lens element is V3, a refractive index of the second lens element is N2, a refractive index of the third lens element is N3, and the following conditions are satisfied:

$TL/\text{ImgH} < 2.50$;

$2.0 < AT\text{max}/AT\text{min} < 120$;

$6.0 < V2/N2 < 12.0$; and $6.0 < V3/N3 < 12.0$.

2. The imaging optical lens system of claim 1, wherein at least one of an object-side surface and an image-side surface of each of at least two lens elements of the imaging optical lens system is convex in a paraxial region thereof and has at least one concave critical point in an off-axis region thereof.

3. The imaging optical lens system of claim 1, wherein the maximum image height of the imaging optical lens system is ImgH, an axial distance between the image-side surface of the eleventh lens element and the image surface is BL, and the following condition is satisfied:

$2.0 < \text{ImgH}/BL < 12.0$.

4. The imaging optical lens system of claim 1, wherein a vertical distance between a critical point on an image-side surface of the tenth lens element and an optical axis is Yc10R2, a vertical distance between a critical point on the image-side surface of the eleventh lens element and the optical axis is Yc11R2, and the following condition is satisfied:

$0.5 < Yc11R2/Yc10R2 < 2.0$.

5. The imaging optical lens system of claim 1, wherein a total number of lens elements having an Abbe number smaller than 24 in the imaging optical lens system is V24, a minimum value among Abbe numbers of all lens elements of the imaging optical lens system is Vmin, and the following conditions are satisfied:

$2 \leq V24$; and $V\text{min} < 20$.

6. The imaging optical lens system of claim 1, wherein the axial distance between the object-side surface of the first lens element and the image surface is TL, an entrance pupil diameter of the imaging optical lens system is EPD, and the following condition is satisfied:

$0.5 < TL/EPD < 3.0$.

7. The imaging optical lens system of claim 1, wherein the tenth lens element has an object-side surface being convex in a paraxial region thereof and having at least one concave critical point in an off-axis region thereof, and the image-side surface of the eleventh lens element is concave in a paraxial region thereof and has at least one convex critical point in an off-axis region thereof.

8. The imaging optical lens system of claim 1, wherein at least six lens elements of the imaging optical lens system are made of plastic material; and wherein an Abbe number of the first lens element is V1, the Abbe number of the second lens element is V2, the Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the tenth lens element is V10, an Abbe number of the eleventh lens element is V11, an Abbe number of the i-th lens element is Vi, a refractive index of the first lens element is N1, the refractive index of the second lens element is N2, the refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the tenth lens element is N10, a refractive index of the eleventh lens element is N11, a refractive index of the i-th lens element is Ni, and at least one lens element of the imaging optical lens system satisfies the following condition:

$6.0 < Vi/Ni < 11.2$, wherein $i=1,2,3,4,5,6,7,8,9,10$ or $11$.

9. The imaging optical lens system of claim 1, wherein at least one of an object-side surface and an image-side surface of each of at least three lens elements of the imaging optical lens system is concave in a paraxial region thereof and has at least one convex critical point in an off-axis region thereof.

10. The imaging optical lens system of claim 1, wherein the axial distance between the object-side surface of the first lens element and the image surface is TL, the maximum image height of the imaging optical lens system is ImgH, and the following condition is satisfied:

$TL/\text{ImgH} < 1.80$.

11. The imaging optical lens system of claim 1, wherein a focal length of the imaging optical lens system is f, a focal length of the first lens element is f1, a focal length of the second lens element is f2, a focal length of the third lens element is f3, and the following condition is satisfied:

$0.75 < |f/f1| + |f/f2| + |f/f3| < 2.50$.

12. The imaging optical lens system of claim 1, wherein the axial distance between the object-side surface of the first lens element and the image surface is TL, a maximum effective radius of the image-side surface of the eleventh lens element is Y11R2, and the following condition is satisfied:

TL/Y11R2<3.50.

13. The imaging optical lens system of claim 1, wherein an axial distance between the object-side surface of the first lens element and the image-side surface of the eleventh lens element is Td, an axial distance between an object-side surface of the fifth lens element and an image-side surface of the eighth lens element is Dr9r16, and the following condition is satisfied:

3.0<Td/Dr9r16<6.0.

14. The imaging optical lens system of claim 1, wherein the air gaps between respective adjacent lens elements of the imaging optical lens system comprise a maximum spacing distance, and a lens surface located at an object side of the maximum spacing distance is concave in a paraxial region thereof; and
wherein a focal length of the imaging optical lens system is f, a curvature radius of a lens surface located at an image side of the maximum spacing distance is Ri, and the following condition is satisfied:

f/|Ri|<0.80.

15. The imaging optical lens system of claim 1, wherein an axial distance between the object-side surface of the first lens element and the image-side surface of the eleventh lens element is Td, a sum of central thicknesses of all lens elements of the imaging optical lens system is ΣCT, and the following condition is satisfied:

Td/ΣCT<1.75.

16. The imaging optical lens system of claim 1, wherein each of at least two of an image-side surface of the ninth lens element, and an image-side surface of the tenth lens element and the image-side surface of the eleventh lens element is concave in a paraxial region thereof and has at least one convex critical point in an off-axis region thereof.

17. The imaging optical lens system of claim 1, wherein a focal length of the imaging optical lens system is f, a focal length of the i-th lens element is fi, and at least two lens elements of the imaging optical lens system satisfy the following condition:

|f/fi|<0.20, wherein i=1,2,3,4,5,6,7,8,9,10 or 11.

18. The imaging optical lens system of claim 1, wherein the aperture stop is located between an imaged object and the fourth lens element; and
wherein an axial distance between the aperture stop and the image-side surface of the eleventh lens element is Sd, an axial distance between the object-side surface of the first lens element and the image-side surface of the eleventh lens element is Td, an f-number of the imaging optical lens system is Fno, and the following conditions are satisfied:

0.60<Sd/Td<1.20; and 1.0<Fno<2.20.

19. The imaging optical lens system of claim 1, wherein a maximum effective radius of the object-side surface of the first lens element is Y1R1, a maximum effective radius of the image-side surface of the eleventh lens element is Y11R2, and the following condition is satisfied:

Y1R1/Y11R2<0.80.

20. The imaging optical lens system of claim 1, wherein the axial distance between the object-side surface of the first lens element and the image surface is TL, half of a maximum field of view of the imaging optical lens system is HFOV, the maximum image height of the imaging optical lens system is ImgH, and the following conditions are satisfied:

5.0[mm]<TL<16.0[mm];

34.0[deg.]<HFOV<100.0[deg.]; and 5.50[mm]<ImgH<10.0[mm].

21. The imaging optical lens system of claim 1, wherein the axial distance between the object-side surface of the first lens element and the image surface is TL, a focal length of the imaging optical lens system is f, and the following condition is satisfied:

0.75<TL/f<1.50.

22. The imaging optical lens system of claim 1, wherein a vertical distance between a critical point on the image-side surface of the eleventh lens element and an optical axis is Yc11R2, a focal length of the imaging optical lens system is f, and the following condition is satisfied:

Yc11R2/f<0.50.

23. The imaging optical lens system of claim 1, wherein a total number of lens elements having an Abbe number smaller than 20 in the imaging optical lens system is V20, and the following condition is satisfied:

2≤V20.

24. The imaging optical lens system of claim 1, wherein each of the at least two lens elements located between the aperture stop and the image surface of the imaging optical lens system has negative refractive power.

25. An image capturing unit, comprising:
the imaging optical lens system of claim 1; and
an image sensor disposed on the image surface of the imaging optical lens system.

26. An electronic device, comprising:
the image capturing unit of claim 25.

27. An imaging optical lens system comprising eleven lens elements, and the eleven lens elements being, in order from an object side to an image side along an optical path, a first lens element, a second lens element, a third lens element, a fourth lens element, a fifth lens element, a sixth lens element, a seventh lens element, an eighth lens element, a ninth lens element, a tenth lens element and an eleventh lens element, and a total number of lens elements of the imaging optical lens system is eleven;
wherein the first lens element has positive refractive power, at least one of an object-side surface of the eighth lens element and an image-side surface of the eighth lens element is aspheric, the ninth lens element has positive refractive power, the eleventh lens element has an object-side surface having at least one inflection point in an off-axis region thereof, and the eleventh lens element has an image-side surface being concave in a paraxial region thereof and having at least one convex critical point in an off-axis region thereof;

wherein an Abbe number of the second lens element is V2, an Abbe number of the third lens element is V3, a refractive index of the second lens element is N2, a refractive index of the third lens element is N3, and the following conditions are satisfied:

$6.0<V2/N2<12.0$; and $6.0<V3/N3<12.0$.

28. The imaging optical lens system of claim 27, wherein at least one of an object-side surface and an image-side surface of each of at least three lens elements of the imaging optical lens system is concave in a paraxial region thereof and has at least one convex critical point in an off-axis region thereof.

29. The imaging optical lens system of claim 27, wherein an axial distance between an object-side surface of the first lens element and an image surface is TL, a maximum image height of the imaging optical lens system is ImgH, and the following condition is satisfied:

$TL/\text{ImgH}<2.50$.

30. The imaging optical lens system of claim 27, wherein a maximum value among Abbe numbers of all lens elements of the imaging optical lens system is Vmax, and the following condition is satisfied:

$50.0<V\text{max}<60.0$.

31. The imaging optical lens system of claim 27, wherein an axial distance between an object-side surface of the first lens element and an image surface is TL, half of a maximum field of view of the imaging optical lens system is HFOV, a maximum image height of the imaging optical lens system is ImgH, and the following conditions are satisfied:

$5.0[\text{mm}]<TL<16.0[\text{mm}]$;

$34.0[\text{deg.}]<\text{HFOV}<100.0[\text{deg.}]$; and $5.50\ [\text{mm}]<\text{ImgH}<10.0[\text{mm}]$.

32. The imaging optical lens system of claim 27, wherein a curvature radius of the image-side surface of the eleventh lens element is R22, a maximum image height of the imaging optical lens system is ImgH, and the following condition is satisfied:

$R22/\text{ImgH}<1.20$.

33. The imaging optical lens system of claim 27, wherein a focal length of the imaging optical lens system is f, a focal length of the tenth lens element is f10, a focal length of the eleventh lens element is f11, and the following condition is satisfied:

$1.20<|f/f10|+|f/f11|<4.0$.

34. The imaging optical lens system of claim 27, wherein an axial distance between an object-side surface of the first lens element and an image surface is TL, an entrance pupil diameter of the imaging optical lens system is EPD, and the following condition is satisfied:

$0.5<TL/EPD<3.0$.

35. The imaging optical lens system of claim 27, wherein at least six lens elements of the imaging optical lens system are made of plastic material; and wherein an Abbe number of the first lens element is V1, the Abbe number of the second lens element is V2, the Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the tenth lens element is V10, an Abbe number of the eleventh lens element is V11, an Abbe number of the i-th lens element is Vi, a refractive index of the first lens element is N1, the refractive index of the second lens element is N2, the refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the tenth lens element is N10, a refractive index of the eleventh lens element is N11, a refractive index of the i-th lens element is Ni, and at least one lens element of the imaging optical lens system satisfies the following condition:

$6.0<Vi/Ni<11.2$, where $i=1,2,3,4,5,6,7,8,9,10$ or $11$.

36. The imaging optical lens system of claim 27, wherein a maximum value among central thicknesses of all lens elements of the imaging optical lens system is CTmax, a minimum value among central thicknesses of all lens elements of the imaging optical lens system is CTmin, and the following condition is satisfied:

$1.25<CT\text{max}/CT\text{min}<6.0$.

37. The imaging optical lens system of claim 27, wherein the tenth lens element has an object-side surface being convex in a paraxial region thereof and having at least one concave critical point in an off-axis region thereof.

* * * * *